United States Patent [19]

Lenoir et al.

[11] 4,379,819
[45] Apr. 12, 1983

[54] COLOR-PHOTOGRAPHIC RECORDING MATERIAL FOR THE SILVER DYE BLEACH PROCESS

[75] Inventors: John Lenoir; Gerald Jan, both of Fribourg; Mario Fryberg, Praroman-le-Mouret, all of Switzerland

[73] Assignee: Ciba-Geigy AG, Basel, Switzerland

[21] Appl. No.: 258,263

[22] Filed: Apr. 28, 1981

[30] Foreign Application Priority Data

Apr. 30, 1980 [CH] Switzerland .................. 3342/80

[51] Int. Cl.³ .............................................. G03C 1/10
[52] U.S. Cl. ................................. 430/17; 430/390; 430/562
[58] Field of Search ...................... 430/17, 390, 562

[56] References Cited

U.S. PATENT DOCUMENTS 2,455,169 11/1948 Glass et al. ........................ 430/562
3,053,655 9/1962 Dreyfuss et al. .................. 430/562
3,244,525 4/1966 Mory et al. ........................ 430/562
4,235,957 11/1980 Kohrt et al. ....................... 430/390

Primary Examiner—J. Travis Brown
Attorney, Agent, or Firm—Joseph G. Kolodny

[57] ABSTRACT

A color-photographic recording material for the silver dye bleach process, which contains oil-soluble azo dyes of the formula

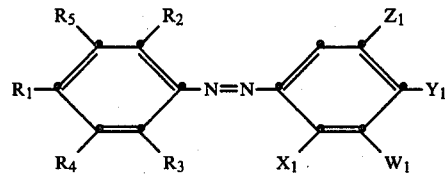

in which $R_1$ is hydrogen, alkyl, alkoxy, alkenyl, acyl, carbalkoxy, acylamino, carbamide, sulfonamide, alkylsulfone, arylsulfone, aryloxy, arylsulfonic acid ester, hydroxyl, cyano, nitro or halogen, $R_2$ is hydrogen, alkyl, alkoxy, carbalkoxy, carbamide, sulfonamide, alkylsulfone, arylsulfone, aryloxy, cyano, nitro or halogen, $R_3$ is hydrogen, alkyl, alkoxy, phenoxy, sulfonamide, alkylsulfone, sulfonic acid ester, cyano, nitro, halogen, carbalkoxy, carbamide or phosphoric acid diester, $R_4$ is hydrogen, alkyl, alkoxy, carbalkoxy, carbamide, sulfonamide, acylamino, alkylsulfone, arylsulfone, hydroxyl, cyano, nitro or halogen, $R_5$ is hydrogen, alkyl or carbalkoxy, $X_1$ is hydrogen, alkyl, alkoxy, acylamino, alkylsulfonamide or hydroxyl, $Y_1$ is hydrogen, alkyl, alkoxy, amino, carbalkoxy, arylsulfonamide, acylamino, halogen, hydroxyl or phosphamic acid ester, $Z_1$ is hydrogen, alkyl, alkoxy, acylamino, acyl, carbalkoxy, alkylsulfonamide or halogen or forms a ring with $Y_1$, and $W_1$ is hydrogen, alkyl, alkoxy or halogen. The substituents mentioned can, where relevant, themselves be further substituted.

The oil-soluble azo dyes are easily incorporated into silver halide gelatin emulsions and are very stable therein. Because of the good oil-solubility of the azo dyes, very thin layers can be cast in producing photographic materials, and this has an advantageous effect on, for example, the image sharpness.

17 Claims, No Drawings

COLOR-PHOTOGRAPHIC RECORDING MATERIAL FOR THE SILVER DYE BLEACH PROCESS

The present invention relates to a colour-photographic recording material for the silver dye bleach process, which contains at least one diffusion-resistant, bleachable and oil-soluble monoazo dye in at least one silver halide emulsion layer or in a colloid layer adjoining a silver halide emulsion layer.

The use of water-soluble polyazo or azoxy dyes for the silver dye bleach process is known (A. Meyer, J. Phot. Ser. 13, (1965), 90; Research Disclosure 17643/VII A, December 1978). An immediate advantage of the use of such azo dyes is that it permits easy and homogeneous dyeing of the hydrophilic, colloidal binders of a photographic layer, especially of gelatin. Furthermore, in the course of processing exposed silver dye bleach materials, water-soluble cleavage products or azo dyes, which can easily be washed out, are produced in the image areas. Amongst the disadvantages which arise when using water-soluble azo dyes, however, the tendency of these days to diffuse into and between photographic layers is particularly important. It has already been proposed to use reactive dyes to overcome this disadvantage. This however had too great an effect on the rheological, chemical and mechanical properties of the photographic layer to be produced. The use of water-soluble azo dyes of higher molecular weight also did not give a completely satisfactory result. It is true that it increased the diffusion resistance, but the tendency of such dyes to form micelles by aggregation is a further disadvantage, which significantly interferes with rheological properties of the coating solution and the colour density of the photographic image.

Swiss Pat. No. 600,385 describes a silver dye bleach process, in which water-insoluble azo dyes having blocked auxochromes are dispersed in gelatin. However, these dyes bleach only very slowly, and incompletely. Furthermore, the regeneration of the desired image dye requires a special treatment in a strongly alkaline medium. Other water-insoluble azo dyes, which have been incorporated into silver dye bleach materials, are difficult to prepare and show too low a stability to changes in pH value, and to the action of light (U.S. Pat. No. 3,544,326; Research Disclosure 14983, September 1976).

Accordingly, it is the object of the present invention to provide novel photographic recording materials for the silver dye bleach process, which employ water-insoluble dyes which are easily incorporated into the layers of the recording materials and which, because of their fastness characteristics, lead to a material which gives images of improved quality.

Oil-soluble azo dyes, for use in photographic layers of silver dye bleach materials, have now been found, which impart the desired properties to the recording material and give high-quality photographic images.

Accordingly, the present invention relates to a colour-photographic recording material for the silver dye bleach process, which contains at least one diffusion-resistant, bleachable and oil-soluble monoazo dye in at least one silver halide emulsion layer or in a colloid layer adjoining the silver halide emulsion layer, and wherein the dye has the formula

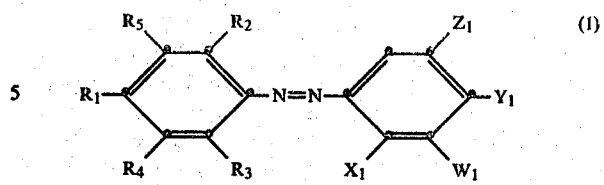

in which $R_1$ is hydrogen, substituted or unsubstituted alkyl having 1 to 18 carbon atoms, substituted or unsubstituted alkoxy having 1 to 16 carbon atoms, substituted or unsubstituted alkenyl having 2 to 4 carbon atoms, substituted or unsubstituted aliphatic acyl having 2 to 5 carbon atoms, substituted or unsubstituted benzoyl, substituted or unsubstituted carbalkoxy having 2 to 20 carbon atoms or $-NV_1COU_1$, in which $V_1$ is hydrogen or alkyl having 1 to 4 carbon atoms and $U_1$ is substituted or unsubstituted alkyl having 1 to 12 carbon atoms or substituted or unsubstituted alkenyl having 2 to 4 carbon atoms, or $R_1$ is N-alkyl-substituted or N,N-dialkyl-substituted carboxamido or sulfonamido, in which each alkyl moiety has 1 to 12 carbon atoms and can be substituted further, or $R_1$ is substituted or unsubstituted alkylsulfone having 1 to 12 carbon atoms, substituted or unsubstituted arylsulfone, substituted or unsubstituted aryloxy or substituted or unsubstituted arylsulfonic acid ester, or is hydroxyl, cyano, nitro or halogen, $R_2$ is hydrogen, substituted and unsubstituted alkyl having 1 to 12 carbon atoms, substituted or unsubstituted alkoxy having 1 to 6 carbon atoms, substituted or unsubstituted carbalkoxy having 2 to 5 carbon atoms or N-alkyl-substituted or N,N-dialkyl-substituted sulfonamido or carboxamido, in which each alkyl moiety has 1 to 8 carbon atoms and can be substituted, or $R_2$ is substituted or unsubstituted alkylsulfone having 1 to 6 carbon atoms, substituted or unsubstituted arylsulfone or substituted or unsubstituted aryloxy, or is cyano, nitro or halogen, $R_3$ is hydrogen, substituted or unsubstituted alkyl or alkoxy having 1 to 4 carbon atoms, substituted or unsubstituted phenoxy, or N-alkyl-substituted or N,N-dialkyl-substituted sulfonamido or carboxamido, in which each alkyl moiety has 1 to 6 carbon atoms and can be substituted, or $R_3$ is substituted or unsubstituted alkylsulfone having 1 to 4 carbon atoms, substituted or unsubstituted phenylsulfonic acid ester, cyano, nitro, halogen, substituted or unsubstituted carbalkoxy having 1 to 16 carbon atoms, or $-P(O)(OT^1)_2$, in which $T^1$ is alkyl having 1 to 4 carbon atoms, $R_4$ is hydrogen, substituted or unsubstituted alkyl having 1 to 4 carbon atoms, substituted or unsubstituted alkoxy having 1 to 6 carbon atoms, substituted or unsubstituted carbalkoxy having 2 to 16 carbon atoms or N-alkyl-substituted or N,N-dialkyl-substituted sulfonamido or carboxamido, in which each alkyl moiety has 1 to 12 carbon atoms and can be substituted, or $R_4$ is $-NQ_1COT_1$, in which $Q_1$ is hydrogen or alkyl having 1 or 2 carbon atoms and $T_1$ is substituted or unsubstituted alkyl having 1 to 4 carbon atoms, or $R_4$ is substituted or unsubstituted alkylsulfone having 1 to 12 carbon atoms, substituted or unsubstituted arylsulfone, hydroxyl, cyano, nitro or halogen, $R_5$ is hydrogen, substituted or unsubstituted alkyl having 1 to 4 carbon atoms or substituted or unsubstituted carbalkoxy having 2 to 13 carbon atoms, $X_1$ is hydrogen, substituted or unsubstituted alkyl or alkoxy having 1 to 6 carbon atoms or $-NL_1CO-M_1$, in which $L_1$ is hydrogen or substituted or unsubstituted alkyl having 1 to 4 carbon atoms and $M_1$ is substituted or unsubstituted alkyl or alkoxy having 1 to 24 carbon atoms, or $X_1$ is substituted or unsubstituted alkylsulfonylamino having 1 to 25 carbon atoms or hydroxyl, $Y_1$ is hydrogen, substituted or unsubstituted alkyl having 1 to 6 carbon atoms, substituted or unsubstituted alkoxy having 1 to 12 carbon atoms, substituted or unsubstituted carbalkoxy having 2 to 5 carbon atoms or N-alkyl-substituted or N,N-dialkyl-substituted amino, in which each alkyl moiety has 1 to 6 carbon atoms and can be substituted, or $Y_1$ is substituted or unsubstituted arylsulfonylamino or $-NE_1COG_1$, in which $E_1$ is hydrogen or substituted or unsubstituted alkyl having 1 to 8 carbon atoms and $G_1$ is substituted or unsubstituted alkyl having 1 to 12 carbon atoms or substituted or unsubstituted alkoxy having 1 to 4 carbon atoms, or $Y_1$ is $-NE_1P(O)(OG^1)_2$, in which $E_1$ is as defined above and $G^1$ is alkyl having 1 to 12 carbon atoms, or $Y_1$ is halogen or hydroxyl, $Z_1$ is hydrogen, substituted or unsubstituted alkyl having 1 to 12 carbon atoms, substituted or unsubstituted alkoxy having 1 to 6 carbon atoms or $-NA_1COD_1$, in which $A_1$ is hydrogen or substituted or unsubstituted alkyl having 1 to 8 carbon atoms and $D_1$ is substituted or unsubstituted alkyl having 1 to 18 carbon atoms, or $Z_1$ is substituted or unsubstituted acyl having 2 to 9 carbon atoms, substituted or unsubstituted carbalkoxy having 2 to 19 carbon atoms, substituted or unsubstituted alkylsulfonylamino having 1 to 6 carbon atoms, halogen or the atoms which together with $Y_1$ form a substituted or unsubstituted 5-membered or 6-membered, saturated or unsaturated ring which can contain 1 or 2 hetero-atoms, and $W_1$ is hydrogen, substituted or unsubstituted alkyl or alkoxy, each having 1 to 4 carbon atoms, or halogen.

The invention further relates to the process of preparation of the photographic recording material, to the use of the material for the production of photographic images and to the process for the production of photographic images using silver dye bleach materials which contain the oil-soluble azo dyes according to the invention in the photographic layers.

The substituent $R_1$ is, for example, hydrogen, or alkyl which has 1 to 18 carbon atoms and can be straight-chain or branched. Examples of such alkyl radicals are methyl, ethyl, propyl, i-propyl, butyl, i-butyl, tert.-butyl, amyl, tert.-amyl (1,1-dimethylpropyl), 1,1,3,3-tetramethylbutyl, 1-methylethylpentyl, hexyl, 1-methylpentyl, neopentyl, 1-, 2- and 3-methylhexyl, heptyl, n-octyl, tert.-octyl, 2-ethylhexyl, n-nonyl, isononyl, tert.-nonyl, decyl, tert.-decyl, undecyl, dodecyl, tetradecyl, hexadecyl and octadecyl, and the corresponding isomers.

Alkyl radicals having 1 to 12 carbon atoms are preferred, and those having 1 to 6 carbon atoms are particularly preferred. They can be substituted by carbalkoxy having 2 to 12, especially 2 to 6, carbon atoms. An alternative possible substituent is alkoxy having 1 to 4 carbon atoms.

If $R_1$ is alkoxy having 1 to 16 carbon atoms, it can be an alkoxy radical analogous to the alkyl radicals mentioned. Alkoxy radicals having 1 to 8 carbon atoms are preferred. A possible substituent of the alkoxy radicals is $-(OC_2H_4)_nO(CH_2)_mCH_3$, in which n is 1 or 2 and m is an integer from 0 to 3.

$R_1$ can also be alkenyl having 2 to 4 carbon atoms, and especially vinyl. Substituents for these unsaturated radicals include cyano and carbalkoxy having 2 to 9 carbon atoms. One or both of these substituents can be present on an alkenyl radical.

$R_1$ can also be an aliphatic or aromatic (carboxylic acid) acyl radical. If $R_1$ is aliphatic acyl, it has 2 to 5 carbon atoms and can be substituted by methoxy or ethoxy. Acyl having 2 or 3 carbon atoms is preferred, and acetyl is particularly preferred. If $R_1$ is an aromatic acyl, it is preferably benzoyl, which can have additional substituents in the para-position, for example chlorine, $-CO_2B$, $-SO_2B$ or $-COB$, in which B is alkyl having 1 to 8, especially 1 to 4, carbon atoms.

If $R_1$ is carbalkoxy, the alkoxy moiety has 1 to 19 carbon atoms. Alkoxy having 1 to 16, especially 1 to 8, carbon atoms is preferred. These alkoxy moieties correspond to the alkyl radicals mentioned. Examples of substituents of the said alkoxy moieties are $-(OC_2H_4)_nOCH_3$ and $-(OC_2H_4)_nOC_2H_5$ in which n is as defined above.

If $R_1$ is

$V_1$ can be hydrogen or alkyl having 1 to 4 carbon atoms, hydrogen being preferred. $U_1$ is alkyl having 1 to 12, preferably 1 to 8, especially 1 to 4, carbon atoms, which can be substituted by methoxy or hydroxyl. $U_1$ can also be alkenyl having 2 to 4 carbon atoms.

$R_1$ is carboxamido of the formula $-CONH_2$ or sulfonamido of the formula $-SO_2NH_2$. It can also be N-alkyl-substituted or N,N-dialkyl-substituted carboxamido or sulfonamido, in which each alkyl moiety has 1 to 12, especially 1 to 10, and preferably 1 to 5, carbon atoms. Examples of possible substituents of the alkyl radicals are methoxy, hydroxyl and amino.

The substituent $R_1$ can also be alkylsulfone having 1 to 12, especially 1 to 8, and particularly preferably 1 to 6, carbon atoms. The alkyl moiety can be substituted further, for example by methoxy, ethoxy or hydroxyl.

If $R_1$ is arylsulfone, the preferred meaning is phenylsulfone, which can be substituted by alkyl having 1 to 5 carbon atoms or hydroxyl, preferably in the paraposition. The same substitution is possible if $R_1$ is aryloxy, preferably phenoxy, or an arylsulfonic acid ester group, especially a phenylsulfonic acid ester group.

$R_1$ can also be hydroxyl, cyano, nitro or halogen; in the last-mentioned case, chlorine and bromine are preferred.

The substituent $R_2$, which is in the ortho-position to the azo group, is, for example, hydrogen or alkyl having 1 to 12 carbon atoms. Suitable alkyl radicals are the relevant radicals mentioned for $R_1$, alkyl radicals having 1 to 8 carbon atoms being preferred, and methyl being especially preferred. The alkyl radicals can be substituted by halogen, especially by fluorine.

If $R_2$ is alkoxy having 1 to 6 carbon atoms, particularly preferred meanings are methoxy and ethoxy; such radicals can be substituted by further methoxy groups.

$R_2$ can also be carbalkoxy having 2 to 5, especially 2 or 3, carbon atoms; the alkoxy moiety can be substituted, for example by methoxy.

$R_2$ can also be N-alkyl-substituted or N,N-dialkyl-substituted sulfonamido or carboxamido, in which groups each alkyl moiety has 1 to 8, preferably 1 to 4, carbon atoms; these alkyl moieties can be substituted by methoxy.

A further meaning of $R_2$ is alkylsulfone having 1 to 6, especially 1 to 4, carbon atoms; it can be substituted by, for example, methoxy or hydroxyl.

If R$_2$ is arylsulfone, a particularly preferred meaning is phenylsulfone, which can be substituted further by alkyl having 1 to 5 carbon atoms.

If R$_2$ is aryloxy, a preferred meaning is phenoxy. Aryloxy can be substituted by, for example, alkyl having 1 to 8, especially 1 to 5, carbon atoms, the substituent preferably being in the para-position of the aryl moiety.

R$_2$ can also be cyano, nitro or halogen; in the last-mentioned case, chlorine and bromine are preferred.

The substituent R$_3$, which is also in the ortho-position to the azo group, can be, for example, hydrogen or alkyl. If it is alkyl, it has 1 to 4 carbon atoms, methyl being preferred, and can be substituted by methoxy.

If R$_3$ is alkoxy, it has 1 to 4 carbon atoms and can be substituted by methoxy.

R$_3$ can also be phenoxy, which can be substituted by halogen, especially by chlorine.

If R$_3$ is N-alkyl-substituted or N,N-dialkyl-substituted sulfonamido or carboxamido, each alkyl moiety in these groups can be one of those mentioned above, having 1 to 6, preferably 1 or 2, carbon atoms. Preferably, the nitrogen atom of the sulfonamido or carboxamido radical has two alkyl substituents, which can be further substituted by methoxy.

If R$_3$ is alkylsulfone, the alkyl moiety has 1 to 4 carbon atoms; methylsulfone is preferred.

If R$_3$ is a phenylsulfonic acid ester group, it can be substituted by alkyl having 1 to 5 carbon atoms.

R$_3$ can also be cyano, nitro or halogen, and in the last-mentioned case chlorine and bromine are particularly preferred.

If R$_3$ is carbalkoxy, the alkyl moiety has 1 to 16, especially 1 to 12, preferably 1 to 6, carbon atoms, and can be substituted by methoxy or ethoxy.

If R$_3$ is —P(O)(OT$^1$)$_2$, T$^1$ is alkyl having 1 to 4 carbon atoms, especially 1 or 2 carbon atoms.

The substituent R$_4$ can be, for example, hydrogen or alkyl having 1 to 4 carbon atoms; a preferred meaning of alkyl is methyl. The alkyl radicals can be substituted by hydroxyl or halogen, especially fluorine.

If R$_4$ is alkoxy having 1 to 6, especially 1 or 2, carbon atoms, the radicals can be further substituted by methoxy.

R$_4$ can also be carbalkoxy having 2 to 16 carbon atoms. Preferably, the alkyl moiety has 2 to 9 carbon atoms. Examples of suitable substituents on the alkyl moiety are methoxy, ethoxy and —OC$_2$H$_4$—OCH$_3$.

R$_4$ can also be N-alkyl-substituted or N,N-dialkyl-substituted sulfonamido or carboxamido, in which groups each alkyl moiety has 1 to 6 carbon atoms, preferably 1 to 4 carbon atoms and especially 1 or 2 carbon atoms. The alkyl moieties can be substituted by methoxy.

If R$_4$ is

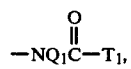

Q$_1$ is hydrogen or alkyl having 1 or 2 carbon atoms, hydrogen being preferred, and T$_1$ is alkyl having 1 to 4 carbon atoms. The alkyl radicals Q$_1$ and T$_1$ can be substituted by hydroxyl, cyano, chlorine or bromine.

If R$_4$ is alkylsulfone, the alkyl moiety can have 1 to 12, especially 1 to 6, carbon atoms, and the most preferred meaning is methyl. The alkyl moieties can be substituted by amino.

If R$_4$ is arylsulfone, a preferred meaning is phenylsulfone. Suitable substituents are alkyl radicals having 1 to 5 carbon atoms, and are preferably in the para-position of the aryl radicals.

R$_4$ can also be hydroxyl, cyano, nitro or halogen, of which hydroxyl, cyano and chlorine are particularly suitable.

The substituent R$_5$ can especially be hydrogen or alkyl having 1 to 4 carbon atoms, preferably methyl. The alkyl radicals can be substituted by carbalkoxy having 2 or 3 carbon atoms.

R$_5$ can also be carbalkoxy having 2 to 13 carbon atoms in the alkyl moiety, preferably 2 to 7 carbon atoms and especially 2 or 3 carbon atoms. A suitable substituent of the alkyl moiety is methoxy.

The substituent X$_1$ can be, for example, hydrogen, or alkyl or alkoxy, each having 1 to 6, especially 1 to 4, carbon atoms. If X$_1$ is alkoxy, a preferred meaning is methoxy. The alkyl and alkoxy radicals can be substituted by, for example, hydroxyl or methoxy.

X$_1$ can also be

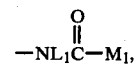

in which L$_1$ is hydrogen or alkyl having 1 to 4 carbon atoms, methyl being preferred, and M$_1$ is alkyl or alkoxy having 1 to 24 carbon atoms. The alkyl radicals can be any of the isomers mentioned as examples of the substituent R$_1$ being alkyl, and can in addition be the straight-chain alkyl radicals having 19, 20, 22 or 24 carbon atoms. The same applies to the alkoxy radicals. Preferred alkyl radicals have 1 to 13, especially 1 to 8, carbon atoms. Preferred alkoxy radicals have 1 to 4 carbon atoms, and methoxy and ethoxy are particularly preferred. Substituents of the alkyl and alkoxy radicals can be fluorine, chlorine, carbalkoxy having 2 to 5, preferably 2 or 3, carbon atoms, phenyl, para-(C$_{m3}$H$_{2m3+1}$)—C$_6$H$_4$—, phenoxy,para-(C$_{m3}$H$_{2m3+1}$)—C$_6$H$_4$—O—, m$_3$ being an integer from 1 to 8, or alkoxy having 1 to 5 carbon atoms.

If X$_1$ is alkylsulfonylamino (—NHSO$_2$-alkyl), the alkyl moiety contains 1 to 25 carbon atoms, preferably 1 to 12, and especially 1 to 6, carbon atoms. Examples of possible substituents of the alkyl moiety are methoxy, cyano and phenyl.

X$_1$ can also be hydroxyl.

The substituent Y$_1$ can be, for example, hydrogen or alkyl having 1 to 6 carbon atoms, preferably methyl or ethyl.

Suitable alkoxy radicals Y$_1$ have 1 to 12, especially 1 to 8, carbon atoms, and can be further substituted by methoxy, ethoxy or radicals of the formula —OC$_2$H$_4$OCH$_3$ or —OC$_2$H$_4$OC$_2$H$_5$.

If Y$_1$ is carbalkoxy having 2 to 5, especially 2 or 3, carbon atoms, it can for example be substituted by alkoxy groups, such as —OC$_2$H$_4$—OCH$_3$.

Y$_1$ can also be N-alkyl-substituted or N,N-dialkyl-substituted amino, in which each alkyl moiety has 1 to 6, especially 1 to 4, carbon atoms. The alkyl moieties can be substituted by methoxy, carbalkoxy having 2 to 5 carbon atoms, acetoxy, hydroxyl, nitro, cyano, phenyl or tosyl. Amino Y$_1$ can also be cyclic amino, for example pyrrolidinyl, piperidinyl or morpholinyl.

If Y$_1$ is arylsulfonylamino (—NHSO$_2$-aryl) a preferred meaning is phenylsulfonylamino. A suitable substituent is alkyl having 1 to 4 carbon atoms.

If $Y_1$ is $$-NE_1\overset{O}{\underset{\|}{C}}-G_1,$$

$E_1$ is hydrogen or alkyl having 1 to 8, especially 1 or 2, carbon atoms. The alkyl radicals can be substituted by cyano. $G_1$ can be alkyl having 1 to 12 carbon atoms, preferably 1 to 8 carbon atoms, and can be substituted by methoxy or ethoxy. $G_1$ can also be alkoxy having 1 to 4 carbon atoms, especially methoxy or ethoxy. The alkoxy radicals can be substituted by $-(OC_2H_4)_n OCH_3$, where n is as defined above.

If $Y_1$ is $-NE_1P(O)(OG^1)_2$, $E_1$ is as defined above, $G^1$ is alkyl having 1 to 12, especially 1 to 6, preferably 1 to 4, carbon atoms.

$Y_1$ can also be halogen or hydroxyl, chlorine being the preferred halogen.

The substituent $Z_1$ is, for example, hydrogen or alkyl having 1 to 12 carbon atoms, especially 1 to 6 carbon atoms. The alkyl radicals can be substituted by hydroxyl, halogen or cyano.

If $Z_1$ is alkoxy having 1 to 6, especially 1 to 4, carbon atoms, the alkoxy radical can be substituted by $-O(CH_2)_m-CH_3$, in which m is 0, 1, 2 or 3.

$Z_1$ can also be $$-NA_1\overset{O}{\underset{\|}{C}}-D_1,$$

in which $A_1$ is hydrogen or alkyl having 1 to 8 carbon atoms, preferably methyl, and $D_1$ is alkyl having 1 to 18 carbon atoms, preferably 1 to 12 and especially 1 to 8 carbon atoms. The alkyl radicals can be substituted by hydroxyl or amino.

$Z_1$ can also be (carboxylic acid) acyl having 2 to 9, especially 2 to 5, carbon atoms, acetyl being particularly suitable. Acyl can be substituted by methoxy.

If $Z_1$ is carbalkoxy, the alkyl moiety has 1 to 18, preferably 1 to 12, carbon atoms, and can be substituted by $-(OC_2H_4)_n OCH_3$, in which n is as defined above.

$Z_1$ can also be alkylsulfonylamino, in which the alkyl moiety contains 1 to 6 carbon atoms and is preferably methyl.

If $Z_1$ is halogen, chlorine is particularly preferred.

$Z_1$ can also be the atoms which together with $Y_1$ form a 5-membered or a 6-membered, saturated or unsaturated ring which can contain one or two hetero-atoms. Suitable hetero-atoms are nitrogen and oxygen, and either one or both of these can be present. The rings can be substituted by methyl. Examples are

[chemical structures shown]

The substituent $W_1$ can be hydrogen or alkyl or alkoxy, each having 1 to 4 carbon atoms, and methyl, methoxy, ethyl and ethoxy being preferred. The alkyl or alkoxy radicals can be substituted by methoxy.

If $W_1$ is halogen, the preferred meaning is chlorine.

Preferred oily-soluble azo dyes for use in photographic layers of silver dye bleach materials are those of the formula

[chemical structure (2) shown with substituents $R_{10}$, $R_7$, $Z_2$, $R_6$, $Y_2$, $R_9$, $R_8$, $X_2$, $W_2$]

in which $R_6$ is hydrogen, substituted or unsubstituted alkyl having 1 to 12 carbon atoms, substituted or unsubstituted alkoxy having 1 to 16 carbon atoms, substituted or unsubstituted alkenyl having 2 to 4 carbon atoms, substituted or unsubstituted aliphatic acyl having 2 or 3 carbon atoms, substituted or unsubstituted benzoyl, substituted or unsubstituted carbalkoxy having 2 to 16 carbon atoms, or $-NV_2COU_1$, in which $V_2$ is hydrogen or alkyl having 1 or 2 carbon atoms and $U_1$ is as defined above, or $R_6$ is N-alkyl-substituted or N,N-dialkyl-substituted carboxamido or sulfonamido, in which each alkyl moiety contains 1 to 10 carbon atoms and can be substituted further, or $R_6$ is substituted or unsubstituted alkylsulfone having 1 to 8 carbon atoms, substituted or unsubstituted phenylsulfone, substituted or unsubstituted phenoxy or substituted or unsubstituted phenylsulfonic acid ester, or is hydroxyl, cyano, nitro or halogen, $R_7$ is hydrogen, substituted or unsubstituted alkyl having 1 to 8 carbon atoms, substituted or unsubstituted alkoxy having 1 to 6 carbon atoms, substituted or unsubstituted carbalkoxy having 2 or 3 carbon atoms or N-alkyl-substituted or N,N-dialkyl-substituted sulfonamido or carboxamido, in which each alkyl moiety contains 1 to 8 carbon atoms and can be substituted, or $R_7$ is substituted or unsubstituted alkylsulfone having 1 to 6 carbon atoms, substituted or unsubstituted phenylsulfone or substituted or unsubstituted phenoxy, or is cyano, nitro or halogen, $R_8$ is hydrogen, alkyl or alkoxy having 1 to 4 carbon atoms, substituted or unsubstituted phenoxy or N-alkyl-substituted or N,N-dialkyl-substituted sulfonamido or carboxamido, in which alkyl moiety has 1 to 4 carbon atoms, or $R_8$ is alkylsulfone having 1 to 4 carbon atoms, substituted or unsubstituted phenylsulfonic acid ester, cyano, nitro, halogen, substituted or unsubstituted carbalkoxy having 1 to 16 carbon atoms, or $-P(O)(OT^1)_2$, in which $T^1$ is as defined above, $R_9$ is hydrogen, unsubstituted or halogen-substituted alkyl having 1 to 4 carbon atoms, substituted or unsubstituted alkoxy having 1 to 6 carbon atoms, carbalkoxy having 2 to 16 carbon atoms or N-alkyl-substituted or N,N-dialkyl-substituted sulfonamido or carboxamido, in which each alkyl moiety has 1 to 8 carbon atoms and can be substituted, or R$_9$ is —NQ$_1$COT$_1$, in which Q$_1$ and T$_1$ are as defined above, or R$_9$ is alkylsulfone having 1 to 6 carbon atoms, phenylsulfone, hydroxyl, cyano, nitro or halogen, R$_{10}$ is hydrogen, alkyl having 1 to 4 carbon atoms or carbalkoxy having 2 to 13 carbon atoms, X$_2$ is hydrogen, alkyl or alkoxy, each having 1 to 6 carbon atoms, or —NL$_2$COM$_2$, in which L$_2$ is hydrogen or alkyl having 1 to 4 carbon atoms and M$_2$ is substituted or unsubstituted alkyl or alkoxy having 1 to 18 carbon atoms, or X$_2$ is alkylsulfonylamino having 1 to 18 carbon atoms, or hydroxyl, Y$_2$ is hydrogen, substituted or unsubstituted alkyl having 1 to 4 carbon atoms, alkoxy having 1 to 12 carbon atoms, substituted or unsubstituted carbalkoxy having 2 to 5 carbon atoms, or N-alkyl-substituted or N,N-dialkyl-substituted amino, in which each alkyl moiety contains 1 to 6 carbon atoms and can be substituted, or Y$_2$ is substituted or unsubstituted phenylsulfonylamino or —NE$_2$COG$_2$, in which E$_2$ is hydrogen or unsubstituted or cyano-substituted alkyl having 1 to 8 carbon atoms and G$_2$ is alkyl having 1 to 8 carbon atoms or substituted or unsubstituted alkoxy having 1 to 4 carbon atoms, or Y$_2$ is —NH-P(O)(OG$^2$)$_2$, in which G$^2$ is alkyl having 1 to 6 carbon atoms, or Y$_2$ is halogen or hydroxyl, Z$_2$ is hydrogen, alkyl having 1 to 12 carbon atoms, substituted or unsubstituted alkoxy having 1 to 6 carbon atoms or —NA$_2$COD$_2$, in which A$_2$ is hydrogen or alkyl having 1 to 8 carbon atoms and D$_2$ is alkyl having 1 to 18 carbon atoms, or Z$_2$ is acyl having 2 to 7 carbon atoms, substituted or unsubstituted carbalkoxy having 2 to 19 carbon atoms, alkylsulfonylamino having 1 to 6 carbon atoms, halogen or the atoms which together with Y$_2$ form an unsubstituted or methyl-substituted 6-membered, saturated or unsaturated ring which can contain one or two hetero-atoms and W$_2$ is hydrogen, alkyl or alkoxy each having 1 to 4 carbon atoms, or halogen.

Particularly suitable compounds of the formula (2) are those of the formula

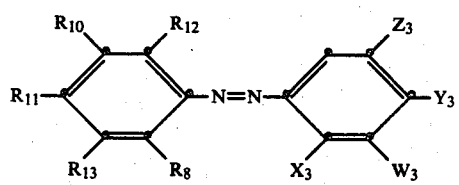 (3)

in which R$_{11}$ is hydrogen, alkyl having 1 to 12 carbon atoms which is substituted by alkoxy having 1 to 4 carbon atoms or by carbalkoxy having 2 to 12 carbon atoms or is unsubstituted, alkoxy having 1 to 16 carbon atoms, a radical of the formula —O—(CH$_2$)$_{m1}$—(OC$_2$H$_4$)$_n$O—(CH$_2$)$_m$CH$_3$, in which m$_1$ is an integer from 2 to 16, n is 1 or 2 and m is an integer from 0 to 3, alkenyl having 2 to 4 carbon atoms, which is substituted by cyano and/or by carbalkoxy having 2 to 9 carbon atoms or is unsubstituted, aliphatic acyl having 2 or 3 carbon atoms, benzoyl which is substituted by chlorine, CO$_2$B$_1$, —SO$_2$B$_1$ or —COB$_1$, in which B$_1$ is alkyl having 1 to 8 carbon atoms, or is unsubstituted, or R$_{11}$ is carbalkoxy having 2 to 16 carbon atoms, a radical of the formula

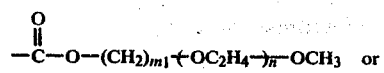

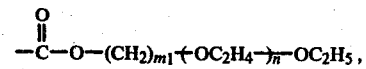

in which m$_1$ and n are as defined above, or —NV$_3$COU$_2$, in which V$_3$ is hydrogen and U$_2$ is unsubstituted or methoxy- or hydroxyl-substituted alkyl having 1 to 12 carbon atoms or alkenyl having 2 to 4 carbon atoms, or R$_{11}$ is carboxamido or N-alkyl-substituted or N,N-dialkyl-substituted sulfonamido, in which each alkyl moiety has 1 to 10 carbon atoms and can be substituted by methoxy, hydroxyl or amino, or R$_{11}$ is alkylsulfone having 1 to 8 carbon atoms, unsubstituted or substituted phenylsulfone, unsubstituted or substituted phenoxy, unsubstituted or substituted phenylsulfonic acid ester, hydroxyl, cyano, nitro or halogen, R$_{12}$ is hydrogen, unsubstituted or halogen-substituted alkyl having 1 to 8 carbon atoms, alkoxy having 1 to 6 carbon atoms, carbalkoxy having 2 or 3 carbon atoms, a radical of the formula

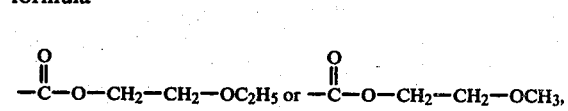

or N-alkyl-substituted or N,N-dialkyl-substituted sulfonamido or carboxamido, in which each alkyl moiety has 1 to 8 carbon atoms and can be substituted by methoxy, or R$_{12}$ is alkylsulfone having 1 to 6 carbon atoms, phenylsulfone or phenoxy which is unsubstituted or substituted by alkyl having 1 to 8 carbon atoms, or is cyano, nitro or halogen, R$_{13}$ is hydrogen, unsubstituted or fluorine-substituted alkyl having 1 or 2 carbon atoms, unsubstituted or methoxy-substituted alkoxy having 1 to 6 carbon atoms, carbalkoxy having 2 to 13 carbon atoms or N,N-dialkyl-substituted sulfonamido or carboxamido, in which each alkyl moiety has 1 to 4 carbon atoms and can be methoxy-substituted, or R$_{13}$ is —NQ$_2$COT$_2$, in which Q$_2$ is hydrogen and T$_2$ is alkyl having 1 to 4 carbon atoms, or R$_{13}$ is methylsulfone, phenylsulfone, hydroxyl, cyano, nitro or halogen, X$_3$ is hydrogen, alkyl or alkoxy each having 1 to 4 carbon atoms, or —NL$_3$COM$_3$, in which L$_3$ is hydrogen or methyl and M$_3$ is alkyl which has 1 to 18 carbon atoms and is unsubstituted or substituted by halogen, by carbalkoxy having 2 to 5 carbon atoms, by substituted or unsubstituted phenyl or phenoxy or by alkoxy having 1 to 5 carbon atoms, or X$_3$ is alkylsulfonylamino having 1 to 12 carbon atoms or hydroxyl, Y$_3$ is hydrogen, alkyl having 1 to 4 carbon atoms, alkoxy having 1 to 12 carbon atoms, unsubstituted or —OC$_2$H$_4$—OCH$_3$-substituted carbalkoxy having 2 to 5 carbon atoms or N-alkyl-substituted or N,N-dialkyl-substituted amino, in which each alkyl moiety has 1 to 6 carbon atoms and can be substituted by carbalkoxy having 2 to 5 carbon atoms, by methoxy, by acetoxy, by hydroxyl, by nitro, by cyano, by phenyl or by tosyl, or Y$_3$ is pyrrolidinyl, piperidinyl, morpholinyl or phenylsulfonylamino which is unsubstituted or substituted by alkyl having 1 to 4 carbon atoms, or Y$_3$ is —NE$_3$COG$_3$, in which E$_3$ is hydrogen or unsubstituted or cyano-substituted alkyl having 1 to 4 carbon atoms and G$_3$ is alkyl having 1 to 8 carbon atoms, alkoxy having 1 to 4 carbon atoms or a radical of the formula —O—(CH₂)$_k$—(OC₂H₄)$_n$OCH₃ in which k is an integer from 2 to 5 and n is as defined above, or Y₃ is

in which G³ is alkyl having 1 to 4 carbon atoms, or Y₃ is halogen or hydroxyl, Z₃ is hydrogen, alkyl having 1 to 8 carbon atoms, alkoxy having 1 to 6 carbon atoms, a radical of the formula —O—(CH₂)$_{k1}$—O—(CH₂-)$_m$—CH₃ in which k₁ is an integer from 2 to 6 and m is as defined above, or Z₃ is —NA₃COD₃, in which A₃ is hydrogen or alkyl having 1 to 4 carbon atoms and D₃ is alkyl having 1 to 12 carbon atoms, or Z₃ is acyl having 2 to 5 carbon atoms, carbalkoxy having 2 to 5 carbon atoms, a radical of the formula

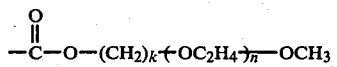

in which k and n are as defined above, methylsulfonylamino, halogen or the atoms which together with Y₃ form an unsubstituted or m 6-membered saturated or unsaturated ring which contains nitrogen or nitrogen and oxygen, W₃ is hydrogen, alkyl or alkoxy each having 1 or 2 carbon atoms, or halogen, and R₈ and R₁₀ are as defined above.

Further compounds which are preferred are those of the formula

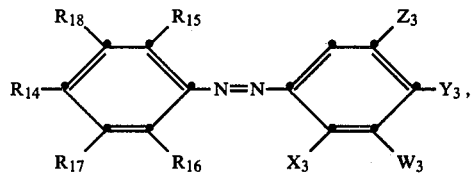

in which R₁₄ is hydrogen, alkyl which has 1 to 12 carbon atoms and is unsubstituted or substituted by alkoxy having 1 to 4 carbon atoms or by carbalkoxy having 2 to 7 carbon atoms, alkoxy having 1 to 12 carbon atoms, a radical of the formula —O(CH₂)$_{m2}$—(OC₂H₄-)$_n$O(CH₂)$_m$CH₃ in which m₂ is an integer from 2 to 12 and n and m are as defined above, or alkenyl which has 2 to 4 carbon atoms and is unsubstituted or substituted by cyano and/or by carbalkoxy having 2 to 7 carbon atoms, or R₁₄ is aliphatic acyl having 2 or 3 carbon atoms, or benzoyl which is unsubstituted or substituted by chlorine, —CO₂B₂, —SO₂B₂ or —COB₂, in which B₂ is alkyl having 1 to 4 carbon atoms, or R₁₄ is carbalkoxy having 2 to 9 carbon atoms, a radical of the formula

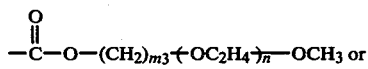

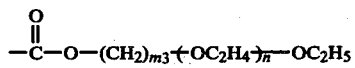

in which m₃ is an integer from 2 to 8 and n is as defined above, or —NHCOU₃, in which U₃ is alkyl having 1 to 8 carbon atoms or alkenyl having 2 or 3 carbon atoms, or R₁₄ is carboxamido or N-alkyl-substituted or N,N-dialkyl-substituted sulfonamido, in which each alkyl moiety has 1 to 5 carbon atoms and can be substituted by methoxy, hydroxyl or amino, or R₁₄ is alkylsulfone having 1 to 6 carbon atoms, unsubstituted or C₁₋₅-alkyl-substituted or hydroxyl-substituted phenylsulfone or phenylsulfonic acid ester, hydroxyl, cyano, nitro or halogen, R₁₅ is hydrogen, unsubstituted or fluorine-substituted alkyl having 1 to 4 carbon atoms, alkoxy having 1 or 2 carbon atoms, carbalkoxy having 2 or 3 carbon atoms, a radical of the formula

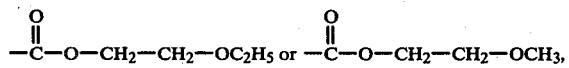

or N-alkyl-substituted or N,N-dialkyl-substituted sulfonamido or carboxamido, in which each alkyl moiety has 1 to 4 carbon atoms and can be methoxy-substituted, or R₁₅ is alkylsulfone having 1 to 4 carbon atoms, or phenylsulfone, or R₁₅ is cyano, nitro or halogen, R₁₆ is hydrogen, methyl, methoxy or unsubstituted, N-alkyl-substituted or N,N-dialkyl-substituted sulfonamido or carboxamido, in which each alkyl moiety has 1 or 2 carbon atoms and can be methoxy-substituted, or R₁₆ is alkylsulfone having 1 to 4 carbon atoms, phenylsulfonic acid ester, cyano, nitro, halogen, unsubstituted or methoxy-substituted carbalkoxy having 1 to 12 carbon atoms or —P(O)(OT¹)₂, in which T¹ is as defined above, R₁₇ is hydrogen, methyl, trifluoromethyl, or alkoxy having 1 to 4 carbon atoms, carbalkoxy having 2 to 9 carbon atoms or N,N-dialkyl-substituted sulfonamido or carboxamido, in which each alkyl moiety has 1 or 2 carbon atoms and can be methoxy-substituted, or R₁₇ is —NHCOT₂, in which T₂ is as defined above, or R₁₇ is methylsulfone, phenylsulfone, hydroxyl, cyano, nitro or halogen, R₁₈ is hydrogen, methyl or carbalkoxy having 2 to 7 carbon atoms and X₃, Y₃, Z₃ and W₃ are as defined above.

Further useful compounds are those of the formula

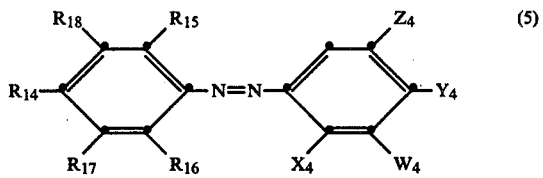

in which X₄ is hydrogen, alkyl having 1 to 4 carbon atoms, methoxy or —NL₄COM₄, in which L₄ is hydrogen or methyl and M₄ is alkyl having 1 to 13 carbon atoms, or alkoxy having 1 to 4 carbon atoms, which can both be substituted by fluorine, chlorine or carbalkoxy having 2 or 3 carbon atoms, or by phenyl or phenoxy or by (C$_{m3}$H$_{2m3+1}$)—C₆H₄— or (C$_{m3}$H$_{2m3+1}$—(—C₆H₄—O— or by alkoxy having 1 to 5 carbon atoms, m₃ being as defined above, or X₄ is alkyl-sulfonylamino having 1 to 6 carbon atoms, or hydroxyl, Y₄ is hydrogen, alkyl having 1 or 2 carbon atoms, alkoxy having 1 to 8 carbon atoms, unsubstituted or —OC₂H₄—OCH₃-substituted carbalkoxy having 2 or 3 carbon atoms or N-alkyl-substituted or N,N-dialkyl-substituted amino, in which each alkyl moiety has 1 to 6 carbon atoms and can be substituted by carbalkoxy having 2 to 5 carbon atoms, methoxy, acetoxy, hydroxyl, nitro, cyano or phenyl or Y₄ is pyrrolidinyl, piperidinyl or phenylsulfonylamino which can be substituted by alkyl having 1 to 4 carbon atoms, or Y₄ is —NE₃CO—G₄, in which E₃ is as defined above and G₄ is alkyl having 1 to 8 carbon atoms, alkoxy having 1 or 2 carbon atoms, or a radical of the formula —O—CH$_2$—CH$_2$—OC$_2$H$_4$—OC$_2$H$_5$ or —O—CH$_2$—CH$_2$—OC$_2$H$_4$—OCH$_3$, or Y$_4$ is

in which G$^3$ is as defined above, or Y$_4$ is halogen or hydroxyl, Z$_4$ is hydrogen, alkyl having 1 to 6 carbon atoms, alkoxy having 1 to 4 carbon atoms, —O(CH$_2$-)$_k$—O(CH$_2$)$_m$—CH$_3$, in which k and m are as defined above, or —NA$_4$COD$_4$, in which A$_4$ is hydrogen or methyl and D$_4$ is alkyl having 1 to 8 carbon atoms, or Z$_4$ is acetyl, carbalkoxy having 2 to 5 carbon atoms, a radical of the formula

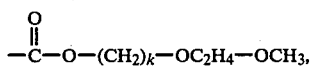

in which k is as defined above, methylsulfonylamino, halogen or the atoms which together with Y$_4$ form ring systems such as

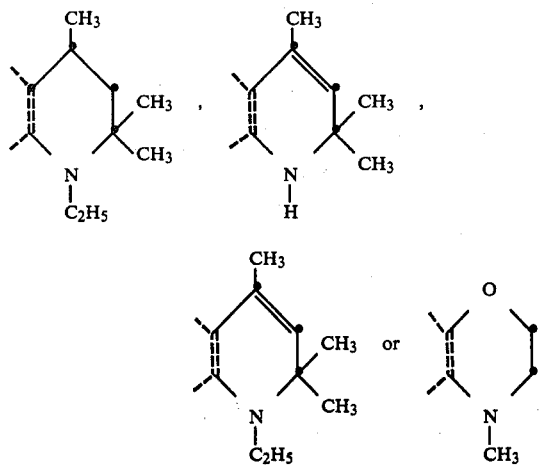

W$_4$ is hydrogen, methyl, methoxy or halogen and R$_{14}$, R$_{15}$, R$_{16}$, R$_{17}$ and R$_{18}$ are as defined above.

Valuable compounds of the formula (5) are those of the formula

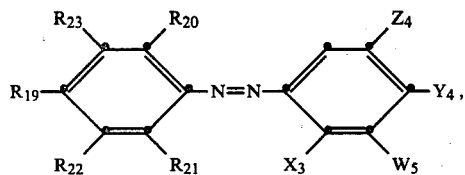

in which R$_{19}$ is hydrogen, alkyl having 1 to 6 carbon atoms which can be substituted by alkoxy having 1 to 4 carbon atoms or by carbalkoxy having 2 to 7 carbon atoms, alkoxy having 1 to 8 carbon atoms, a radical of the formula —O—(CH$_2$)$_{\overline{m3}}$OC$_2$H$_4$—OCH$_3$ or —O—(CH$_2$)$_{\overline{m3}}$OC$_2$H$_4$—OC$_2$H$_5$, in which m$_3$ is as defined above, vinyl which can be substituted by cyano and/or by carbalkoxy having 2 to 7 carbon atoms, acetyl, benzoyl which can be substituted in the para-position by chlorine, —CO$_2$B$_2$, —SO$_2$B$_2$— or —COB$_2$, in which B$_2$ is as defined above, carbalkoxy having 2 to 9 carbon atoms, a radical of the formula

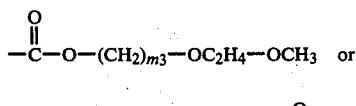

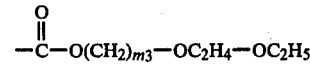

in which m$_3$ is as defined above, or —NHCOU$_4$, in which U$_4$ is alkyl having 1 to 4 carbon atoms or alkenyl having 2 or 3 carbon atoms, or R$_{19}$ is carboxamido or N-alkyl-substituted or N,N-dialkyl-substituted sulfonamido, in which each alkyl moiety has 1 to 5 carbon atoms and can be substituted by methoxy, hydroxyl or amino, or R$_{19}$ is alkyl-sulfone having 1 to 6 carbon atoms or phenylsulfone or phenylsulfonic acid ester, which two radicals can be substituted in the para-position by alkyl having 1 to 5 carbon atoms or hydroxyl, or R$_{19}$ is hydroxyl, cyano, nitro, chlorine or bromine, R$_{20}$ is hydrogen, methyl, trifluoromethyl, methoxy, ethoxy, carbalkoxy having 2 or 3 carbon atoms, a radical of the formula

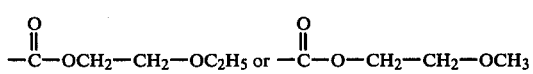

or N-alkyl-substituted or N,N-dialkyl-substituted sulfonamido or carboxamido, in which each alkyl moiety has 1 to 4 carbon atoms and can be substituted by methoxy, or R$_{20}$ is alkylsulfone having 1 to 4 carbon atoms or phenylsulfone, or R$_{20}$ is cyano, nitro, chlorine or bromine, R$_{21}$ is hydrogen, methyl, methoxy, or N-alkyl-substituted or N,N-dialkyl-substituted sulfonamido, in which each alkyl moiety has 1 or 2 carbon atoms, or R$_{21}$ is alkylsulfone having 1 to 4 carbon atoms, cyano, nitro, bromine, chlorine or unsubstituted or methoxy-substituted carbalkoxy having 2 to 7 carbon atoms, or R$_{21}$ is —P(O)(OC$_2$H$_5$)$_2$, R$_{22}$ is hydrogen, methyl, trifluoromethyl, unsubstituted or methoxy-substituted alkoxy having 1 or 2 carbon atoms, carbalkoxy having 2 to 9 carbon atoms or N,N-dialkyl-substituted sulfonamido or carboxamido, in which each alkyl moiety has 1 or 2 carbon atoms and can be substituted by methoxy, or R$_{22}$ is —NHCOT$_2$, in which T$_2$ is as defined above, or R$_{22}$ is methylsulfone, phenylsulfone, hydroxyl, cyano, chlorine or bromine, R$_{23}$ is hydrogen, methyl or carbalkoxy having 2 or 3 carbon atoms, X$_5$ is hydrogen, alkyl having 1 to 4 carbon atoms, methoxy or —NL$_5$—COM$_5$, in which L$_5$ is hydrogen and M$_5$ is alkyl having 1 to 8 carbon atoms, or alkoxy having 1 or 2 carbon atoms, which radicals can be substituted by fluorine, chlorine, carbalkoxy having 2 or 3 carbon atoms, phenyl, para-(C$_{m3}$H$_{2m3+1}$)—C$_6$H$_4$—, phenoxy, para-(C$_{m3}$H$_{2m3+1}$)—C$_6$H$_4$—O— or alkoxy having 1 to 5 carbon atoms, m$_3$ being as defined above, or X$_5$ is alkylsulfonylamino having 1 to 6 carbon atoms, or hydroxyl, W$_5$ is hydrogen, methyl, methoxy or chlorine and Y$_4$ and Z$_4$ are as defined above.

Particularly useful compounds are those of the formula

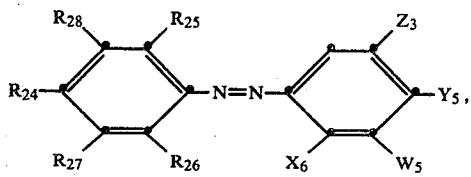 (7)

in which $R_{24}$ is hydrogen or alkyl having 1 to 4 carbon atoms, which can be substituted by carbalkoxy having 2 to 7 carbon atoms, or $R_{24}$ is alkoxy having 1 to 4 carbon atoms, a radical of the formula —O—$(CH_2)_k$—$OC_2H_4$—$OCH_3$ or —O—$(CH_2)_k$—$OC_2H_4$—$OC_2H_5$, in which k is as defined above, carbalkoxy having 2 to 9 carbon atoms, a radical of the formula

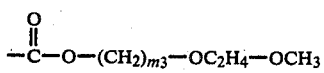

in which $m_3$ is as defined above, —$NHCOU_4$, in which $U_4$ is as defined above, carboxamido or N-alkyl-substituted or N,N-dialkyl-substituted sulfonamido, in which each alkyl moiety has 1 or 2 carbon atoms and can be substituted by methoxy, or $R_{24}$ is alkyl-sulfone having 1 to 6 carbon atoms or is phenylsulfone or phenylsulfonic acid ester, each of which two radicals can be substituted in the para-position by alkyl having 1 to 5 carbon atoms or hydroxyl, or $R_{24}$ is hydroxyl, nitro, chlorine or bromine, $R_{25}$ is hydrogen, methyl, methoxy, ethoxy, carbalkoxy having 2 or 3 carbon atoms, a radical of the formula

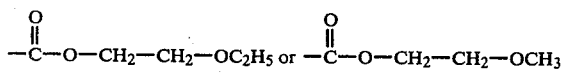

or N-alkyl-substituted or N,N-dialkyl-substituted sulfonamido or carboxamido, in which each alkyl moiety has 1 or 2 carbon atoms and can be substituted by methoxy, or $R_{25}$ is alkylsulfone having 1 to 4 carbon atoms or phenoxy which can be substituted in the para-position by alkyl having 1 to 5 carbon atoms, or $R_{25}$ is cyano, nitro, chlorine or bromine, $R_{26}$ is hydrogen, cyano, chlorine or bromine, $R_{27}$ is hydrogen or alkoxy having 1 or 2 carbon atoms, or $R_{27}$ is carbalkoxy having 2 to 9 carbon atoms, —$NHCOT_2$, in which $T_2$ is as defined above, hydroxyl or chlorine, $R_{28}$ is hydrogen or carbalkoxy having 2 or 3 carbon atoms, $X_6$ is hydrogen, alkyl having 1 to 4 carbon atoms, methoxy or —NHCOM$_6$, in which $M_6$ is alkyl having 1 to 4 carbon atoms which is optionally substituted by alkoxy having 1 to 5 carbon atoms, by phenoxy or by para-$(C_kH_{2k+1})$—$C_6H_4$—O—, k being as defined above, or $X_6$ is hydroxyl, $Y_5$ is hydrogen, alkoxy having 1 to 4 carbon atoms, unsubstituted or —$OC_2H_4$—$OCH_3$-substituted carbalkoxy having 2 or 3 carbon atoms or N-alkyl-substituted or N,N-dialkyl-substituted amino, in which each alkyl moiety has 1 to 4 carbon atoms and can be substituted by carbalkoxy having 2 or 2 carbon atoms, methoxy, acetoxy, hydroxyl, nitro, cyano or phenyl, or $Y_5$ is —$NE_3COG_4$, in which $E_3$ and $G_4$ are as defined above, or $Y_5$ is hydroxyl, $Z_5$ is hydrogen, alkyl having 1 to 6 carbon atoms, alkoxy having 1 to 4 carbon atoms, acetyl, carbalkoxy having 2 to 5 carbon atoms, a radical of the formula

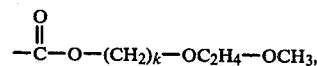

in which k is as defined above, —$NA_4COD_4$, in which $A_4$ and $D_4$ are as defined above, or chlorine, and $W_5$ is as defined above.

Particularly suitable compounds are those of the formula

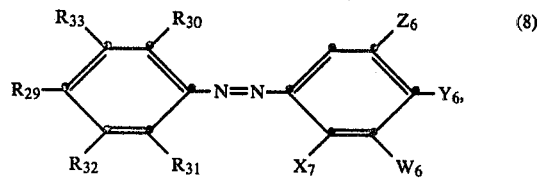 (8)

in which $R_{29}$ is hydrogen, alkyl having 1 to 4 carbon atoms, alkoxy having 1 to 4 carbon atoms, carbalkoxy having 2 to 9 carbon atoms or a radical of the formula

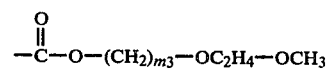

in which $m_3$ is as defined above, $R_{30}$ is hydrogen, methyl, methoxy, cyano, chlorine or bromine, $R_{31}$ is hydrogen or bromine, $R_{32}$ is hydrogen or chlorine, $R_{33}$ is hydrogen or carbomethoxy, $X_7$ is

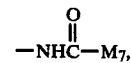

in which $M_7$ is alkyl having 1 to 4 carbon atoms, or $X_7$ is hydroxyl, $Y_6$ is hydrogen, N-alkyl-substituted amino, in which the alkyl moiety has 1 or 2 carbon atoms and can be cyano-substituted, or —$NE_3COG_4$, in which $E_3$ and $G_4$ are as defined above, $Z_6$ is hydrogen or alkoxy having 1 to 4 carbon atoms and $W_6$ is hydrogen or methyl.

Particularly valuable compounds are those of the formulae

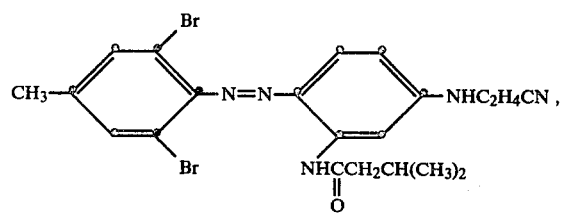 (9)

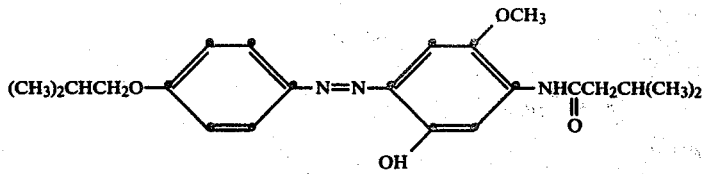

(10)

and

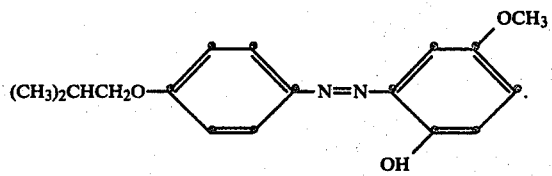

(11)

The compounds of the formulae (7) to (11) are particularly suitable for use as yellow dyes in photographic layers of silver dye bleach materials.

Other preferred compounds are those of the formula

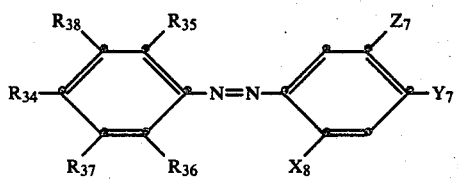

(12)

in which $R_{34}$ is hydrogen or alkyl having 1 or 2 carbon atoms, which can be substituted by carbalkoxy having 2 or 3 carbon atoms, or is carbalkoxy having 2 or 3 carbon atoms, a radical of the formula

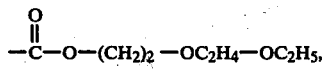

or vinyl which can be substituted by cyano and/or carbalkoxy having 2 to 5 carbon atoms, or $R_{34}$ is N-alkyl-substituted or N,N-dialkyl-substituted sulfonamido, in which each alkyl moiety has 1 to 3 carbon atoms and can be methoxy-substituted, alkylsulfone having 1 to 6 carbon atoms, phenylsulfonic acid ester, para-$(C_{m3}H_{2m3+1})$—$C_6H_4$—O—$SO_2$—, in which $m_3$ is as defined above, cyano, nitro, chlorine or bromine, $R_{35}$ is hydrogen, trifluoromethyl, carbalkoxy having 2 or 3 carbon atoms, alkylsulfone having 1 to 4 carbon atoms, N-alkyl-substituted or N,N-dialkyl-substituted sulfonamido, in which each alkyl moiety has 1 to 4 carbon atoms and can be methoxy-substituted, cyano, nitro, chlorine or bromine, $R_{36}$ is hydrogen, methylsulfone, N,N-diethylsulfonamide, cyano, nitro, chlorine or bromine, $R_{37}$ is hydrogen, methyl, carbalkoxy having 2 to 7 carbon atoms, N,N-dialkyl-substituted sulfonamido or carboxamido, in which each alkyl moiety has 1 or 2 carbon atoms and can be methoxy-substituted, cyano or chlorine, $R_{38}$ is hydrogen or methyl, $X_8$ is hydrogen, methyl or —$NHCOM_7$, in which $M_7$ is alkyl having 1 to 8 carbon atoms which is unsubstituted or substituted by carbalkoxy having 2 or 3 carbon atoms, fluorine, chlorine, phenyl, phenoxy, para-$(C_{m3}H_{2m3+})$—$C_6H_4$— or para-$(C_{m3}H_{2m3+1})$—$C_6H_4O$—, or $X_8$ is alkylsulfonylamino having 1 to 6 carbon atoms, or hydroxyl, $Y_7$ is alkyl having 1 or 2 carbon atoms, alkoxy having 1 to 8 carbon atoms, unsubstituted or —$OC_2H_4$—$OCH_3$-substituted carbalkoxy having 2 or 3 carbon atoms, or N-alkyl-substituted or N,N-dialkyl-substituted amino, in which each alkyl moiety has 1 to 4 carbon atoms and can be substituted by methoxy, carbomethoxy, acetoxy, cyano, hydroxyl or phenyl, or $Y_7$ is —$NHCOG_5$, in which $G_5$ is alkyl having 1 to 4 carbon atoms, and $Z_7$ is hydrogen, alkoxy having 1 or 2 carbon atoms, a radical of the formula —$OCH_2CH_2$—$O(CH_2)_m$—$CH_3$, in which m is as defined above, —$NHCOD_4$, in which $D_4$ is as defined above, or chlorine.

Further useful compounds are those of the formula

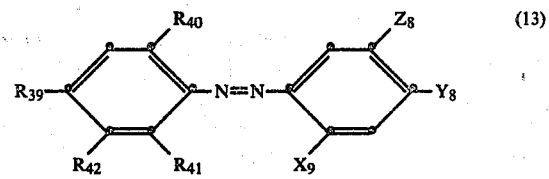

(13)

in which $R_{39}$ is hydrogen or alkyl having 1 or 2 carbon atoms, which can be substituted by carbalkoxy having 2 or 3 carbon atoms, or $R_{39}$ is carbalkoxy having 2 or 3 carbon atoms, alkylsulfone having 1 to 6 carbon atoms, N-alkyl-substituted or N,N-dialkyl-substituted sulfonamido, in which each alkyl moiety has 1 to 3 carbon atoms and can be methoxy-substituted, cyano, nitro, chlorine or bromine, $R_{40}$ is hydrogen, alkylsulfone having 1 to 4 carbon atoms, N,N-dimethylsulfonamide or N,N-diethylsulfonamide, cyano or nitro, $R_{41}$ is hydrogen, methylsulfone, cyano or nitro, $R_{42}$ is hydrogen or cyano, $X_9$ is methyl or

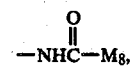

in which $M_8$ is alkyl having 1 to 4 carbon atoms, or $X_9$ is hydroxyl, $Y_8$ is alkoxy having 1 to 8 carbon atoms or N-alkyl-substituted or N,N-dialkyl-substituted amino, in which each alkyl moiety has 1 to 4 carbon atoms and can be substituted by methoxy, acetoxy or cyano, and $Z_8$ is hydrogen, alkoxy having 1 or 2 carbon atoms, a radical of the formula —$OCH_2CH_2$—$O(CH_2)_m$—$CH_3$, in which m is as defined above, or —$NHCOD_4$, in which $D_4$ is as defined above.

Particularly valuable compounds of the formula (13) are the compounds of the formulae

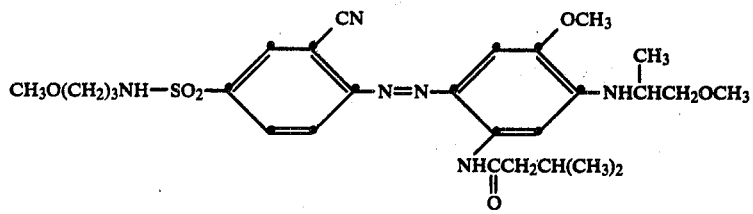 (14)

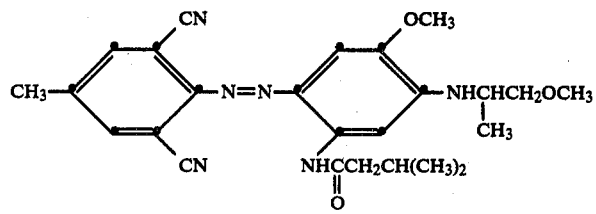 (15)

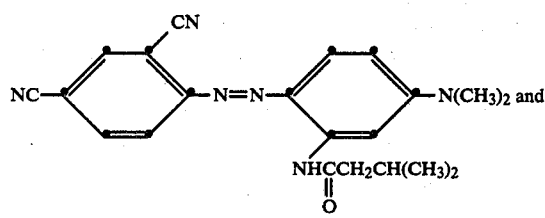 (16)

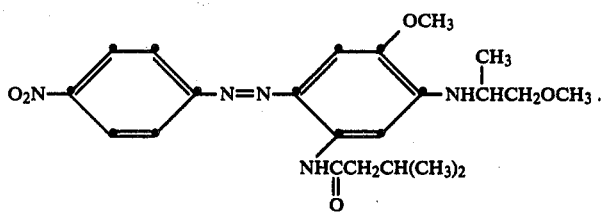 (17)

The compounds of the formulae (14) to (17) are particularly useful as magenta dyes in photographic layers of silver dye bleach materials.

Further preferred compounds are those of the formula

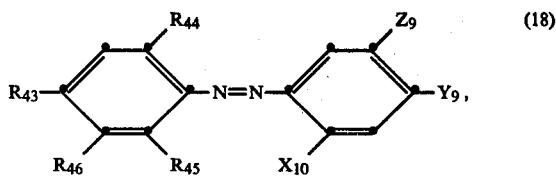 (18)

in which $R_{43}$ is vinyl which can be substituted by cyano and/or carbalkoxy having 2 to 7 carbon atoms, or $R_{43}$ is carbalkoxy having 2 or 3 carbon atoms, N-alkyl-substituted or N,N-dialkyl-substituted sulfonamido, in which each alkyl moiety has 1 to 5 carbon atoms and can be methoxy-, amino- or hydroxyl-substituted, alkylsulfone having 1 to 6 carbon atoms, phenylsulfonic acid ester, para-$(C_{m_3}H_{2m_3+1})$—$C_6H_4$—O—$SO_2$—, in which $m_3$ is as defined above, cyano or nitro, $R_{44}$ is N,N-dimethylsulfonamido or N,N-diethylsulfonamido, cyano, nitro, chlorine or bromine, methylsulfone or trifluoromethyl, $R_{45}$ is hydrogen, cyano, nitro, chlorine or bromine, $R_{46}$ is hydrogen or carbalkoxy having 2 to 6 carbon atoms, $X_{10}$ is methyl,

in which $M_5$ is as defined above, or alkylsulfonamido having 1 to 6 carbon atoms, $Y_9$ is unsubstituted or —$OC_2H_4$—$OCH_3$-substituted carbalkoxy having 2 or 3 carbon atoms or N-alkyl-substituted or N,N-dialkyl-substituted amino, in which each alkyl moiety has 1 to 4 carbon atoms and can be substituted by methoxy, acetoxy, cyano, hydroxyl, or phenyl, and $Z_9$ is hydrogen, methoxy, —$OCH_2$—$CH_2$—$OC_2H_5$ or —$OCH_2CH_2$—$OCH_3$.

Amongst these, particularly useful compounds are those of the formula

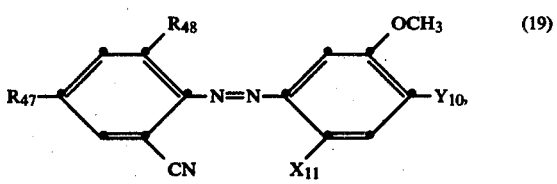 (19)

in which $R_{47}$ is vinyl which can be substituted by cyano and/or carbalkoxy having 2 or 3 carbon atoms, or $R_{47}$ is N-alkyl-substituted or N,N-dialkyl-substituted sulfonamido, in which each alkyl moiety has 1 or 2 carbon atoms and can be methoxy-substituted, cyano or nitro, $R_{48}$ is cyano or trifluoromethyl or nitro, $X_{11}$ is

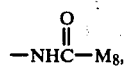

in which $M_8$ is as defined above, and $Y_{10}$ is dimethylamino or diethylamino.

Valuable compounds include those of the formulae

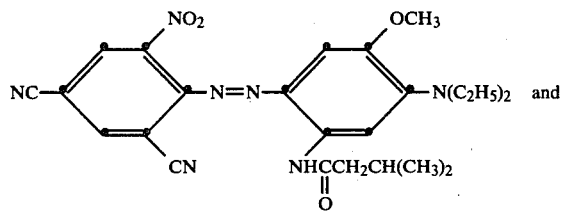

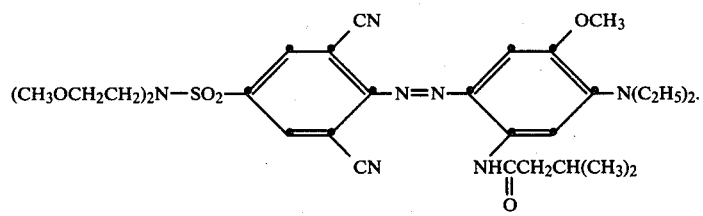

The compounds of the formulae (20) and (21) are particularly useful as cyan dyes in photographic layers of silver dye bleach materials.

The compounds of the formula (1) to (21), dissolved in oil, exhibit a plurality of advantages.

Thus, they are distinguished by high stability of their emulsions. The tendency to micelle formation is entirely absent, and accordingly there is no adverse influence on the colour density of the photographic images.

The oil serves not only as a solvent for the dyes, but can also be a plasticiser for the gelatin. This substantially prevents the possible detachment, which can in particular occur under moist conditions of the photographic layers from the base.

As a result of the good solubility of the dyes in oil, a large amount of dye can be accommodated in one small drop of oil. Accordingly, photographic materials can be cast with very thin layers. This has a beneficial influence on the sharpness of the image.

Because of their insolubility in water, the dyes can be isolated in a very pure form. They are prepared by conventional methods, for example by diazotising an amine of the formula

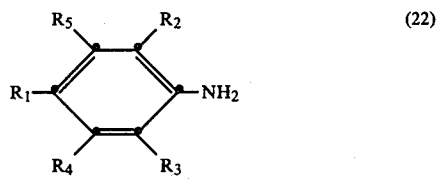

in which $R_1$, $R_2$, $R_3$, $R_4$ and $R_5$ are as defined above, in a conventional manner, in the presence or absence of an organic solvent, and coupling the product with a coupling component of the formula

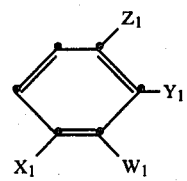

in which $X_1$, $Y_1$, $Z_1$ and $W_1$ are as defined above, in the presence or absence of an organic solvent and in the presence or absence of a base.

When preparing an azo dye of the formula (1), in which the substituent $R_2$ and $R_3$ is cyano, it is advantageous to introduce the cyano group by an exchange reaction with the corresponding halogen-containing compound.

If $R_2$ and $R_3$ in formula (1) are alkylsulfone, it is also possible to prepare the corresponding azo compounds from the halogen-containing compound by reacting the latter with a suitable sulfinate, in the presence or absence of $Cu^+$.

Examples of diazo components of the formula (22) are 4-ethylaniline, 4-dodecylaniline, 2-, 3- or 4-toluidine, 2-, 3- or 4-anisidine, 4-phenetidine, 4-butylaniline, 2-, 3- or 4-fluoroaniline, 2-, 3- or 4-chloroaniline, 2-, 3- or 4-bromoaniline, 2-, 3- or 4-trifluoromethylaniline, methyl anthranilate, ethyl anthranilate, 2'-methoxyethyl anthranilate, ethyl 4-aminobenzoate or 2'-ethylhexyl 4-aminobenzoate, 3',6'-dioxaheptyl 4-aminobenzoate, methyl 3-aminobenzoate, phenyl 4-aminobenzoate, anthranilic acid N,N-bis-(2'-methoxyethyl)-amide, 4'-aminobenzanilide, 4-amino-diphenyl ether, 4-aminobenzaldehyde, 2-, 3- or 4-amino-acetophenone, 4-aminobenzophenone, 4-amino-4'-hydroxydiphenylsulfone, 2-, 3- or 4-aminophenyl methyl sulfone, diethyl 2-aminophenylphosphonate, 2-, 3- or 4-methylmercaptoaniline, 4-phenylmercaptoaniline, 4-aminophenyl hexyl sulfone, 4-aminophenyl isobutyl sulfone, isobutyl p-aminophenylacetate, 4-aminobenzenesulfonic acid N-dodecylamide, 4-aminophenyl 3',6'-dioxaheptyl ether, 4-amino-4'-nitrobenzophenone, 4-isobutoxyaniline, 4-butoxyaniline, 4-aminobenzenesulfonic acid N,N-diisopropylamide, 4-aminobenzenesulfonic acid N,N-bis-(2'-methoxyethyl)-amide, 4-aminobenzenesulfonic acid 3'-methoxypropylamide, phenyl 4-aminobenzenesulfonate, 4'-t-pentyl-phenyl 4-aminobenzenesulfonate, 4-aminobenzenesulfonic acid N,N-diethylamide, 3-benzoylamino-4-nitroaniline, isobutyl 4-aminobenzoate, 4-benzoylamino-3-nitroaniline, dibutyl 4-aminophthalate, methyl 4-aminocinnamate, ethyl 4-aminocinnamate, bis-(2'-ethylhexyl) 4-aminophthalate, 3-methyl-4-nitroaniline, 4-butylaniline, 4-cyclopropylaniline, 3-fluoro-4-nitroaniline, methyl 3-amino-4-chlorobenzoate, ethyl 3-amino-4-chlorobenzoate, 2-methyl-5-methylmercapto-4-nitroaniline, 3-methoxy-4-nitroaniline, 2-methoxy-5-chloroaniline, 3-methylmercapto-4-nitroaniline, 4-methyl-3-chloroaniline, 4-methylmercapto-3-nitroaniline, 4-amino-3-chlorophenyl methyl sulfone, ethyl 5-amino-4-bromo-2-carbamoyl-benzoate, 4-amino-5-bromobenzene-1,3-disulfonic acid bis-N,N-diethylamide, 4-amino-3,5-dibromobenzenesulfonic acid N,N-(bis-2'-methoxyethyl)-amide, 3,4-bis-(2'-methoxyethoxy)-aniline, 2,4-bis-isobutylsulfonyl-aniline, 2,5-dibromo-4-butoxyaniline, 4-amino-3,5-dibromophenyl isopentyl ether, 4-isobutoxy-2-methoxyaniline, 3-bromo-4-butoxy-aniline, dimethyl 5-amino-2,4,6-tribromoisophthalate, ethyl 3-amino-2,4,6-tribromobenzoate, 2-amino-5-nitrobenzoic acid N-piperidide, 2-amino-5-nitrobenzoic acid N-pyrrolidide, 2-amino-5-nitrobenzoic acid N-morpholide, 4-amino-3-bromo-5-methyl-benzenesulfonic acid N-morpholide, 3-amino-4-chlorobenzotrifluoride, 5-amino-2-chlorobenzotrifluoride, ethyl 4-amino-3-methyl-benzoate, ethyl 3-amino-4-methyl-benzoate, 4-bromo-2,6-dimethylaniline, 4-bromo-2-methylaniline, 4-bromo-3-methylaniline, 2-bromo-4-methylaniline, 5-chloro-2,4-dimethoxyaniline, 4-chloro-2-methylaniline, 2-chloro-6-methylaniline, 2-methoxy-5-methylaniline, 4-methoxy-2-methylaniline, 2-methoxy-5-nitroaniline, 4-methoxy-2-nitroaniline, 2-methyl-3-, -4-, -5- or -6-nitroaniline, 4-methyl-2- or -3-nitroaniline, 2,3,4-, 2,4,5-, 2,4,6- or 3,4,5-trichloroaniline, 3,4,5-trimethoxyaniline, 2,4,6-trimethylaniline, 3,5-bis-trifluoromethyl-aniline, 2,6-difluoroaniline, 4-aminomethacrylanilide, 2'-, 3'- or 4'-amino-phenyl methanesulfonate, 2'-, 3'- or 4'-aminophenyl toluenesulphonate, 4-amino-3,5-dibromo-acetanilide, 4-chloro-3-nitroaniline, 3-chloro-6-nitroaniline, N,N-bis-(2'-methoxyethyl)-anthranilamide, 2-acetamido-5-aminobenzonitrile, 3-amino-4-methylmercapto-benzenesulfonic acid N,N-bis-(2'-methoxyethyl)-amide, 2-, 3- or 4-aminobenzonitrile, 2-amino-4-, -5- or -6-chlorobenzonitrile, 2-amino-3,5-dibromo-benzonitrile, 2-chloro-4-methoxyaniline, 2-chloro-5-methoxyaniline, 4-[4'-terpentylphenoxy]-aniline, 2,5-dimethoxy-4-nitroaniline, 4-chloro-3-aminobenzoic acid N-hexylamide, 4-(2'-methoxyethoxy)-anilide, 2-methoxy-5-(t-butyl)-aniline, 3-nitro-4-methoxy-aniline, 4-methoxy-2-nitro-aniline, 5-amino-2-methoxy-butyranilide, 3-methoxy-4-nitro-aniline, 3-amino-4-methoxypropionanilide, 2'-ethyl-hexyl 3-amino-4-methylsulfonyl-benzoate, ethyl 4-amino-3,5-dibromobenzoate, 4-amino-3,5-dibromo-toluidine, 4-amino-3,5-dibromochlorobenzene, 4-amino-3,5-dibromo-ethylbenzene, 4-amino-3,5-dibromo-fluorobenzene, 2,4,6-tribromoaniline, 4-amino-3,5-dibromo-phenetidine, methyl 3-[4'-amino-3',5'-dibromophenyl]-propionate, ethyl 3-[4'-amino-3',5'-dibromophenyl]-propionate, 2'-methyl-pentyl-3-[4'-amino-3',5'-dibromophenyl]-propionate, 2-amino-3-bromo-5-nitro-benzotrifluoride, 2-amino-3-bromo-5-nitrophenyl methyl sulfone, 2-amino-3-bromo-5-nitro-benzonitrile, 3-[4'-amino-3',5'-dibromophenyl]-propionitrile, 2'-ethylhexyl 3-amino-4-methylsulfonylbenzoate, 3,4-bis-(2'-methoxyethoxy)-aniline, 5-acetamido-2-methoxyaniline, 4-amino-3,5-dibromophenyl methyl sulfone, 4-amino-3,5-dibromo-benzonitrile, 2-amino-4-chlorobenzenesulfonic acid N-isobutylamide, ethyl 4-amino-2-hydroxybenzoate, dimethyl 2-aminoterephthalate, diethyl 5-amino-isophthalate, 4-amino-3,5-dibromobenzenesulfonamide, dimethyl 4-amino-isophthalate, ethyl 4-amino-3-methoxy-benzoate, ethyl 3-amino-4-methoxy-benzoate, ethyl 4-amino-3-nitro-benzoate, ethyl 5-amino-2-hydroxybenzoate, 4-amino-3-bromophenyl hexyl sulfone, 4-hexylmercaptoaniline, 4-dodecyloxyaniline, 4-amino-3-methylphenyl octyl ether, ethyl 4-amino-cinnamate, 4-amino-cinnamonitrile, 2-nitro-3,5-dimethylaniline, 2'-methylpentyl 4-amino-hydrocinnamate, ethyl 3-amino-4-cyanobenzoate or 3',6'-dioxaheptyl 3-amino-4-cyanobenzoate, dodecyl 4-aminophenylacetate, isobutyl 4-aminophenylacetate, 4-aminobenzenesulphonic acid N-dodecylamide or N,N-bis-(2'-hydroxypropyl)-amide, 4-amino-3,5-dibromobenzotrifluoride, 4-amino-3,5-dibromobenzenesulfonic acid N-(3'-diethylamino-2'-methyl-butyl)-amide or N,N'-diethylamide, 3',6'-dioxaoctyl 4-amino-3,5-dibromobenzoate, 4-amino-3,5-dibromobenzaldehyde, 4-aminobenzoic acid N-(3'-methoxypropyl)-amide, 3',6'-dioxaheptyl 5-amino-4-bromo-2-cyanobenzoate, 3-[4'-aminophenyl]-2-chloroprioponitrile, 2',4'-di-tert.pentyl-phenyl sulfanilate, methyl 4-amino-hydrocinnamate, ethyl 4-amino-hydrocinnamate, 3,4-dimethoxyaniline, 3,4-diethoxyaniline, ethyl 4-amino-3,5-dibromophenylacetate, 4-amino-3,5-dibromohydrocinnamonitrile, 4-amino-3,5-dibromoacetophenone, 2,3-, 2,4-, 2,5-, 2,6-, 3,4- or 3,5-dimethylaniline, 2-, 3- or 4-nitroaniline, 4-aminobenzene-1,3-disulfonic acid bis-N,N'-diethylamide, 2,6-diethylaniline, 4-dodecylaniline, 4-butylaniline, 4-t.-butylaniline, 2,4-, 2,5-, 3,5- or 3,4-dimethoxyaniline, 2,4-bis-(4'-tert.-pentylphenoxy)-aniline, 4-(2'-ethyl-hexyloxy)-aniline, 2,4-, 2,5- or 2,6-dibromoaniline, 2,3-, 2,4-, 2,5-, 2,6-, 3,4- or 3,5-dichloroaniline, methyl, ethyl, butyl, benzyl, pentyl, 2'-methoxyethyl or 2'-ethoxyethyl 3-aminobenzoate, 3-aminobenzoic acid butylamide, 3-methoxypropylamide, diethylamide or pyrrolidide, 4-aminophthalic acid N-3'-methoxypropyl-imide, 3- or 4-aminoacetanilide, ethyl 3-aminobenzoate, isobutyl 3-aminobenzoate, ethyl 2-amino-5-nitrobenzoate, 3',6'-dioxaoctyl 2-amino-5-nitrobenzoate, 4-butyl-2,6-dibromoaniline, methyl 3-amino-2,4-dibromo-6-nitrobenzoate, 2-chloro-4,6-dinitroaniline, 2-bromo-4,6-dinitroaniline, isopentyl 4-amino-3,5-dibromobenzophenone-4'-carboxylate, 2,6-dibromo-4-nitroaniline, 4-amino-2-ethoxy-3,5-dibromo-toluene, ethyl 4-amino-3-bromo-5-nitrobenzoate, 2-bromo-6-methyl-4-nitroaniline, 4-amino-3,5-dibromophenyl hexyl sulfone, 4-amino-3,5-dibromobenzenesulfonic acid N-(3'-methoxypropyl)-amide, 4-amino-3,5-dibromobenzenesulfonic acid N-(3'-butoxypropyl)-amide, 2-bromo-4,6-diisobutylsulfonyl-aniline, 4-amino-5-bromobenzene-1,3-disulfonic acid bis-N,N'-diethylamide, 2-amino-3-bromo-5-nitrobenzenesulfonic acid 3'-methoxypropylamide, 4-amino-3,5-dibromo-benzotrifluoride, 3-amino-2,5-dibromo-6-nitrobenzotrifluoride, 4-amino-3-bromo-4'-chloro-5-nitrobenzophenone, methyl 4-amino-3,5-dibromocinnamate, ethyl 4-amino-3,5-dibromocinnamate, 3-(4'-amino-3',5'-dibromophenyl)-2,3-dicyanoacrylonitrile, ethyl 3-(4'-amino-3',5'-dibromophenyl)-2-cyanoacrylate, butyl 3-(4'-amino-3',5'-dibromophenyl)-2-cyanoacrylate, 3-(4'-amino-3',5'-dibromophenyl)-2-cyanoacrylonitrile, ethyl 4-amino-3-bromo-5-nitrobenzoate, 2-amino-3-bromo-5-nitro-benzonitrile, 2,4- or 2,6-dinitroaniline, 4-amino-3,5-dibromoacetophenone, 2,4- or 2,5-dicyanoaniline, 5-amino-4-bromo-2-nitrophenyl methyl sulfone, 2-amino-3-bromo-5-nitrobenzenesulfonic acid N,N-dimethylamide, 2,6-dicyano-4-nitroaniline, 2,6-dicyano-3,5-dimethylaniline, 2,6-dibromo-3-methyl-4-nitroaniline, isobutyl 3-amino-2,4-dibromo-6-nitro-benzoate, methyl 3-amino-2,4-dibromo-6-nitro-benzoate, 3-amino-2,4-dibromo-6-nitrophenyl isobutyl sulfone and 4-amino-3,5-dibromo-2-nitrophenyl isobutyl sulfone.
Suitable coupling components of the formula (23) include the following:
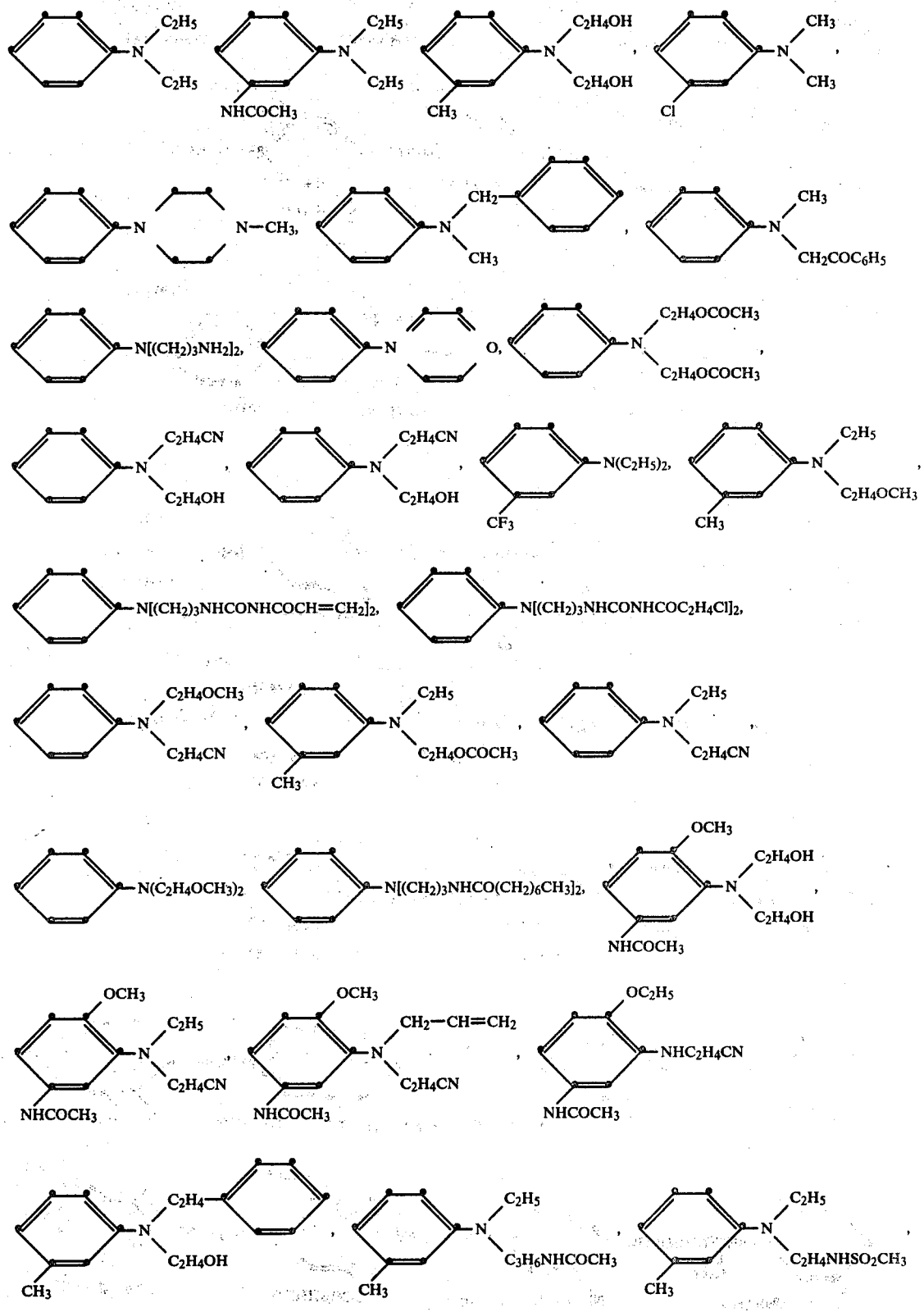

-continued
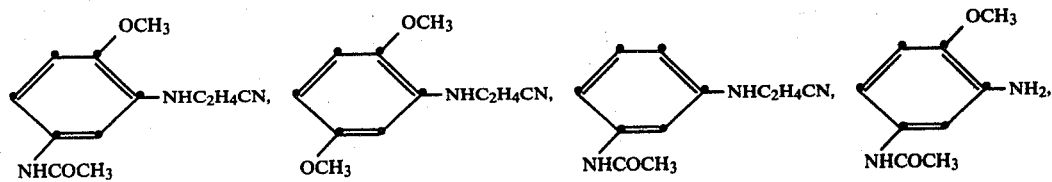
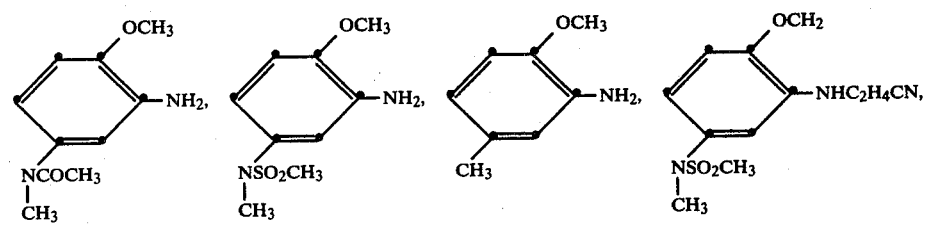
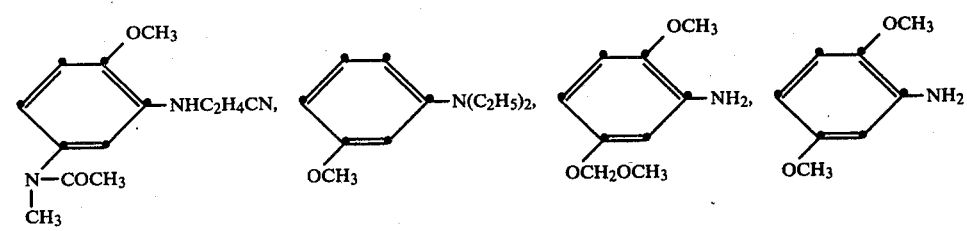
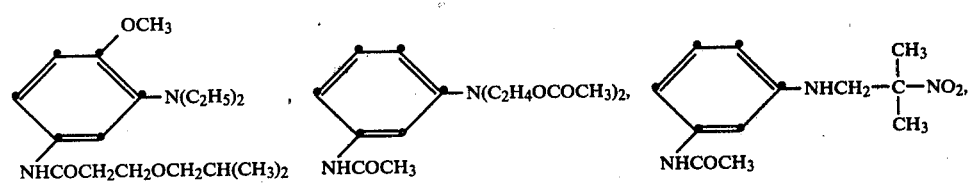
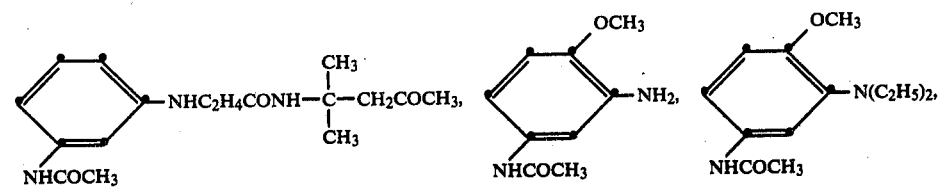
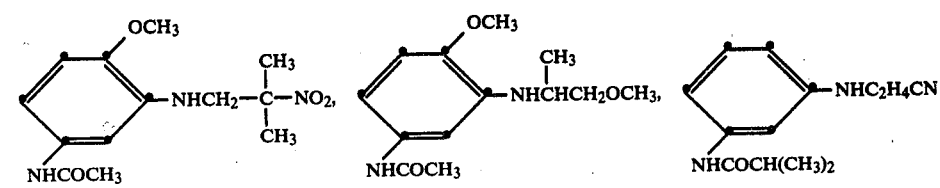
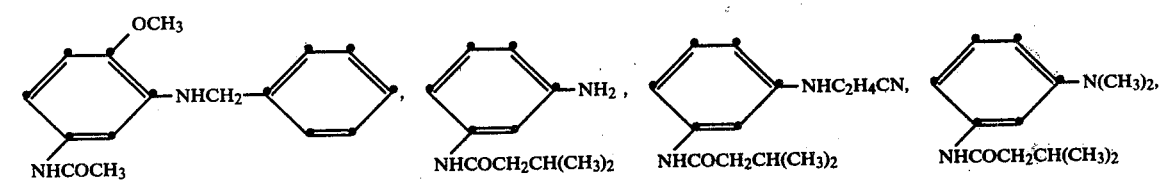
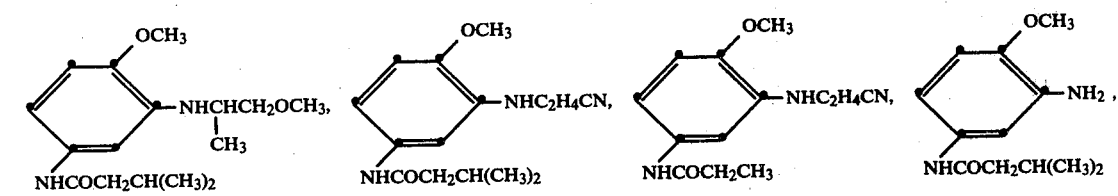

-continued
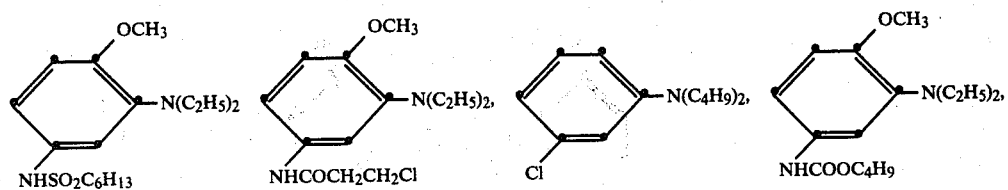
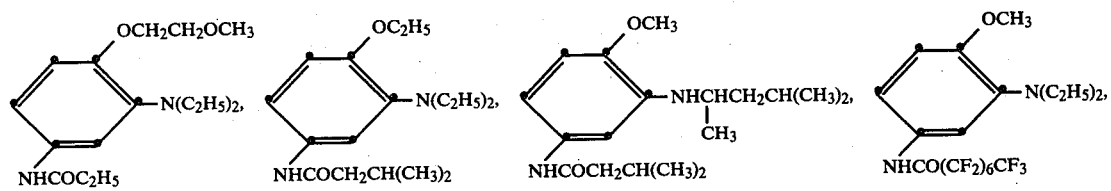
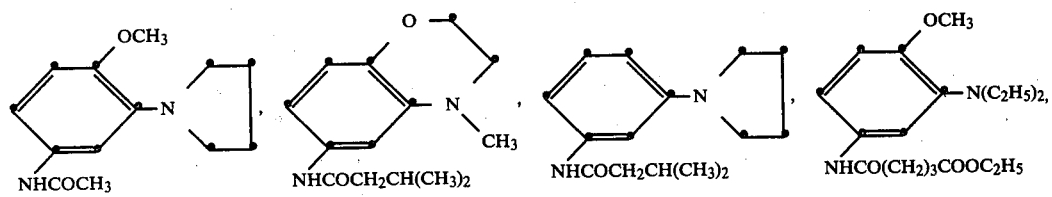
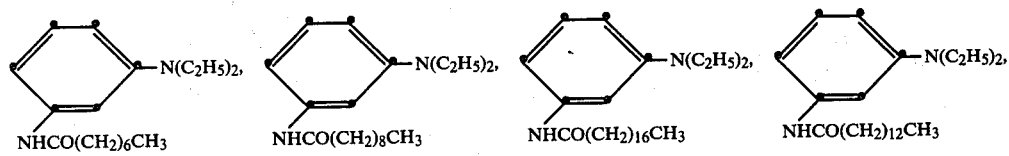
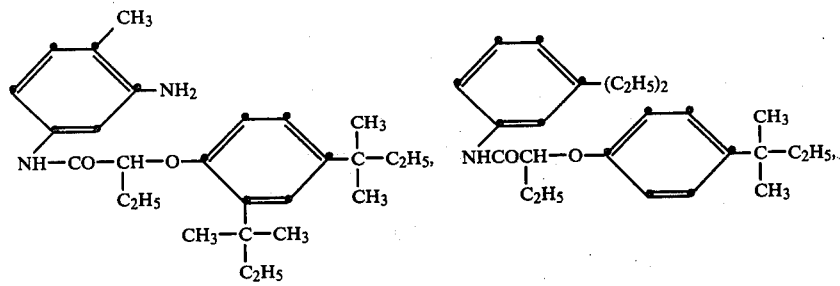
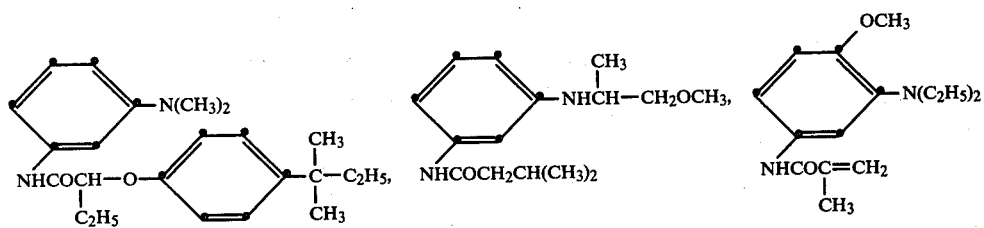
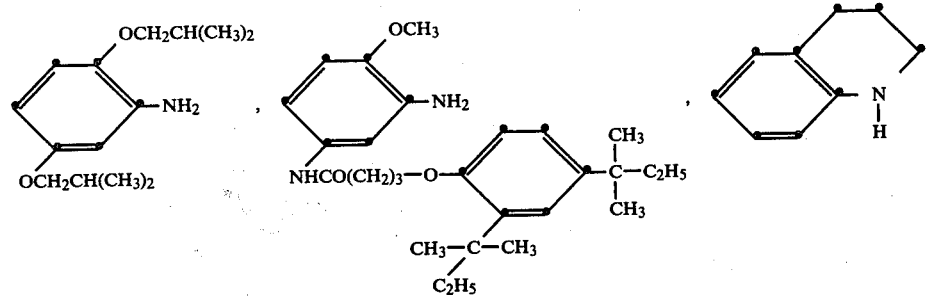

-continued
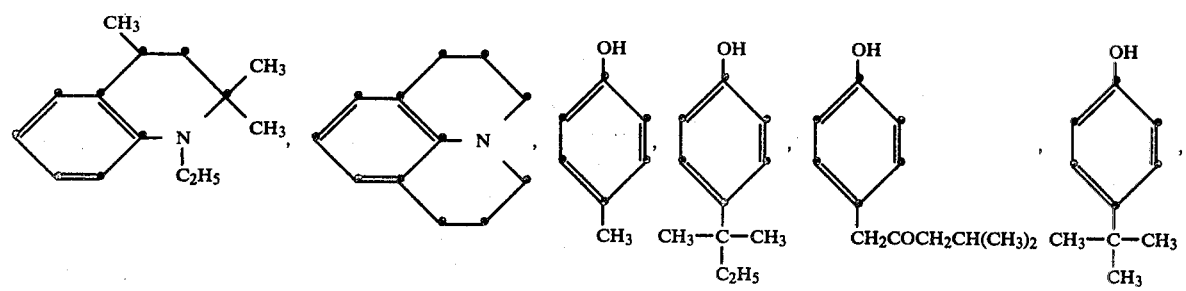
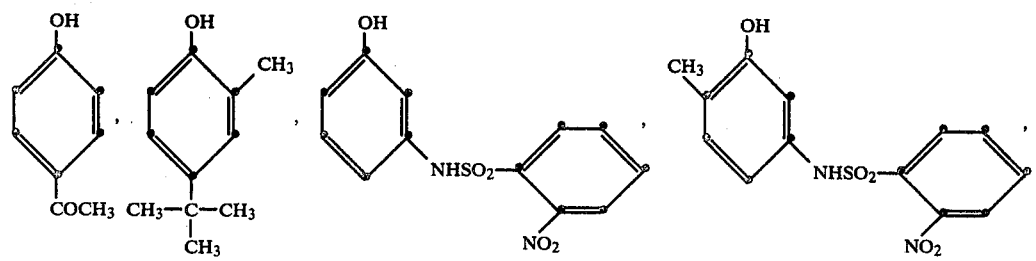
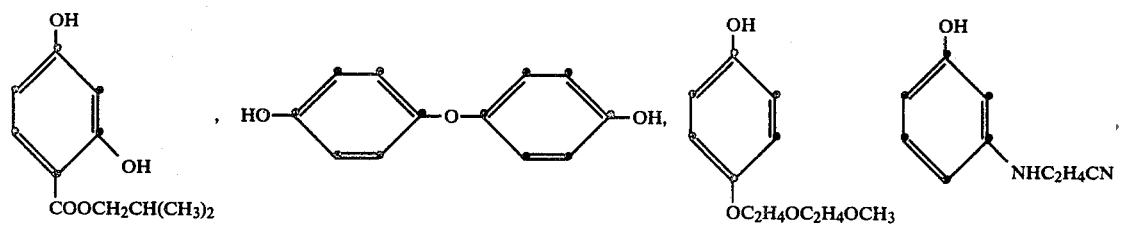
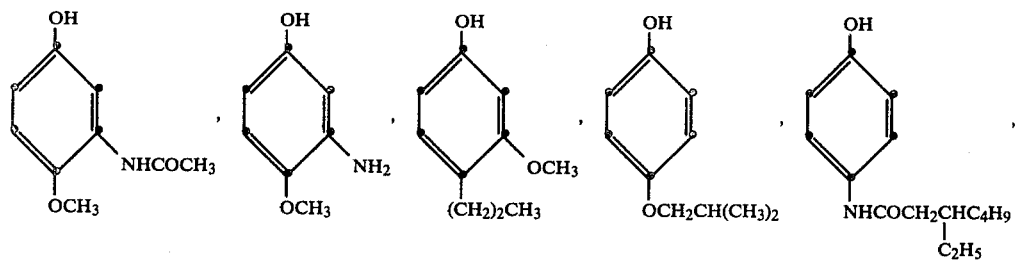
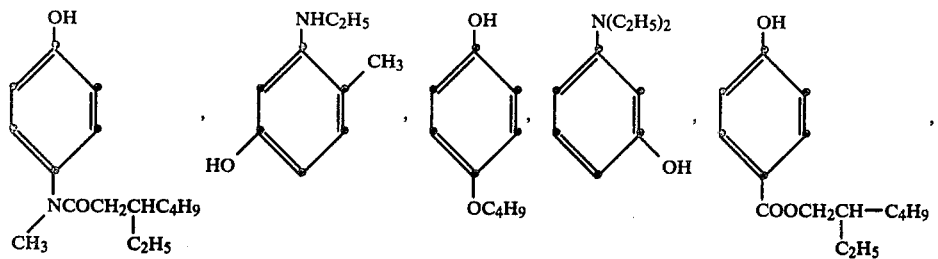
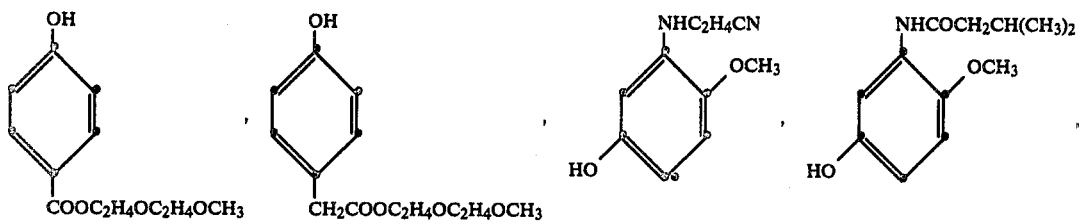

-continued
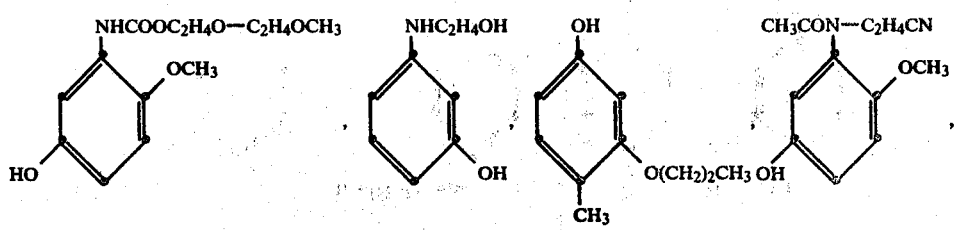
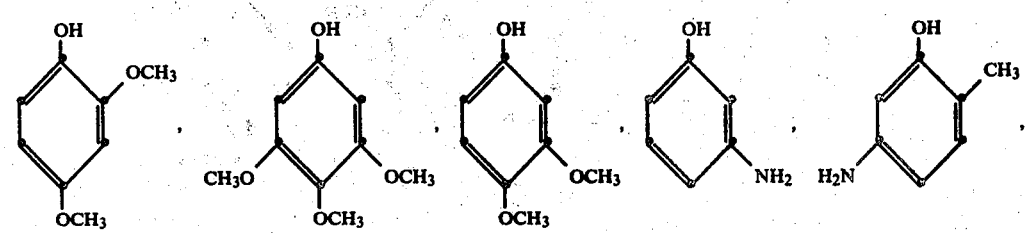
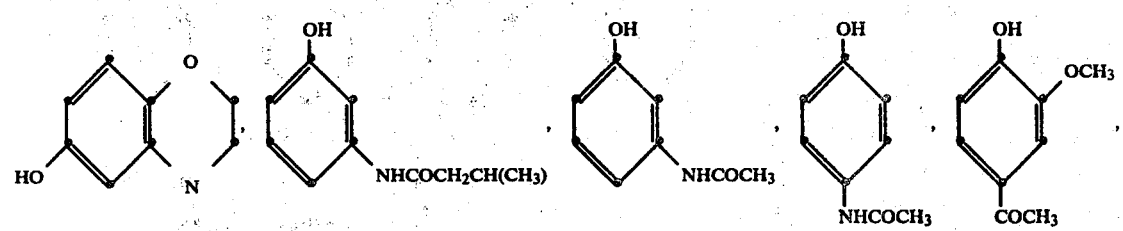
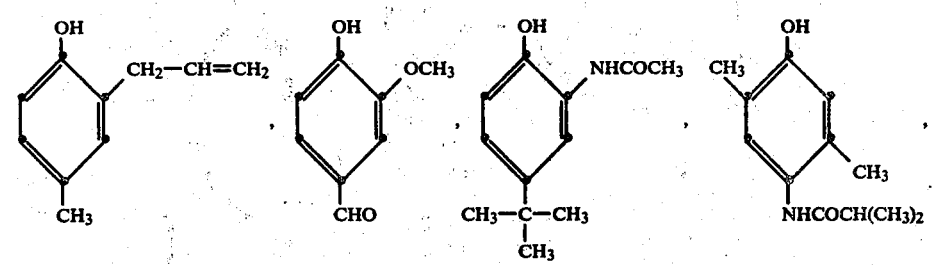
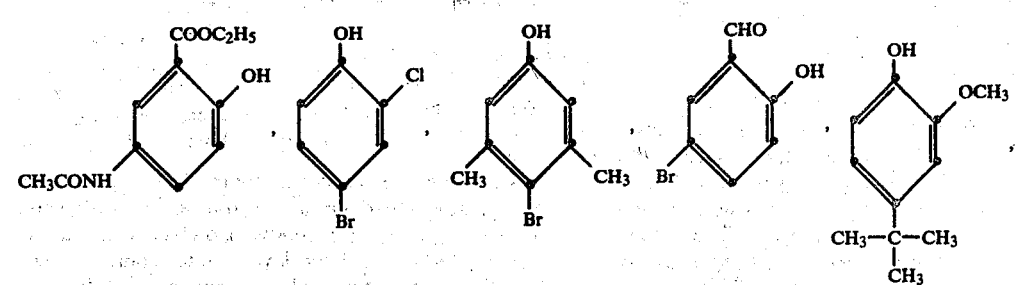
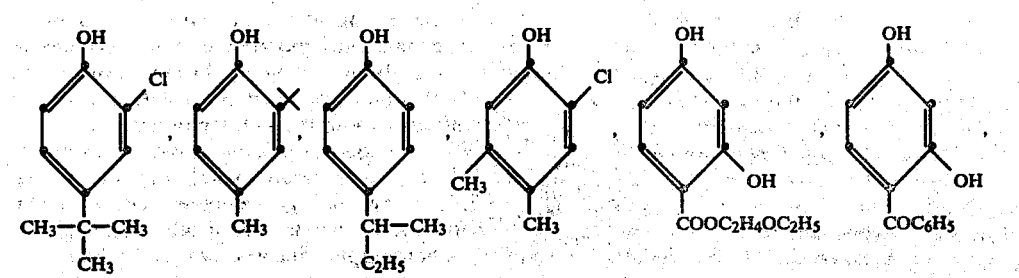

-continued

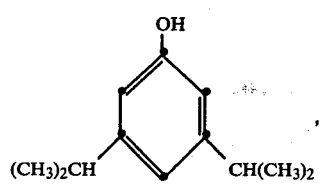 , 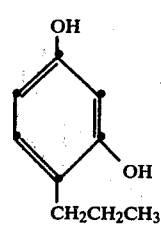 , 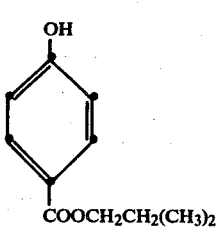 , 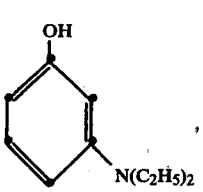 ,

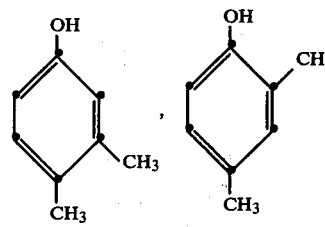 , 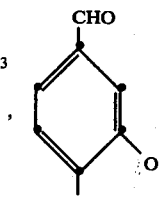 , 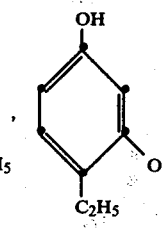 , 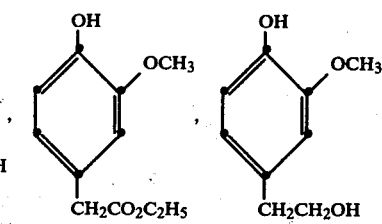

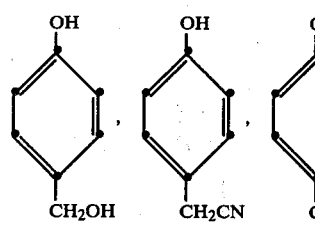 , 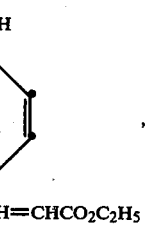 , 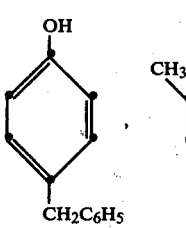 , 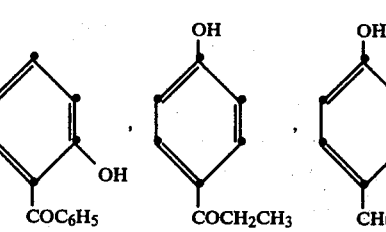

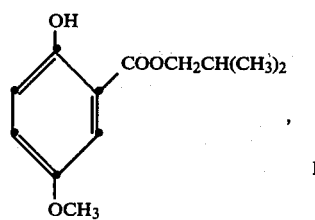 , 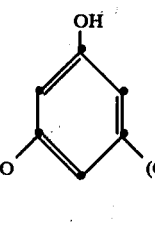 , 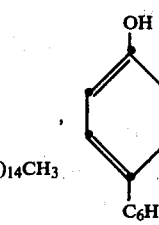 , 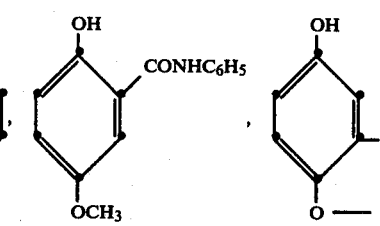

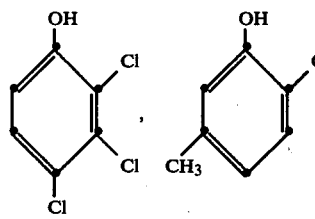 , 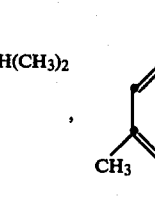 , 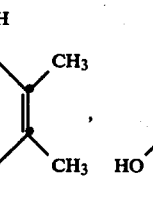 , and 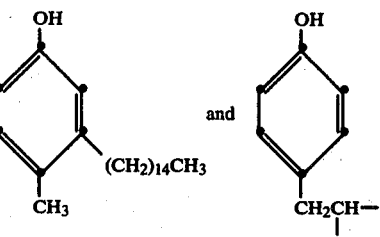

The dyes of the formula (1) can be used for various purposes, but especially in photographic materials, and especially advantageously as image dyes for the silver dye bleach process. Accordingly, very useful photographic materials, especially silver dye bleach materials, which comprise at least one layer, containing a dye of the formula (1), on a base can be prepared in a conventional manner known per se.

A transparent, metallically reflecting or, preferably, opaque white material can be used as the base for the silver halide emulsion layer; preferably, the base should not be capable of absorbing liquid from the baths.

The base can consist, for example, of unpigmented or pigmented cellulose triacetate or polyester. Should it consist of paper fibres, it must be lacquered or polyethylene-coated, on both sides. On at least one side of this base are the light-sensitive layers, preferably in the conventional arrangement, i.e. a red-sensitised silver halide emulsion layer, containing a cyan azo dye, as the lowest layer, on top of this a green-sensitised silver halide emulsion layer containing a magenta azo dye, and, as the uppermost layer, a blue-sensitive silver halide emulsion layer containing a yellow azo dye. The material can also contain subbing layers, intermediate layers, filter layers and protective layers, but the total thickness of the layers should as a rule not exceed 20μ.

The dyes according to the invention are lipophilic and are in general incorporated into the gelatins as solutions in high-boiling solvents. In most cases it suffices to add the dyes employed as a solution in such a solvent, with or without the addition of a volatile auxiliary solvent, to an aqueous gelatin solution at normal or slightly elevated temperature, with efficient stirring. The mixture is then brought together with a gelatin which contains silver halide and/or other materials for producing photographic images, cast on a base in a conventional manner to form a layer, and dried if appropriate.

Dyes of the formula (1), dissolved in organic solvents, can also be added direct to a gelatin which contains silver halide and/or other materials for producing photographic images. Thus, for example, it is possible to add the dye solution only immediately prior to casting.

Instead of simple stirring, the conventional methods of dispersing by means of kneading forces and/or shearing forces or ultrasonics can also be employed.

The dyes of formula (1) can also be incorporated into the coating solution according to Swiss Patent Application 4503/79-2 without applying shearing forces.

It is also possible to add the dye in a solid form, namely as a fine suspension, instead of as a solution. Furthermore, it is possible to incorporate the dyes into the gelatin in the presence of high-molecular polymers; latices are particularly useful for this application.

The casting solution can also contain other additives, such as hardeners, complexing agents and wetting agents, as well as sensitisers and stabilisers for the silver halide.

The dyes of the formula (1) do not undergo any chemical reactions with the light-sensitive materials. They are very diffusion-resistant, because they form stable, organic solutions. They are insensitive to calcium ions and easily dischargeable to white.

On addition to the casting solutions, the dyes produce neither an increase in viscosity nor a significant change in viscosity when the casting mixture is left to stand.

The spectral absorptions in gelatin are such that the dyes of the formula (1) can, if appropriate structures are chosen, be combined to form a dye tripack, composed of one yellow dye, one magneta dye and one cyan dye, the tripack showing grey shades, appearing neutral to the eye, over the entire density range.

The photographic silver dye bleach material produced with dyes of the formula (1) is in particular distinguished by brilliant colours, good colour reproduction and excellent light-fastness. An important characteristic of a good colour-copying material is excellent tone rendition and balanced colour gradations in all density ranges. The control of the colour equilibrium, in particular, repeatedly presents difficulties, since different bleaching characteristics of the azo dyes cannot always be compensated by the conventional methods of building up the material, such as balancing the sensitivity and contrast of the silver emulsions employed. This in many cases restricts the choice of the image dyes, and in particular also the choice of processing components in the bleaching bath.

In general, the exposed silver dye bleach materials are processed in four successive steps:
1. silver development
2. dye bleaching
3. silver bleaching
4. fixing In the first step, the latent silver image formed on exposure is developed. In the second step, the image dye allotted to the silver is bleached, in accordance with the existing image-wise distribution of the silver. The third step is necessary in order to re-oxidise the excess image silver still present after dye bleaching. In the fourth step, the silver, which is now entirely present in the form of halides, is removed by dissolving out with a complexing agent, especially a salt of thiosulfuric acid, in order to make the finished image insensitive to additional exposure and to free the pure colour image from cloudiness.

The second process step, namely dye bleaching, is carried out, in the conventional known processes, in a strongly acid medium, a catalyst being added to accelerate the dye bleaching. The bleaching baths additionally contain a silver complexing agent or ligand. Both the constituents, namely catalyst and ligand, are necessary in order to transmit the reducing action of the metallic, non-diffusible image silver to the equally non-diffusible dye. The reduced form of the catalyst, which is formed by reduction at the image silver, here serves as an intermediate carrier, which, after travelling a certain diffusion distance, irreversibly reduces, and thereby bleaches, the dye, and is at the same time itself re-oxidised to the original form.

The ability of the reduced stage of the bleaching catalyst to diffuse freely between the image silver and the dye to be bleached makes it possible spatially to separate the silver and the image dye to a certain degree, i.e. the bleachable dye and the corresponding silver halide emulsion need not be present in the same layer but can be in adjacent layers, or need only partially be present in the same layer. Such silver dye bleach materials are described, for example, in German Pat. Nos. 2,036,918, 2,132,835 and 2,132,836.

A simplification of the processing method, in which the dye bleaching and silver bleaching are combined in a single process step, has been described in German Pat. No. 2,488,433.

The combined dye bleach and silver bleach baths (i.e. the formulations) for processing the exposed silver dye bleach material contain components (a) to (e) below, with or without component (f):
(a) strong acid
(b) water-soluble iodide
(c) water-soluble oxidising agent
(d) antioxidant
(e) bleaching catalyst
(f) bleaching accelerator The amount of the bleaching catalysts which are employed in the—preferably aqueous—processing baths can vary within wide limits and is about 0.05 to 10 g/l of bleaching bath.

The temperature of the bleaching bath is in general between 20° and 90° C., preferably between 20° and 60° C.; of course, the requisite processing time is less at a higher temperature than at a lower temperature. The bleaching baths are stable within the stated temperature range. In general, the aqueous bleaching formulations required for the processing operation are employed in the form of dilute aqueous solutions, containing the stated components. Other methods, for example use of the formulation in paste form, are however also conceivable.

The stated temperature range also applies to the other processing steps. The aqueous bleaching formulation according to the present invention can be prepared, for example, from liquid, in particular aqueous, concentrates of some or all components ((a) to (f)). It is advantageous to use, for example, two liquid concentrates, of which one contains the strong acid (a) and the oxidising agent (c) and the other contains the remaining components (b), (d) and (e), with or without (f); in the latter concentrate, an additional solvent, such as ethyl alcohol, propyl alcohol, benzyl alcohol, ethylene glycol methyl ether or ethylene glycol ethyl ether, can be added to improve the solubility, especially of component (e). The aqueous bleaching formulations used as a rule contain components (a) strong acid: 10 to 200 g/l;
(b) water-soluble iodide: 2 to 50 g/l, preferably 5 to 25 g/l;
(c) water-soluble oxidising agent: 1 to 30 g/l;
(d) antioxidant: 0.5 to 10 g/l;
(e) bleaching catalysts: 0.05 to 10 g/l, with or without
(f) bleaching accelerator: 1 to 20 g/l.

Strong acids (component (a)) which can be present in the combined dye bleaching and silver bleaching baths are alkylsulfonic acids or arylsulfonic acids, and especially p-toluenesulfonic acid, as well as sulfuric acid, sulfamic acid or trichloroacetic acid. Mixtures of these acids can also be employed. The pH value of the bleaching bath is in particular not greater than 2 and preferably not greater than 1.

The water-soluble iodides (component (b)) are as a rule alkali metal iodides, especially sodium iodide and potassium iodide.

The oxidising agents (c) employed are advantageously water-soluble aromatic mononitro and dinitro compounds and anthraquinonesulfonic acid derivatives. The use of such oxidising agents serves to influence the colour equilibrium and the contrast of the images produced by the dye bleach process and is known from German Pat. No. 735,672, British Pat. Nos. 539,190 and 539,509 and Japanese Patent Publication 22673/69.

The mononitro and dinitro compounds are preferably mononitrobenzenesulfonic acids or dinitrobenzenesulfonic acids, for example those of the formula

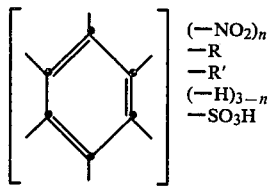  (24)

in which n is 1 or 2 and R and R' are hydrogen, lower alkyl having 1 to 4 carbon atoms, hydroxyl, alkoxy, amino or halogen (chlorine or bromine). The sulfonic acids can be added as readily soluble salts. Examples of suitable salts are the sodium or potassium salts of the following acids: o-nitrobenzenesulfonic acid, m-nitrobenzenesulfonic acid, 2,4-dinitrobenzenesulfonic acid, 3,5-dinitrobenzenesulfonic acid, 3-nitro-4-chlorobenzenesulfonic acid, 2-chloro-5-nitrobenzenesulfonic acid, 4-methyl-3,5-dinitrobenzenesulfonic acid, 3-chloro-2,5-dinitrobenzenesulfonic acid, 2-amino-4-nitrobenzenesulfonic acid, 2-amino-4-nitro-5-methoxybenzenesulfonic acid and 4-nitrophenol-2-sulfonic acid.

The compounds constituting component (c) serve not only as silver bleaching agents but also to produce a flatter gradation.

The antioxidants (anti-corrosion agents (d)) used are advantageously reductones or water-soluble mercapto compounds. Suitable reductones are, in particular, acireductones which have a 3-carbonyl-1,2-diol grouping, such as reductone, triose-reductone or, preferably, ascorbic acid. Examples of suitable mercapto compounds include thioglycerol, but especially the compounds of the formula HS-C$_q$H$_{2q}$-B   (25)

or preferably

HS-(CH$_2$)$_m$-COOH   (26)

in which q is an integer from 2 to 12, B is a sulfonic acid group or carboxylic acid group and m is 3 or 4. Mercapto compounds which can be used as antioxidants are described in German Pat. No. 2,258,076 and German Pat. No. 2,423,814. Other suitable antioxidants are adducts of alkali metal bisulfites, alkaline earth metal bisulfites or ammonium bisulfites with organic carbonyl compounds, preferably adducts of alkali metal bisulfites or ammonium bisulfites with monoaldehydes having 1 to 4 carbon atoms or dialdehydes having 2 to 5 carbon atoms (German Pat. No. 2,737,142).

Examples include the formaldehyde-bisulfite adduct, which is particularly preferred, and also the corresponding adducts of acetaldehyde, propionaldehyde, butyraldehyde, isobutyraldehyde, glyoxal, malonodialdehyde or glutarodialdehyde. In some cases, the tertiary water-soluble phosphines referred to later as bleaching accelerators can at the same time serve as antioxidants.

Examples of suitable bleaching accelerators (f) are quaternary ammonium salts, such as are known from German Offenlegungsschriften Nos. 2,139,401 and 2,716,136. Preferably, they are quaternary, substituted or unsubstituted piperidine, piperazine, pyrazine, quinoline or pyridine compounds, the last-mentioned being preferred. Tetralkylammonium compounds (alkyl having 1 to 4 carbon atoms) and alkylenediammonium compounds (alkylene having 2 to 6 carbon atoms) may also be used. Specific examples are: tetraethylammonium iodide; (CH$_3$)$_3$N$^\oplus$(CH$_2$)$_2$N$^\oplus$(CH$_3$)$_3$.2I$^\ominus$; (CH$_3$)$_3$N$^\oplus$(CH$_2$)$_6$N$^\oplus$(CH$_3$)$_3$.2I$^\ominus$; N-methylpyridinium iodide; N-methylquinolinium iodide; N-hydroxyethylpyridinium chloride; N-hydroxypropylpyridinium bromide; N-methyl-2-hydroxymethylpyridinium iodide; N,N-dimethylpiperidinium iodide; N,N'-dimethylpyrazinium fluosulfate and γ-picolinium bisulfate.

Other bleaching accelerators are the water-soluble tertiary phosphines known from German Pat. No. 2,651,969, which preferably contain at least one cyanoethyl grouping. They have, for example, the formula

   (27)

in which W is —C$_r$H$_{2r}$CN, —C$_4$H$_{2r}$NO$_2$ or a substituted or unsubstituted aryl radical or a heterocyclic radical, r is from 1 to 25, X is unsubstituted or substituted alkyl and Y is hydroxyalkyl, alkoxyalkyl, sulfoalkyl or aminoalkyl (alkyl in each case having 1 to 25, preferably 2 to 4, carbon atoms), phenyl, sulfophenyl or pyridyl. Preferred tertiary phosphines have the formula

   (28)

in which X$_1$ is —CH$_2$CH$_2$CN or —(CH$_2$)$_2$OCH$_3$, Y$_1$ is —(CH$_2$)$_2$SO$_3$$^\ominus$M$^\oplus$, —(CH$_2$)$_3$—SO$_3$$^\ominus$M$^\oplus$, —(CH$_2$)$_4$—SO$_3$$^\ominus$M$^\oplus$, —(CH$_2$)$_2$OCH$_3$ or —CH$_2$N(C$_2$H$_5$)$_2$, W$_1$ is —CH$_2$CH$_2$CN or phenyl and M$^+$ is a cation, especially an alkali metal cation, for example the sodium or potassium cation.

Specific examples are the following compounds: the sodium salt of bis-(β-cyanoethyl)-2-sulfoethylphosphine, the sodium salt of bis-(β-cyanoethyl)-3-sulfopropylphosphine, the sodium salt of bis-(β-cyanoethyl)-4-sulfobutylphosphine, bis-(β-cyanoethyl)-2-methoxyethylphosphine, bis-(2-methoxyethyl)-(β-cyanoethyl)-phosphine, the sodium salt of (β-cyanoethyl)-phenyl-3-sulfopropylphosphine, (β-cyanoethyl)-phenyl-2-methoxyethylphosphine and bis-(2-methoxyethyl)-phenylphosphine.

For the silver development, baths of conventional composition can be employed, for example those which contain hydroquinone as the developer substance, with or without 1-phenyl-3-pyrazolidinone. The silver development bath can also already contain a bleaching catalyst.

The silver fixing bath can be made up in a known conventional manner. The fixing agent used is, for example, sodium thiosulfate or, advantageously, ammonium thiosulfate, if desired together with additives such as sodium bisulfite and/or sodium metabisulfite. Preparation examples

EXAMPLE 1

4-Formylamido-benzenesulfochloride 121.5 g of formanilide are added, a little at a time, to 340 ml of chlorosulfonic acid at 10° C. The reaction mixture is then warmed to 95' C. and is stirred at this temperature for 2.5 hours. When it has cooled, the reaction mixture is stirred into 2.5 kg of ice and the precipitate is filtered off with suction, thoroughly washed with ice water and dried. 172 g of 4-formylamidobenzenesulfochloride, of melting point 158°–160° C., are obtained.

4-Aminobenzenesulfonic acid N,N-diethylamide 120 g of ice and 32 g of sodium carbonate are added to a solution of 20.2 g of diethylamine in 240 ml of acetonitrile, 66 g of 4-formlyamidobenzenesulfochloride are then added, a little at a time, at a temperature of 5° to 10° C., and the mixture is stirred for 3 hours at 20° C. and finally for 3 hours at 70° C. The acetonitrile is evaporated under reduced pressure and the product is extracted with methylene chloride. The organic phase is washed with water and concentrated. Yield: 69 g of 4-formylamido-benzenesulfonic acid N,N-diethylamide. This crude product is dissolved in 500 ml of methanol, 50 ml of water and 90 ml of concentrated hydrochloric acid are added, and the reaction mixture is stirred for 5 hours at room temperature. It is then neutralised with sodium hydroxide solution and concentrated to half its volume. After addition of 210 ml of water, the product crystallises out. It is filtered off with suction, washed with water and recrystallised from ethanol. Yield: 44 g of 4-aminobenzenesulfonic acid N,N-diethylamide, of melting point 100°–102° C.

4-Amino-3,5-dibromobenzenesulfonic acid N,N-diethylamide 11.5 g of 4-aminobenzenesulfonic acid N,N-diethylamide are dissolved in 150 ml of methanol. The solution is cooled to 0° C. and 10 ml of concentrated hydrochloric acid are added. 5.1 ml of bromine in 50 ml of methanol, which has been saturated with sodium bromide, are then added dropwise. The yellow suspension is stirred for a further two hours at 20° C. and is then introduced into 1.5 liters of ice water. The mixture is neutralised with ammonia solution and the crude product is filtered off with suction, washed and recrystallised from ethanol. Yield: 13.1 g of white crystals of melting point 186°–187° C. The NMR spectrum and the CHN analysis correspond to the expected chemical structure.

EXAMPLE 2

The following sulfonamides are obtained analogously to Example 1:

| Melting point (°C.) | $R_1$ | $R_2$ | Melting point (°C.) |
|---|---|---|---|
| 84–85 | $(C_2H_5)_2N(CH_2)_3\underset{\underset{CH_3}{\vert}}{CH}-$ | H | 97–99° C. |
| Oil | $-C_2H_4OCH_3$ | $C_2H_4OCH_3$ | 79–81° C. |
| Oil | $-(CH_2)_3OCH_3$ | H | 78–79° C. |
| 160–169 | $-\underset{\underset{OH}{\vert}}{CH_2CH}-CH_3$ | $\underset{\underset{OH}{\vert}}{CH_2CHCH_3}$ | 178–180° C. |
| — | $-(CH_2)_3-OCH_3$ | $C_2H_5$ | 101–103° C. |

EXAMPLE 3

4-Methylmercapto-nitrobenzene 28.3 g of methylmercaptan are dissolved in 500 ml of dimethylformamide at 0° C., under nitrogen. 37.4 g of potassium hydroxide, dissolved in 150 ml of ethanol, are then added dropwise at −10° C., after which 94.5 g of 4-chloronitrobenzene are added. The reaction mixture is warmed to 100° C. and stirred at this temperature for 8 hours. It is then stirred into 5 kg of ice water. The precipitate is filtered off with suction, washed, dried and recrystallised from methanol. Yield: 86.2 g of yellow crystals of melting point 71°–73.5° C.

In a similar manner, chloroinitrobenzene and hexylmercaptan give 4-hexylmercaptonitrobenzene.

2-Chloronitrobenzene and methylmercaptan analogously give 2-methylmercapto-nitrobenzene, and 2,4-dichloro-nitrobenzene and isobutylmercaptan give 2,4-diisobutylmercapto-nitrobenzene.

4-Methylsulfonyl-nitrobenzene 33.8 g of 4-methylmercapto-nitrobenzene in 180 ml of acetic acid are heated to 90° C. and a solution of 68 g of 49% peracetic acid solution in 50 ml of acetic acid is added slowly. The mixture is stirred for 30 minutes and poured into 1.2 liters of ice water. The product which precipitates is filtered off with suction, washed and dried. Yield: 38.2 g of white crystals of melting point 141°–144° C.

The following are obtained analogously: 4-hexylsulfonyl-nitrobenzene, melting point 44°–46° C.; 2-methylsulfonyl-nibrobenzene, melting point 104°–106° C., boiling point 215°–218° C. (0.25 mm Hg); 2,4-bis-isobutyl-sulfonylnitrobenzene, melting point 165°–167° C.

4-Methylsulfonyl-aniline

A Bechamp reduction of 16.1 g of 4-methylsulfonyl-nitrobenzene in 180 m of 50% aqueous methanol gives 8.8 g of 4-methylsulfonylaniline of melting point 132°–134° C.

Using the method described above, 4-hexylsulfonyl-nitrobenzene gives 4-hexylsulfonylaniline, melting point 95°–97° C.; 2-methylsulfonyl-nitrobenzene gives 2-methylsulfonylaniline (melting point: 82°–83° C.) and 2,4-bis-isobutylsulfonylnitrobenzene gives 2,4-bis-isobutylsulfonylaniline by catalytic hydrogenation (melting point: 118°–120° C.).

4-Amino-3,5-dibromophenyl methyl sulfone 5.15 g of 4-methylsulfonyl-aniline are suspended in 40 ml of methanol and 2 ml of concentrated hydrochloric acid. 9.8 g of bromine in 20 ml of methanol, saturated with sodium bromide, are added dropwise at 0° to 5° C. The reaction mixture is stirred for 3 hours at room temperature and then for 30 minutes at 40° C., after which it is introduced into 600 ml of ice water. After having neutralised the mixture with ammonia solution, the precipitate is filtered off with suction, washed and dried. Yield: 9.3 g of white crystals of melting point 190°–192° C. On recrystallisation from toluene, the melting point rises to 192°–194° C.

Using an analogous method, 4-hexylsulfonylaniline gives 3,5-dibromo-4-hexylsulfonylaniline of melting point 192°–194° C.

EXAMPLE 4

(a) Diazo component 40.8 ml of chlorobenzene are added dropwise to 300 ml of chlorosulfonic acid. The yellow solution is slowly warmed to 150° C. and kept at this temperature for 17 hours. When it has cooled, 2 kg of ice are introduced. The precipitate is filtered off with suction, washed and dried. Yield: 31 g of white crystals of 4-chlorobenzene-1,3-di-(sulfochloride) of melting point 83°–86° C.

46.5 g of this sulfochloride are added, a little at a time, to a mixture of 120 ml of acetonitrile, 40.3 g of diethylamine, 60 g of ice and 16.2 g of sodium carbonate at a temperature of at most 20° C. After 2 hours, the temperature is raised to 70° C. and stirring is continued overnight. The suspension is filtered and the liquid organic phase is decanted and evaporated to dryness. The residue is recrystallised from 300 ml of methanol in the presence of animal charcoal. Yield: 32.1 g of white crystals of 4-chlorobenzene-1,3-disulfonic acid bis-N,N-diethylamide, of melting point 90°–91° C.

19.1 g of this product, in 50 ml of dioxane and 100 ml of concentrated ammonia are heated, after addition of a trace of iron trichloride, for 20 hours at 125° C. in a steel autoclave. The resulting 4-amino-benzene-1,3-disulfonic acid bis-N,N-diethylamide is extracted with chloroform and the organic phase is washed with water, dried over magnesium sulfate and evaporated. Yield: 13.7 g. After recrystallisation from ethanol, white crystals of melting point 137°–139° C. are obtained.

| Analysis: | |
|---|---|
| Calculated % C 46.26 | Found % C 46.21 |
| H 6.94 | 7.01 |
| N 11.57 | 11.49 |

(b) Coupling component 6.5 g of N,N-dimethyl-m-phenylenediamine are dissolved in 50 ml of toluene and reacted with 6 g of isovaleryl chloride. The suspension is stirred for 2 hours at 40° C., cooled and treated with 26 ml of 2 N sodium hydroxide solution. The organic phase is decanted, washed with water and dried. After evaporation, 6.5 g of isovalerylamino-N,N-dimethylaniline of melting point 99°–101° C. are obtained.

| Analysis: | Calculated % C 70.88 | Found % C 71.03 |
|---|---|---|
| ($C_{13}H_{20}N_2O$) | H 9.16 | H 8.99 |
| | N 12.72 | N 12.59 |

(c) Azo dye 7.3 g of 4-aminobenzene-1,3-disulfonic acid bis-(N,N-diethylamide) in 160 ml of acetonitrile are treated with 2 ml of methanesulfonic acid, followed by 3 g of nitrosylsulfuric acid. After having been stirred for 20 minutes at room temperature, the reaction solution is introduced into 200 g of ice water. A solution of 4.4 g of the coupling component described under (b) in 40 ml of acetonitrile is added dropwise and the mixture is buffered with sodium acetate, whereupon a reddish oil separates out gradually. After one hour, the oil is taken up in chloroform and the organic phase is washed with water and evaporated. After recrystallising the residue from aqueous acetonitrile, 9 g of dye, of melting point 125°–127° C., are obtained.

| Analysis: | Calculated % C 54.53 | Found % C 54.43 |
|---|---|---|
| ($C_{27}H_{42}N_6O_5S_2$) | H 7.12 | H 7.31 |
| | N 14.13 | N 13.99 |

EXAMPLE 5

The following products are prepared analogously to Example 4a:

| R₁ | R₂ | Melting point (°C.) | Melting point (°C.) | %C Calc. | %C Found | %H Calc. | %H Found | %N Calc. | %N Found |
|---|---|---|---|---|---|---|---|---|---|
| CH₃OC₂H₄— | CH₃OC₂H₄— | Oil | Oil | 44.70 | 43.17 | 6.87 | 6.74 | 8.69 | 8.39 |
| (CH₃)₂CH— | (CH₃)₂CH— | 167–169 | 182–185 | 42.97 | 42.95 | 6.32 | 6.47 | 12.53 | 12.32 |

EXAMPLE 6

(a) Diazo component 6.5 g of 4-aminobenzene-1,3-disulfonic acid bis-(N,N-diethylamide) in 400 ml of methanol are treated dropwise with 18 g of bromine at 20° C. After one hour, the mixture is warmed to 40° C. and is then stirred for a further 4 hours. When cold, the reaction mixture is poured into 4 kg of ice water and 60 ml of concentrated ammonia solution are added. The precipitate is filtered off with suction, washed and dried. Yield: 29 g of 4-amino-5-bromobenzene-1,3-disulfonic acid bis-(N,N-diethylamide) of melting point 87°–89° C.

| Analysis: (C₁₄H₂₄N₃S₂O₄Br) | Calculated % C 38.01 H 5.47 N 9.50 | Found % C 37.97 H 5.43 N 9.47 |
|---|---|---|

(b) Azo dye 13.2 g of the diazo component from Example 6(a), in 250 ml of acetonitrile, are diazotised analogously to Example 4. After 80 minutes, the diazonium solution is poured onto 300 g of ice, and a solution of 7.5 g of 2-[5-acetamino-2-methoxyphenylamino]-1-methoxypropane in 45 ml of acetonitrile is added dropwise, and the mixture is buffered by adding sodium acetate. After 45 minutes, the dye is extracted with chloroform. The organic phase is washed with water, dried, treated with silica gel and evaporated. After recrystallisation from aqueous acetonitrile, 6 g of dye, of melting point 160°–162° C., are obtained.

| Analysis (C₂₇H₄₁BrN₆O₇S₂): | Calculated % C 45.96 H 5.86 N 11.91 | Found % C 45.97 H 5.84 N 11.91 |
|---|---|---|

EXAMPLE 7

3.9 g of dye from Example 6, in 80 ml of N-methylpyrrolidone, are treated with 0.8 g of copper cyanide. The mixture is stirred for 45 minutes at 50° C. and is then introduced into 700 ml of water. The precipitate is filtered off with suction and dissolved in chloroform, and this solution is washed with 40% ammonium thiocyanate solution and then with water. The solvent is evaporated and the residue is dissolved in acetonitrile and reprecipitated with water. The dye is filtered off with suction and dried. Yield: 2.5 g (melting point 159°–172° C.).

| Analysis: (C₂₈H₄₁N₇O₇S₂) | Calculated % C 51.60 H 6.35 N 15.05 | found C 51.54 H 6.37 N 14.74 |
|---|---|---|

The dyes of the general formula

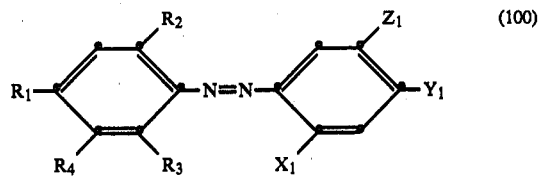

(100)

listed in Table 1 are prepared in a similar manner.

TABLE I

| Dye No. | X₁ | Y₁ | Z₁ | R₃ | R₄ | R₁ | R₂ | $\lambda_{max}^{CHCl_3}$ | $\epsilon_{mol}$ | $\lambda_{max}^{Gel}$ |
|---|---|---|---|---|---|---|---|---|---|---|
| 101 | $\underset{\underset{O}{\overset{\|}{C}}-CH_2CH\overset{CH_3}{\underset{CH_3}{<}}}{\overset{H}{\underset{}{>}}N-}$ | NHC₂H₄CN | H | H | H | Br | H | 414 | 28530 | 444 |
| 102 | " | " | H | CON(CH₂CH₂OCH₃)₂ | H | H | H | 410 | 24270 | 420 |
| 103 | " | " | H | CO₂CH₃ | H | H | H | 411 | 25230 | 433 |
| 104 | " | " | H | CO₂C₂H₄OCH₃ | H | H | H | 411 | 24150 | 433 |
| 105 | " | " | H | Br | H | H | Br | 401 | 23070 | 421 |
| 106 | " | " | H | Br | H | C₂H₅ | Br | 403 | 20160 | 423 |
| 107 | " | " | H | Br | H | CH₃ | Br | 400 | 21740 | 420 |
| 108 | " | " | H | CH₃ | H | Br | CH₃ | 384 | 21310 | 410 |
| 109 | " | NHCH(CH₃)CH₂OCH₃ | H | Br | H | H | Br | 418 | 23090 | 433 |
| 110 | " | " | H | Br | H | Br | Br | 424 | 23390 | 444 |
| 111 | " | " | H | Br | H | Cl | Br | 423 | 25280 | 443 |
| 112 | " | " | H | Br | H | C₂H₅ | Br | 418 | 22270 | 432 |
| 113 | " | " | H | Br | H | CH₃ | Br | 417 | 22270 | 432 |
| 114 | " | " | H | H | H | NO₂ | H | 535 | 35480 | 538 |
| 115 | " | " | OCH₃ | CN | H | CO₂(C₂H₄O)₂Et | CN | 568 | 44790 | 537 |
| 116 | " | " | OCH₃ | CN | H | SO₂NH(CH₂)₃OCH₃ | CN | 565 | 48880 | 555 |
| 117 | " | " | OCH₃ | CN | H | SO₂N(CH₂CH₂OCH₃)₂ | CN | 547 | 38520 | 545 |
| 118 | " | " | OCH₃ | SO₂CH₃ | H | p-ClC₆H₄CO— | H | 566 | 40610 | 565 |
| 119 | " | N(C₂H₅)₂ | OCH₃ | CN | H | CO₂C₂H₅ | SO₂CH₃ | 633 | 72510 | 634 |
| 120 | " | " | OCH₃ | CN | H | SO₂NH(CH₂)₃OCH₃ | NO₂ | 622 | 64390 | 626 |
| 121 | " | " | OCH₃ | CN | H | CN | NO₂ | 627 | 84260 | 626 |
| 122 | " | " | OCH₃ | CN | H | SO₂N(C₂H₅)₂ | NO₂ | 622 | 66880 | 622 |
| 123 | " | " | OCH₃ | CN | H | SO₂N(CH₂CH₂OCH₃)₂ | SO₂N(C₂H₅)₂ | 623 | 55490 | 627 |
| 124 | " | " | OCH₃ | CN | H | SO₂N(CH₂CH₂OCH₃)₂ | CN | 625 | 79230 | 627 |
| 125 | " | " | OCH₃ | CN | H | $\underset{C_2H_5}{SO_2N-(CH_2)_3OCH_3}$ | CN | 630 | 83330 | 630 |
| 126 | " | N(CH₃)₂ | OCH₃ | CN | H | CN | NO₂ | 630 | 78220 | 631 |
| 127 | " | " | H | Br | H | H | Br | 433 | 24290 | 440 |
| 128 | " | " | H | Br | H | CH₂CH₂CO₂C₂H₅ | Br | 431 | 24510 | 443 |
| 129 | " | " | H | Br | H | C₄H₉ | Br | 430 | 24380 | 441 |
| 130 | " | " | H | Br | H | C₂H₅ | Br | 426 | 22610 | 439 |
| 131 | " | " | H | CN | H | H | CN | 533 | 38050 | 534 |
| 132 | " | " | H | CN | CO₂C₂H₅ | CN | H | 527 | 49600 | 525 |
| 133 | " | " | H | H | H | CN | CN | 539 | 54000 | 538 |
| 134 | " | " | H | CN | CO₂C₂H₅ | NO₂ | CN | 620 | 72170 | 622 |
| 135 | " | " | H | CN | CO₂C₂H₅ | CN | CN | 607 | 58000 | 570 |

TABLE I-continued

| No. | R | R' |  |  |  |  |  | | | |
|---|---|---|---|---|---|---|---|---|---|---|
| 136 | -N(H)-C(=O)-CH(CH3)-OCH3 | NHC2H4CN |  |  |  | H | Br | 402 | 23010 | 420 |
| 137 | " | " |  | H | Br |  | Br | 402 | 24640 | 419 |
| 138 | " | " |  | H | Br |  | C2H5 | 402 | 24730 | 419 |
| 139 | NHCO(CH2)3CO2C2H5 | N(C2H5)2 |  | OCH3 | CN |  | CH3 | 592 | 52320 | 595 |
| 140 | " | " |  | OCH3 | CN |  | H | 632 | 83510 | 631 |
| 141 | N(CH3)COCH3 | NHC2H4CN |  | OCH3 | H |  | CN | 423 | 27080 | 444 |
| 142 | NHCO2C2H5 | N(C2H5)2 |  | OCH3 | CN |  | NO2 | 623 | 75340 | 624 |
| 143 | NHCO2C4H9 | " |  | OCH3 | CN |  | CN | 623 | 73610 | 620 |
| 144 | N(CH3)SO2CH3 | NHC2H4CN |  | OCH3 | CN |  | CN | 434 | 26840 | 451 |
| 145 | NHCOCH3 | NHCH(CH3)CH2OCH3 |  | OCH3 | SO2CH3 | CO2CH2CH(C2H5)C4H9 | H | 567 | 39550 | 569 |
| 146 | " | NHCH2C(CH3)2NO2 |  | H | CO2C2H4OCH3 | SO2N(C2H5)2 | SO2CH3 | 415 | 24560 | 432 |
| 147 | " | NHCH(CH3)CH2CH(CH3)2 |  | OCH3 | NO2 | H | H | 556 | 44120 | 557 |
| 148 | " | N(C2H5)2 |  | OCH3 | H | CN | H | 547 | 24410 | 552 |
| 149 | " | " |  | OCH3 | SO2NHCH(CH3)2 | SO2NHCH(CH3)2 | H | 553 | 39390 | 547 |
| 150 | " | " |  | OCH3 | CN | SO2N(C2H5)2 | SO2N(CH3)(CH3) | 623 | 44130 | 626 |
| 151 | " | " |  | OCH3 | CN | " | CN | 623 | 113100 | 627 |
| 152 | " | " |  | OCH3 | CN | SO2N(CH2CH2OCH3)2 | CN | 624 | 71650 | 626 |
| 153 | NHCOCH(CH3)2 | NHC2H4CN |  | H | PO(OC2H5)2 | H | H | 419 | 17840 | 439 |
| 154 | -N(H)-C(=O)-CH(CH3)2 with CH3 | N(C2H5)2 |  | OCH3 | H | OC4H9 | CN | 531 | 34900 | 531 |
| 155 | " | " |  | H | Br | H | Br | 429 | 26400 | 418 |
| 156 | -N(H)-C(=O)-C2H4OCH2CH(CH3)-CH3 | NHCH(CH3)CH2OCH3 |  | H | CN | H | CH3 | 551 | 38160 | 563 |
| 157 |  | " |  | OCH3 | CN | H | CN | 567 | 44680 | 570 |
| 158 | -N(H)-C(=O)-CH(CH3)CH2CH3 | NHC2H4CN |  | H | Br | H | Br | 390 | 20370 | 413 |
| 159 | CH3 | N(C2H5)C2H4OCCH3 (O=) |  | H | H | CO2C2H5 | H | 438 | 27770 | 451 |

TABLE I-continued

| | | | | | | | | |
|---|---|---|---|---|---|---|---|---|
| 160 | CH₃ | NHSO₂C₆H₄CH₃ | " | H | SO₂N(C₂H₄OCH₃)₂ | H | 440 | 27850 | 451 |
| 161 | CH₃ | " | " | Br | H | Br | 406 | 21180 | 413 |
| 162 | OCH₃ | " | OCH₃ | H | CO₂C₂H₅ | H | 417 | 16330 | 425 |
| 163 | OH | H | H | H | OC₂H₄OC₂H₄OCH₃ | H | 403 | 10820 | 421 |
| 164 | OH | H | H | H | C₄H₉ | H | 408 | 6960 | 427 |
| 165 | OH | H | NHCOCH⟨C₂H₅/C₄H₉⟩ | H | OC₄H₉ | H | 400 | 11280 | 422 |
| 166 | OH | H | " | H | OC₄H₉ | H | 428 | 9720 | 431 |
| 167 | OH | H | OCH₂CH(CH₃)₂ | H | OC₂H₄OCH₃ | H | 434 | 10860 | 438 |
| 168 | OH | H | CH₂CO(C₂H₄O)₂OCH₃ | OC₂H₄OCH₃ | SO₂C₆H₄OH | H | 412 | 11620 | 407 |
| 169 | OH | H | (OC₂H₄)₂OCH₃ | H | OC₄H₉ | H | 420 | 9410 | 430 |
| 170 | OH | H | CH₃ | H | NHCOCH₃ | H | 400 | 13240 | 403 |
| 171 | OH | H | C(CH₃)₂C₂H₅ | H | NHCOC=CH₂ \| CH₃ | H | 401 | 16110 | 405 |
| 172 | OH | H | " | H | CO₂C₂H₅ | H | 411 | 8700 | 410 |
| 173 | OH | H | " | H | SO₂C₆H₁₃ | H | 417 | 7400 | 412 |
| 174 | OH | H | " | CO₂C₂H₅ | H | OCH₃ | 405 | 10350 | 410 |
| 175 | OH | NHCOCH₂CH(CH₃)₂ | H | H | OC₄H₉ | H | 406 | 23080 | 400 |
| 176 | OH | " | OCH₃ | H | NHCOCH₂CH(CH₃)₂ | H | 452 | 21770 | 460 |
| 177 | OH | NHCOCH₂CH(CH₂)₃ | OCH₃ | H | OCH₂CH(C₂H₅)C₄H₉ | H | 434 | 21300 | 451 |
| 178 | OH | " | OCH₃ | H | OCH₂CH(C₂H₅)C₄H₉ | H | 444 | 21400 | 452 |
| 179 | OH | " | OCH₃ | H | (OC₂H₄)₂OCH₃ | H | 445 | 20900 | 449 |
| 180 | OH | NHCOCH(C₂H₅)C₄H₉ | OCH₃ | H | OCH₂CH(CH₃)₂ | H | 447 | 20300 | 451 |
| 181 | OH | " | OCH₃ | H | OCH₂CH(C₂H₅)C₄H₉ | H | 447 | 19800 | 451 |
| 182 | OH | N(C₄H₉)COCH₃ | OCH₃ | H | OCH₂CH(CH₃)₂ | H | 418 | 12400 | 423 |
| 183 | OH | NHCO(OC₂H₄)₂OCH₃ | OCH₃ | OC₂H₅ | OC₂H₅ | H | 436 | 14800 | 442 |
| 184 | OH | NHPO(OC₄H₉)₂ | OCH₃ | H | OCH₂CH(CH₃)₂ | H | 444 | 21400 | 447 |
| 185 | OH | OH | OCH₃ | H | " | H | 444 | 20800 | 449 |
| 186 | OH | OCH₃ | C₃H₇ | H | OC₄H₉ | H | 396 | 21870 | 401 |
| 187 | OH | OCH₃ | NHCOCH₂CH(CH₃)₂ | H | OCH₂CH(C₂H₅)C₄H₉ | H | 429 | 15800 | 439 |
| 188 | OH | OCH₃ | OCH₃ | H | OCH₂CH(CH₃)₂ | H | 443 | 17400 | 447 |
| 189 | OH | OCH₃ | C₃H₇ | H | OC₄H₉ | H | 397 | 19800 | 400 |
| 190 | OH | OC₃H₇ | CH₃ | H | SO₂C₆H₁₃ | H | 405 | 17100 | 416 |
| 191 | OH | OC₃H₇ | CH₃ | H | OCH₂CH(CH₃)₂ | H | 400 | 19700 | 403 |
| 192 | OH | " | CH₃ | H | C₄H₉ | H | 396 | 16400 | 400 |
| 193 | OH | " | CH₃ | SO₂CH₂CH(CH₃)₂ | SO₂CH₂CH(CH₃)₂ | H | 462 | 10400 | 452 |
| 194 | OH | " | CH₃ | Br | SO₂C₆H₁₃ | Br | 410 | 12900 | 410 |
| 195 | OH | " | CH₃ | OCH₃ | OCH₂CH(CH₃)₂ | H | 436 | 19600 | 439 |

TABLE I-continued

| | | | | | | | | | |
|---|---|---|---|---|---|---|---|---|---|
| 196 | -N(H)-C(=O)-CH(CH₃)-CH₂-CH(CH₃)-CH₃ | NHC₂H₄CN | H | H | CO₂C₂H₅ | H | H | | 441 |
| 197 | " | " | H | Br | Br | CH₃ | Br | 403 | 28270 | 411 |
| 198 | -N(H)-C(=O)-CH(CH₃)-NHCHCH₂CH₂C₆H₅-COC₂H₅ | CH₃-NHCHCH₂CH₂C₆H₅ | OCH₃ | CH₃SO₂ | H | NO₂ | NO₂ | 622 | 21140 | 411 |
| 199 | " | N(C₂H₅)₂ | OC₂H₄OCH₃ | CF₃ | H | NO₂ | CN | 651 | 82350 | 655 |
| 200 | " | " | " | CN | CO₂CH₃ | NO₂ | CN | 661 | 98310 | 658 |
| 201 | -N(H)-C(=O)-CH(CH₃)-CH₂-CH(CH₃)-CH₃ | N(CH₃)₂ | OCH₃ | CN | | CH=C(CN)₂ | | 640 | 97500 | 639 |
| 202 | " | " | OCH₃ | CN | H | NO₂ | NO₂ | 655 | 89270 | 654 |
| 203 | " | N(C₂H₅)₂ | H | CN | H | SO₂N(C₂H₅)₂ | SO₂N(C₂H₅)₂ | 557 | 41960 | 561 |
| 204 | -N(H)-C(=O)-CH(CC₂H₄OCH₂CH-CH₃)-CH₃ | " | OCH₃ | CN | H | CN | NO₂ | 631 | 79060 | 630 |
| 205 | " | N(C₂H₅)₂ | OCH₃ | CN | H | NO₂ | CN | 655 | 89070 | 656 |
| 206 | " | CH₃-NHCHCH₂OCH₃ | OCH₃ | CN | H | H | CN | 552 | 37690 | 546 |
| 207 | -NHSO₂CH₂CH₃ | N(C₂H₅)₂ | OCH₃ | Br | H | NO₂ | NO₂ | 627 | 48900 | 625 |
| 208 | " | " | OCH₃ | CF₃ | H | NO₂ | CN | 649 | 72400 | 652 |
| 209 | -NHCOCH₃ | " | OCH₃ | H | CN | H | CN | 559 | 36000 | 554 |
| 210 | OH | NHCO(OC₂H₄)₂OCH₃ | OCH₃ | H | H | OCH₂CH-C₄H₉ / C₂H₅ | H | 444 | 21400 | 449 |
| 211 | OH | N(C₃H₇)₂ | OCH₃ | CN | H | C₄H₉ | CN | 565 | 31400 | 566 |

TABLE I-continued

| Dye No. | X1 | Y1 | | | | | | | | |
|---|---|---|---|---|---|---|---|---|---|---|
| 212 | NHCOC2H5 | N(C2H5)2 | OC2H4OCH3 | CN | H | NO2 | | 652 | 96060 | 660 |
| 213 | H–N(–CCH3=O)CH2CH(CH3)CH3 | N(C2H5)2 | OC2H4OCH3 | CN | H | NO2 | | 652 | 78860 | 659 |
| 214 | NHCOC2H5 | CH3, NHCHCH2OCH3 | OC2H4OCH3 | CN | H | CH3 | | 559 | 39410 | 535 |
| 215 | H–N(–C(CH3)(CH2CH(CH3)CH3)=O) | " | OCH3 | SO2N(C2H5)2 | H | SO2CH3 | | 549 | 26450 | 545 |

| Dye No. | X1 | Y1 | Z1 | R1 | R2 | R3 | R4 | $\lambda_{max}^{CHCl_3}$ | $\epsilon_{mol}$ | $\lambda_{max}^{Gel}$ |
|---|---|---|---|---|---|---|---|---|---|---|
| 216 | NHCOCH2CH(CH3)2 | N(CH3)2 | H | C(CH3)3 | H | H | H | 453 | 30700 | 458 |
| 217 | NHCOCH2CH(CH3)2 | N(CH3)2 | H | O(CH2)3CH3 | H | H | H | 458 | 31600 | 460 |
| 218 | CH3 | N(C2H5)CH2CH2CH2OCOCH3 | H | Cl | H | H | H | 421 | 27400 | 430 |
| 219 | NHCOCH2CH(CH3)2 | NHC2H4CN | H | Br | Br | Br | H | 400 | 21500 | 429 |
| 220 | NHCOCH2CH(CH3)2 | NHC2H4CN | H | Cl | Br | Br | H | 412 | 23800 | 435 |
| 221 | NHCOCH(CH3)2 | NHC2H4CN | H | H | Br | Br | H | 402 | 23000 | 419 |
| 222 | NHCOCH2CH(CH3)2 | N(CH3)2 | H | CH3 | Br | Br | H | 422 | 20800 | 440 |
| 223 | NHCOCH2CH(CH3)2 | N(CH3)2 | H | Cl | Br | Br | H | 439 | 23700 | 453 |
| 224 | NHCOCH2CH(CH3)2 | N(CH3)2 | H | C2H5 | Br | Br | H | 426 | 22600 | 437 |
| 225 | NHCOCH2CH(CH3)2 | N(CH3)2 | H | (CH2)3CH3 | Br | Br | H | 430 | 24400 | 438 |
| 226 | NHCOCH2CH(CH3)2 | N(CH3)2 | H | OCH2CH2CH(CH3)2 | Br | Br | H | 429 | 26400 | 430 |
| 227 | NHCOCH2CH(CH3)2 | NHC2H4CN | H | CH3 | CH3 | CH3 | H | 390 | 20400 | 410 |
| 228 | NHCOCH2CH(CH3)2 | NHC2H4CN | H | Br | CH3 | Br | H | 384 | 21300 | 409 |
| 229 | NHCOCH2CH(CH3)2 | NHC2H4CN | H | CH2CH(CH3)2 | Br | Br | H | 403 | 23200 | 422 |
| 230 | NHCOCH2CH(CH3)2 | NHC2H4CN | H | H | Br | Br | H | 416 | 28800 | 433 |
| 231 | NHCOCH2CH(CH3)2 | NHC2H4CN | H | CH3 | Br | Br | OC2H5 | 403 | 21100 | 406 |
| 232 | NHCOCH2CH(CH3)2 | NHC2H4CN | H | CH3 | Br | Br | OC2H4CH(CH3)2 | 401 | 23700 | 410 |
| 233 | NHCOCH2CH(CH3)2 | NHC2H4CN | H | CH3 | Br | Br | OCH3 | 402 | 22200 | 406 |
| 234 | NHCOCH2CH(CH3)2 | NHC2H4CN | H | H | Br | H | CO2CH2CH(CH3)2 | 412 | 26000 | 455 |
| 235 | NHCOCH2CH(CH3)2 | NHC2H4CN | H | H | CON(C2H4OCH3)2 | H | H | 410 | 24270 | 420 |
| 236 | OH | NHCOCH3 | OCH3 | O(C2H4O)2CH3 | H | H | H | 441 | 20400 | 448 |
| 237 | OH | H | OCH2CH(CH3)2 | OC2H4OCH3 | H | H | OC2H4OCH3 | 434 | 10900 | 438 |
| 238 | OH | N(COCH3)(C2H4CN) | OCH3 | CH2CO2CH2CH(CH3)2 | H | H | H | 420 | 9500 | 423 |

TABLE I-continued

| | | /COCH3<br>N<br>\(CH2)3CH3 | | | | | | | | |
|---|---|---|---|---|---|---|---|---|---|---|
| 239 | OH | | OCH3 | OC2H4OCH3 | H | H | OC2H4OCH3 | 436 | 14800 | 443 |
| 240 | OH | OCH3 | NHCOCH2CH(CH3)2 | OCH2CH(CH3)2 | H | H | | 429 | 15800 | 439 |
| 241 | OH | OCH2CH2CH3 | CH3 | OCH2CH(CH3)2 | OCH3 | H | | 436 | 19600 | 439 |
| 242 | NHSO2C6H13 | N(C2H5)2 | OCH3 | CN | CN | H | | 624 | 776600 | 625 |
| 243 | CH3 | N(C2H5)3C2H4OCOCH3 | H | SO2N(C2H4OCH3)2 | CN | H | | 542 | 42500 | 550 |
| 244 | NHCOCH2CH(CH3)2 | N(C2H5)2 | OCH3 | NO2 | CN | H | | 657 | 95220 | 656 |
| 245 | NHCOOC2H5 | N(C2H5)2 | OCH3 | SO2NHC3H6OCH3 | CN | H | | 623 | 75340 | 624 |
| 246 | NHCOCH2CH(CH3)2 | NHCH(CH3)CH2OCH3 | OCH3 | CH2 | CN | H | | 564 | 43110 | 567 |
| 247 | NHCO(CH2)3COOC2H5 | N(C2H5)2 | OCH3 | NO2 | CN | H | | 654 | 97420 | 655 |
| 248 | NHCOCH2CH(CH3)2 | N(C2H5)2 | OCH3 | NO2 | NO2 | H | | 655 | 89270 | 654 |
| 249 | NHCOCH3 | NHCH(CH3)CH2CH(CH3)3 | OCH3 | CH3 | CN | H | | 567 | 45460 | 571 |
| 250 | NHCOCH2CH(CH3)2 | N(C2H5)2 | OCH3 | Br | CN | H | | 630 | 81910 | 633 |
| 251 | NHCOCH2CH(CH3)2 | N(C2H5)2 | OCH3 | NO2 | CN | NO2 | | 643 | 84960 | 641 |
| 252 | NHCOCH2CH(CH3)2 | NHCH(CH3)CH2CH(CH3)2 | OCH3 | OC2H4CH(CH3)2 | CN | CH3 | | 566 | 43360 | 570 |
| 253 | NHCOC2H5 | N(CH(CH3))CH2 | OC2H4OCH3 | H | CN | H | | 568 | 42660 | 564 |
| 254 | NHCOCH2CH(CH3)2 | N(C4H9)2 | OCH3 | NO2 | CN | H | | 659 | 92480 | 659 |
| 255 | NHCOCH2CH(CH3)2 | NHCH(CH3)CH2OCH3 | OCH3 | CH3 | CN | OCH3 | | 568 | 49840 | 570 |
| 256 | NHCOCH2CH(CH3)2 | NHCH(CH3)CH2OCH3 | OC2H4OCH3 | NO2 | CN | CO2CH3 | | 663 | 92490 | 663 |
| 257 | NHCOC2H5 | N(C2H5)2 | OCH3 | SO2NHC3H6OCH3 | CN | H | | 623 | 61370 | 622 |
| 258 | NHCOC2H5 | N(C2H5)2 | OC2H5 | NO2 | NO2 | H | | 659 | 97310 | 658 |
| 259 | NHCOC2H4OC2H5 | N(C2H5)2 | OCH3 | NO2 | CN | CO2C2H4OCH3 | | 660 | 99710 | 662 |
| 260 | NHCOCH3 | N(C2H5)2 | OCH2 | NO2 | CF3 | H | | 649 | 73900 | 652 |
| 261 | NHCOC2H5 | NHCH(CH3)CH2OCH3 | OC2H4OCH3 | NO2 | CN | CO2CH3 | | 634 | 73490 | 638 |
| 262 | NHCOC2H5 | N(C4H9)2 | OC2H4OCH3 | NO2 | SO2CH3 | H | | 651 | 68690 | 657 |
| 263 | NHCOCH2CH(CH3)2 | N(C2H5)2 | OCH3 | SO2CH2CH(CH3)2 | Cl | NO2 | | 636 | 80970 | 637 |
| 264 | NHCOCH3 | N(C2H5)2 | OCH3 | NO2 | NO2 | H | | 628 | 50400 | 621 |
| 265 | NHCOCH3 | NHCH(CH3)CH2OCH3 | OCH3 | NO2 | NO2 | H | | 615 | 48130 | 615 |

Use examples

EXAMPLE 8

34 mg of the dye of the formula

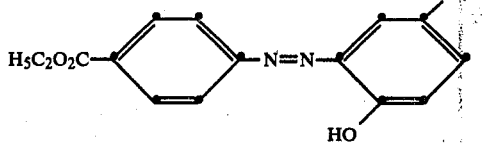

are dissolved in 2 ml of a 9:1 mixture of ethyl acetate and tricresyl phosphate, and the solution is added to a mixture of 6.6 ml of a 6% aqueous gelatin solution, 0.9 ml of distilled water and 0.5 ml of an 8% solution of sodium dibutylnaphthalenesulfonate, and emulsified therein by ultrasonics.

2.5 ml of the resulting emulsion are mixed with 5 ml of water, 2.5 ml of an unsensitised gelatin/silver bromide-iodide emulsion containing about 22 g of silver/kg of gelatin, and 1 ml of a 1% solution of a hardener of the formula

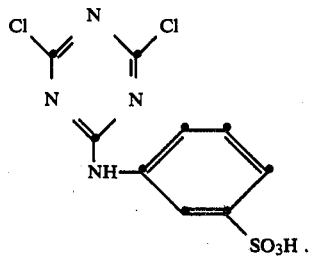

This mixture is cast on an opaque triacetate base (size 13×18 cm) and dried. The resulting light-sensitive material is exposed behind a step wedge and is processed at 24° C., as follows:

| | |
|---|---|
| Developing | 6 minutes |
| Washing | 4 minutes |
| Silver bleaching and dye bleaching | 6 minutes |
| Washing | 2 minutes |
| Fixing | 8 minutes |
| Washing | 6 minutes |
| Drying | |

The developer baths and fixing baths are conventional baths, as used in black-and-white photography. The silver dye bleach bath has the following composition per liter of solution:

| | |
|---|---|
| Sulfamic acid | 100 g |
| m-Nitrobenzenesulfonic acid | 10 g |
| Potassium iodide | 6 g |
| 2,3,6-Trimethylquinoxaline | 2 g |
| 4-Mercaptobutyric acid | 1 g |

A counter-imagewise yellow wedge, which is bleached completely white where originally the silver density was highest, is obtained. The image is distinguished by great brilliance and light-fastness.

EXAMPLE 9

25 mg of the dye of the formula

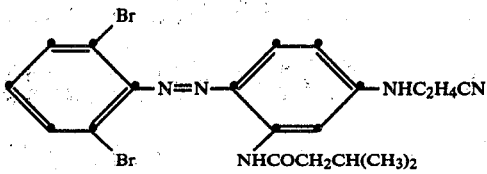

are incorporated into a light-sensitive photographic material analogously to the above example.

After exposure, the material is processed at 30° C., as follows:

| | |
|---|---|
| Developing | 3 minutes |
| Washing | 1 minutes |
| Silver bleaching and dye bleaching | 5 minutes |
| Washing | 1 minutes |
| Fixing | 4 minutes |
| Washing | 6 minutes |
| Drying | |

The baths used have the composition mentioned above. A brilliant, light-fast yellow wedge is obtained, which in the area of maximum silver density is bleached completely white.

EXAMPLE 10

14 mg of the dye of the formula

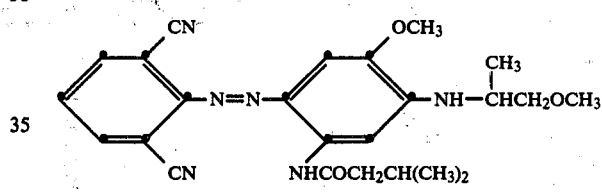

are dissolved in 2 ml of a 9:1 mixture of ethyl acetate and Reofos 65 (trisisopropylphenylphosphate) and the solution is then emulsified with 7 ml of a 5% gelatin solution and 0.5 ml of an 8% aqueous solution of sodium dibutylnaphthalenesulfonate, to give a homogeneous mixture. 5 ml of water, 98 ml of an unsensitised gelatin/silver bromide-iodide emulsion, containing about 22 g of silver per kg of gelatin, 1.7 ml of a 4% gelatin solution and 1 ml of a 1% hardener solution are added to 2.5 ml of this dye emulsion. The mixture is cast on an opaque triacetate film of size 13×18 cm and dried. The resulting light light-sensitive material is exposed to white light behind a step wedge and is processed at 30° C., as follows:

| | |
|---|---|
| Developing | 3 minutes |
| Washing | 1 minutes |
| Silver bleaching and dye bleaching | 5 minutes |
| Washing | 1 minutes |
| Fixing | 4 minutes |
| Washing | 6 minutes |
| Drying | |

The developer bath contains the following per liter of solution:

| | |
|---|---|
| Sodium sulfite | 50 g |
| 1-Phenyl-3-pyrazolidone | 0.2 g |
| Hydroquinone | 6 g |
| Sodium carbonate | 35 g |

-continued

| | | |
|---|---|---|
| Potassium bromide | 4 g | |
| Benzotriazole | 0.3 g | |

The silver dye bleach bath contains the following per liter of solution:

| | | |
|---|---|---|
| Concentrated sulfuric acid | 28 ml | |
| Sodium m-nitrobenzenesulfonate | 10 g | |
| Potassium iodide | 6 g | |
| Sodium salt of bis-(2-cyanoethyl)-(2-sulfoethyl)-phosphine | 3 g | |
| 2,3-Dimethylquinoxaline | 1.5 g | |

The fixing bath contains the following per liter of solution:

| | | |
|---|---|---|
| Sodium thiosulfate | 200 g | |
| Sodium metabisulfite | 20 g | |

A brilliant, light-fast magenta wedge is obtained, which is bleached completely white in the areas where the silver density was originally highest.

EXAMPLE 11

50 mg of the dye of the formula

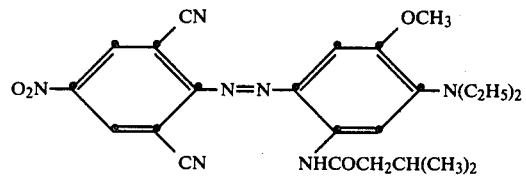

are dissolved in 2 ml of ethylene chloride and 0.2 ml of tricresyl phosphate. 7 ml of 5% gelatin solution and 0.5 ml of an 8% aqueous solution of sodium dibutylnaphthalenesulfonate are added and this mixture is emulsified until homogeneous. The dye emulsion is mixed with 7 ml of a 4% gelatin solution, 16 ml of water, 3 ml of a stabilised silver halide emulsion which contains 24 g of silver per kg of gelatin, and 4 ml of a 1% hardener solution. This emulsion is cast on 0.1 m² of an opaque base, solidified and dried.

A strip, cut to size 3.5×18 cm, is exposed for 1 second to white light (200 Lux/cm²) under a step wedge and through a blue filter (Kodak 26+47B). The strip is then processed at 24° C., as follows:

| | |
|---|---|
| Developer bath | 6 minutes |
| Washing | 4 minutes |
| Silver dye bleach bath | 6 minutes |
| Washing | 2 minutes |
| Fixing | 8 minutes |
| Washing | 6 minutes |
| Drying | |

The developer bath used has the composition given in U.S. Pat. No. 4,141,734.

The silver dye bleach bath used is a solution which, per liter, contains the following components:

| | |
|---|---|
| Concentrated sulfuric acid | 28 ml |
| Sodium iodide | 9 g |
| Disodium salt of 4-nitrophenol-2-sulfonic acid | 6 g |
| 6-Methoxy-2,3-dimethylquinoxaline | 1 g |
| Sodium salt of bis-(2-cyanoethyl)-(2-sulfoethyl)-phosphine | 3 g |

In addition, a conventional fixing bath, containing 200 g of sodium thiosulfate per liter of solution, is used.

A brilliant, light-fast cyan wedge is obtained, which is bleached completely white in the area which originally had the greatest silver density.

The other dyes of Table I can be incorporated analogously into the colour-photographic material according to the invention.

What is claimed is:

1. A colour-photographic recording material for the silver dye bleach process which contains at least one diffusion-resistant, bleachable and oil-soluble monoazo dye dissolved in a high-boiling organic solvent in at least one silver halide emulsion layer or in a colloid layer adjoining the silver halide emulsion layer, and wherein the dye has the formula

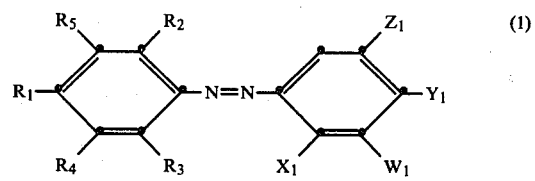

in which R₁ is hydrogen, substituted or unsubstituted alkyl having 1 to 18 carbon atoms, substituted or unsubstituted alkoxy having 1 to 16 carbon atoms, substituted or unsubstituted alkenyl having 2 to 4 carbon atoms, substituted or unsubstituted aliphatic acyl having 2 to 5 carbon atoms, substituted or unsubstituted benzoyl, substituted or unsubstituted carbalkoxy having 2 to 20 carbon atoms or $-NV_1COU_1$, in which $V_1$ is hydrogen or alkyl having 1 to 4 carbon atoms and $U_1$ is substituted or unsubstituted alkyl having 1 to 12 carbon atoms or substituted or unsubstituted alkenyl having 2 to 4 carbon atoms, or $R_1$ is N-alkyl-substituted or N,N-dialkyl-substituted carboxamido or sulfonamido, in which each alkyl moiety has 1 to 12 carbon atoms and can be substituted further, or $R_1$ is substituted or unsubstituted alkylsulfone having 1 to 12 carbon atoms, substituted or unsubstituted arylsulfone, substituted or unsubstituted aryloxy or substituted or unsubstituted arylsulfonic acid ester, or is hydroxyl, cyano, nitro or halogen, $R_2$ is hydrogen, substituted or unsubstituted alkyl having 1 to 12 carbon atoms, substituted or unsubstituted alkoxy having 1 to 6 carbon atoms, substituted or unsubstituted carbalkoxy having 2 to 5 carbon atoms or N-alkyl-substituted or N,N-dialkyl-substituted sulfonamido or carboxamido, in which each alkyl moiety has 1 to 8 carbon atoms and can be substituted, or $R_2$ is substituted or unsubstituted alkylsulfone having 1 to 6 carbon atoms, substituted or unsubstituted arylsulfone or substituted or unsubstituted aryloxy, or is cyano, nitro or halogen, $R_3$ is hydrogen, substituted or unsubstituted alkyl or alkoxy having 1 to 4 carbon atoms, substituted or unsubstituted phenoxy, or N-alkyl-substituted or N,N-dialkyl-substituted sulfonamido or carboxamido, in which each alkyl moiety has 1 to 6 carbon atoms and can be substituted, or $R_3$ is substituted or unsubstituted alkylsulfone having 1 to 4 carbon atoms, substituted or unsubstituted phenylsulfonic acid ester, cyano, nitro, halogen, substituted or unsubstituted carbalkoxy having 1 to 16 carbon atoms, or —P(O)(OT$^1$)$_2$, in which T$^1$ is alkyl having 1 to 4 carbon atoms, R$_4$ is hydrogen, substituted or unsubstituted alkyl having 1 to 4 carbon atoms, substituted or unsubstituted alkoxy having 1 to 6 carbon atoms, substituted or unsubstituted carbalkoxy having 2 to 16 carbon atoms or N-alkyl-substituted or N,N-dialkyl-substituted sulfonamido or carboxamido, in which each alkyl moiety has 1 to 12 carbon atoms and can be substituted, or R$_4$ is —NQ$_1$COT$_1$, in which Q$_1$ is hydrogen or alkyl having 1 or 2 carbon atoms and T$_1$ is substituted or unsubstituted alkyl having 1 to 4 carbon atoms, or R$_4$ is substituted or unsubstituted alkylsulfone having 1 to 12 carbon atoms, substituted or unsubstituted arylsulfone hydroxyl, cyano, nitro or halogen, R$_5$ is hydrogen, substituted or unsubstituted alkyl having 1 to 4 carbon atoms or substituted or unsubstituted carbalkoxy having 2 to 13 carbon atoms, X$_1$ is hydrogen, substituted or unsubstituted alkyl or alkoxy having 1 to 6 carbon atoms or —NL$_1$CO—M$_1$, in which L$_1$ is hydrogen or substituted or unsubstituted alkyl having 1 to 4 carbon atoms and M$_1$ is substituted or unsubstituted alkyl or alkoxy having 1 to 24 carbon atoms, or X$_1$ is substituted or unsubstituted alkylsulfonylamino having 1 to 25 carbon atoms or hydroxyl, Y$_1$ is hydrogen, substituted or unsubstituted alkyl having 1 to 6 carbon atoms, substituted or unsubstituted alkoxy having 1 to 12 carbon atoms, substituted or unsubstituted carbalkoxy having 2 to 5 carbon atoms or N-alkyl-substituted or N,N-dialkyl-substituted amino, in which each alkyl moiety has 1 to 6 carbon atoms and can be substituted, or Y$_1$ is substituted or unsubstituted arylsulfonylamino or —NE$_1$COG$_1$, in which E$_1$ is hydrogen or substituted or unsubstituted alkyl having 1 to 8 carbon atoms and G$_1$ is substituted or unsubstituted alkyl having 1 to 12 carbon atoms or substituted or unsubstituted alkoxy having 1 to 4 carbon atoms, or Y$_1$ is —NE$_1$P(O)(OG$^1$)$_2$, in which E$_1$ is as defined above and G$^1$ is alkyl having 1 to 12 carbon atoms, or Y$_1$ is halogen or hydroxyl, Z$_1$ is hydrogen, substituted or unsubstituted alkyl having 1 to 12 carbon atoms, substituted or unsubstituted alkoxy having 1 to 6 carbon atoms or —NA$_1$COD$_1$, in which A$_1$ is hydrogen or substituted or unsubstituted alkyl having 1 to 8 carbon atoms and D$_1$ is substituted or unsubstituted alkyl having 1 to 18 carbon atoms, or Z$_1$ is substituted or unsubstituted acyl having 2 to 9 carbon atoms, substituted or unsubstituted carbalkoxy having 2 to 19 carbon atoms, substituted or unsubstituted alkylsulfonylamino having 1 to 6 carbon atoms, halogen or the atoms which together with Y$_1$ form a substituted or unsubstituted 5-membered or 6-membered, saturated or unsaturated ring which can contain 1 or 2 hetero-atoms, and W$_1$ is hydrogen, substituted or unsubstituted alkyl or alkoxy, each having 1 to 4 carbon atoms, or halogen.

2. A colour-photographic recording material according to claim 1, which contains a dye of the formula

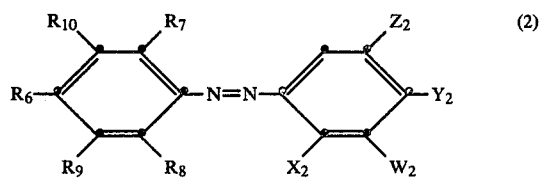

in which R$_6$ is hydrogen, substituted or unsubstituted alkyl having 1 to 12 carbon atoms, substituted or unsubstituted alkoxy having 1 to 16 carbon atoms, substituted or unsubstituted alkenyl having 2 to 4 carbon atoms, substituted or unsubstituted aliphatic acyl having 2 or 3 carbon atoms, substituted or unsubstituted benzoyl, substituted or unsubstituted carbalkoxy having 2 to 16 carbon atoms, or —NV$_2$COU$_1$, in which V$_2$ is hydrogen or alkyl having 1 or 2 carbon atoms and U$_1$ is as defined in claim 1, or R$_6$ is N-alkyl-substituted or N,N-dialkyl-substituted carboxamido or sulfonamido, in which each alkyl moiety contains 1 to 10 carbon atoms and can be substituted further, or R$_6$ is substituted or unsubstituted alkylsulfone having 1 to 8 carbon atoms, substituted or unsubstituted phenylsulfone, substituted or unsubstituted phenoxy or substituted or unsubstituted phenylsulfonic acid ester, or is hydroxyl, cyano, nitro or halogen, R$_7$ is hydrogen, substituted or unsubstituted alkyl having 1 to 8 carbon atoms, substituted or unsubstituted alkoxy having 1 to 6 carbon atoms, substituted or unsubstituted carbalkoxy having 2 or 3 carbon atoms or N-alkyl-substituted or N,N-dialkyl-substituted sulfonamido or carboxamido, in which each alkyl moiety contains 1 to 8 carbon atoms and can be substituted, or R$_7$ is substituted or unsubstituted alkylsulfone having 1 to 6 carbon atoms, substituted or unsubstituted phenylsulfone or substituted or unsubstituted phenoxy, or is cyano, nitro or halogen, R$_8$ is hydrogen, alkyl or alkoxy having 1 to 4 carbon atoms, substituted or unsubstituted phenoxy or N-alkyl-substituted or N,N-dialkyl-substituted sulfonamido or carboxamido, in which each alkyl moiety has 1 to 4 carbon atoms, or R$_8$ is alkylsulfone having 1 to 4 carbon atoms, substituted or unsubstituted phenylsulfonic acid ester, cyano, nitro, halogen, substituted or unsubstituted carbalkoxy having 1 to 16 carbon atoms, or —P(O)(OT$^1$)$_2$, in which T$^1$ is as defined in claim 1, R$_9$ is hydrogen, unsubstituted or halogen-substituted alkyl having 1 to 4 carbon atoms, substituted or unsubstituted alkoxy having 1 to 6 carbon atoms, carbalkoxy having 2 to 16 carbon atoms or N-alkyl-substituted or N,N-dialkyl-substituted sulfonamido or carboxamido, in which each alkyl moiety has 1 to 8 carbon atoms and can be substituted, or R$_9$ is —NQ$_1$COT$_1$, in which Q$_1$ and T$_1$ are as defined in claim 1, or R$_9$ is alkylsulfone having 1 to 6 carbon atoms, phenylsulfone, hydroxyl, cyano, nitro or halogen, R$_{10}$ is hydrogen, alkyl having 1 to 4 carbon atoms or carbalkoxy having 2 to 13 carbon atoms, X$_2$ is hydrogen, alkyl or alkoxy, each having 1 to 6 carbon atoms, or —NL$_2$COM$_2$, in which L$_2$ is hydrogen or alkyl having 1 to 4 carbon atoms and M$_2$ is substituted or unsubstituted alkyl or alkoxy having 1 to 18 carbon atoms, or X$_2$ is alkylsulfonylamino having 1 to 18 carbon atoms, or hydroxyl, Y$_2$ is hydrogen, substituted or unsubstituted alkyl having 1 to 4 carbon atoms, alkoxy having 1 to 12 carbon atoms, substituted or unsubstituted carbalkoxy having 2 to 5 carbon atoms, or N-alkyl-substituted or N,N-dialkyl-substituted amino, in which each alkyl moiety contains 1 to 6 carbon atoms and can be substituted, or Y$_2$ is substituted or unsubstituted phenylsulfonylamino or —NE$_2$COG$_2$, in which E$_2$ is hydrogen or unsubstituted or cyano-substituted alkyl having 1 to 8 carbon atoms and G$_2$ is alkyl having 1 to 8 carbon atoms or substituted or unsubstituted alkoxy having 1 to 4 carbon atoms, or Y$_2$ is —NHP(O)(OG$^2$)$_2$, in which G$^2$ is alkyl having 1 to 6 carbon atoms, or Y$_2$ is halogen or hydroxyl, Z$_2$ is hydrogen, alkyl having 1 to 12 carbon atoms, substituted or unsubstituted alkoxy having 1 to 6 carbon atoms or —NA$_2$COD$_2$, in which A$_2$ is hydrogen or alkyl having 1 to 8 carbon atoms and D$_2$ is alkyl having 1 to 18 carbon atoms, or $Z_2$ is acyl having 2 to 7 carbon atoms, substituted or unsubstituted carbalkoxy having 2 to 19 carbon atoms, alkylsulfonylamino having 1 to 6 carbon atoms, halogen or the atoms which together with $Y_2$ form an unsubstituted or methyl-substituted 6-membered, saturated or unsaturated ring which can contain one or two hetero-atoms and $W_2$ is hydrogen, alkyl or alkoxy each having 1 to 4 carbon atoms, or halogen.

3. A colour-photographic recording material as claimed in claim 2, which contains a dye of the formula

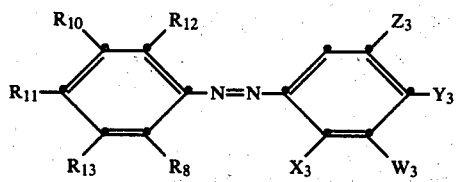

in which $R_{11}$ is hydrogen, alkyl having 1 to 12 carbon atoms which is substituted by alkoxy having 1 to 4 carbon atoms or by carbalkoxy having 2 to 12 carbon atoms or is unsubstituted, alkoxy having 1 to 16 carbon atoms, a radical of the formula

in which $m_1$ is an integer from 2 to 16, n is 1 or 2 and m is an integer from 0 to 3, alkenyl having 2 to 4 carbon atoms, which is substituted by cyano and/or by carbalkoxy having 2 to 9 carbon atoms or is unsubstituted, aliphatic acyl having 2 or 3 carbon atoms, benzoyl which is substituted by chlorine, $-CO_2B_1$, $-SO_2B_1$ or $-COB_1$, in which $B_1$ is alkyl having 1 to 8 carbon atoms, or is unsubstituted, or $R_{11}$ is carbalkoxy having 2 to 16 carbon atoms, a radical of the formula

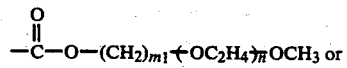

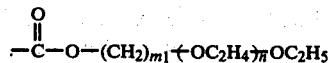

in which $m_1$ and n are as defined above, or $-NV_3COU_2$, in which $V_3$ is hydrogen and $U_2$ is unsubstituted or methoxy- or hydroxyl-substituted alkyl having 1 to 12 carbon atoms or alkenyl having 2 to 4 carbon atoms, or $R_{11}$ is carboxamido or N-alkyl-substituted or N,N-dialkyl-substituted sulfonamido, in which each alkyl moiety has 1 to 10 carbon atoms and can be substituted by methoxy, hydroxyl or amino, or $R_{11}$ is alkylsulfone having 1 to 8 carbon atoms, unsubstituted or substituted phenylsulfone, unsubstituted or substituted phenoxy, unsubstituted or substituted phenylsulfonic acid ester, hydroxyl, cyano, nitro or halogen, $R_{12}$ is hydrogen, unsubstituted or halogen-substituted alkyl having 1 to 8 carbon atoms, alkoxy having 1 to 6 carbon atoms, carbalkoxy having 2 or 3 carbon atoms, a radical of the formula

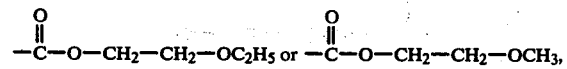

or N-alkyl-substituted or N,N-dialkyl-substituted sulfonamido or carboxamido, in which each alkyl moiety has 1 to 8 carbon atoms and can be substituted by methoxy, or $R_{12}$ is alkylsulfone having 1 to 6 carbon atoms, phenylsulfone or phenoxy which is unsubstituted or substituted by alkyl having 1 to 8 carbon atoms, or is cyano, nitro or halogen, $R_{13}$ is hydrogen, unsubstituted or fluorine-substituted alkyl having 1 or 2 carbon atoms, unsubstituted or methoxy-substituted alkoxy having 1 to 6 carbon atoms, carbalkoxy having 2 to 13 carbon atoms or N,N-dialkyl-substituted sulfonamido or carboxamido, in which each alkyl moiety has 1 to 4 carbon atoms and can be methoxy-substituted, or $R_{13}$ is $-NQ_2COT_2$, in which $Q_2$ is hydrogen and $T_2$ is alkyl having 1 to 4 carbon atoms, or $R_{13}$ is methylsulfone, phenylsulfone, hydroxyl, cyano, nitro or halogen $X_3$ is hydrogen, alkyl or alkoxy each having 1 to 4 carbon atoms, or $-NL_3COM_3$, in which $L_3$ is hydrogen or methyl and $M_3$ is alkyl which has 1 to 18 carbon atoms and is unsubstituted or substituted by halogen, by carbalkoxy having 2 to 5 carbon atoms, by substituted or unsubstituted phenyl or phenoxy or by alkoxy having 1 to 5 carbon atoms, or $X_3$ is alkylsulfonylamino having 1 to 12 carbon atoms or hydroxyl, $Y_3$ is hydrogen, alkyl having 1 to 4 carbon atoms, alkoxy having 1 to 12 carbon atoms, unsubstituted or $-OC_2H_4-OCH_3$-substituted carbalkoxy having 2 to 5 carbon atoms or N-alkyl-substituted or N,N-dialkyl-substituted amino, in which each alkyl moiety has 1 to 6 carbon atoms and can be substituted by methoxy, by carbalkoxy having 2 to 5 carbon atoms, by acetoxy, by hydroxyl, by nitro, by cyano, by phenyl or by tosyl, or $Y_3$ is pyrrolidinyl, piperidinyl, morpholinyl or phenylsulfonylamino which is unsubstituted or substituted by alkyl having 1 to 4 carbon atoms, or $Y_3$ is $-NE_3COG_3$, in which $E_3$ is hydrogen or unsubstituted or cyano-substituted alkyl having 1 to 4 carbon atoms and $G_3$ is alkyl having 1 to 8 carbon atoms, alkoxy having 1 to 4 carbon atoms or a radical of the formula $-O-(CH_2)_k-(OC_2H_4)_nOCH_3$ in which k is an integer from 1 to 5 and n is as defined above, or $Y_3$ is

in which $G^3$ is alkyl having 1 to 4 carbon atoms, or $Y_3$ is halogen or hydroxyl, $Z_3$ is hydrogen, alkyl having 1 to 8 carbon atoms, alkoxy having 1 to 6 carbon atoms, a radical of the formula $-O-(CH_2)_{k1}-O-(CH_2)_m-CH_3$ in which $k_1$ is an integer from 2 to 6 and m is as defined above, or $Z_3$ is $-NA_3COD_3$, in which $A_3$ is hydrogen or alkyl having 1 to 4 carbon atoms and $D_3$ is alkyl having 1 to 12 carbon atoms, or $Z_3$ is acyl having 2 to 5 carbon atoms, carbalkoxy having 2 to 5 carbon atoms, a radical of the formula

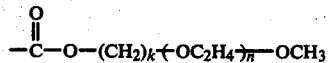

in which k and n are as defined above, methylsulfonylamino, halogen or the atoms which together with $Y_3$ form an unsubstituted or methyl-substituted 6-membered saturated or unsaturated ring which contains nitrogen or nitrogen and oxygen, $W_3$ is hydrogen, alkyl or alkoxy each having 1 or 2 carbon atoms, or halogen, and $R_8$ and $R_{10}$ are as defined in claim 2.

4. A colour-photographic recording material according to claim 3, which contains a dye of the formula

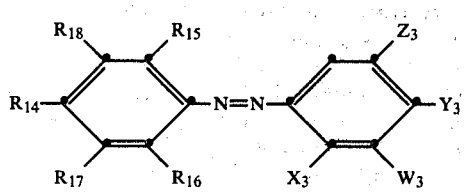
(4)

in which $R_{14}$ is hydrogen, alkyl which has 1 to 12 carbon atoms and is unsubstituted or substituted by alkoxy having 1 to 4 carbon atoms or by carbalkoxy having 2 to 7 carbon atoms, alkoxy having 1 to 12 carbon atoms, a radical of the formula $-O(CH_2)_{m2}-(OC_2H_4)_{\overline{n}}O(CH_2)_{\overline{m}}CH_3$ in which $m_2$ is an integer from 2 to B 12 and n and m are as defined in claim 3, or alkenyl which has 2 to 4 carbon atoms and is unsubstituted or substituted by cyano and/or by carbalkoxy having 2 to 7 carbon atoms, or $R_{14}$ is aliphatic acyl having 2 or 3 carbon atoms, or benzoyl which is unsubstituted or substituted by chlorine, $-CO_2B_2$, $-SO_2B_2$ or $-COB_2$, in which $B_2$ is alkyl having 1 to 4 carbon atoms, or $R_{14}$ is carbalkoxy having 2 to 9 carbon atoms, a radical of the formula

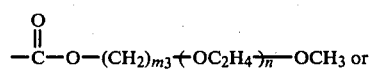

in which $m_3$ is an integer from 2 to 8 and n is as defined above, or $-NHCOU_3$, in which $U_3$ is alkyl having 1 to 8 carbon atoms or alkenyl having 2 or 3 carbon atoms, or $R_{14}$ is carboxamido or N-alkyl-substituted or N,N-dialkyl-substituted sulfonamido, in which each alkyl moiety has 1 to 5 carbon atoms and can be substituted by methoxy, hydroxyl or amino, or $R_{14}$ is alkylsulfone having 1 to 6 carbon atoms, unsubstituted or $C_{1-5}$-alkyl-substituted or hydroxyl-substituted phenylsulfone or phenylsulfonic acid ester, hydroxyl, cyano, nitro or halogen, $R_{15}$ is hydrogen, unsubstituted or fluorine-substituted alkyl having 1 to 4 carbon atoms, alkoxy having 1 or 2 carbon atoms, carbalkoxy having 2 or 3 carbon atoms, a radical of the formula

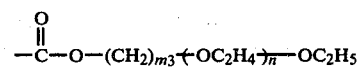

or N-alkyl-substituted or N,N-dialkyl-substituted sulfonamido or carboxamido, in which each alkyl moiety has 1 to 4 carbon atoms and can be methoxy-substituted, or $R_{15}$ is alkylsulfone having 1 to 4 carbon atoms or $R_{15}$ is cyano, nitro or halogen, $R_{16}$ is hydrogen, methyl, methoxy, or N-alkyl-substituted or N,N-dialkyl-substituted sulfonamido or carboxamido, in which each alkyl moiety has 1 or 2 carbon atoms and can be methoxy-substituted, or $R_{16}$ is alkylsulfone having 1 to 4 carbon atoms, phenylsulfonic acid ester, cyano, nitro, halogen, unsubstituted or methoxy-substituted carbalkoxy having 1 to 12 carbon atoms or $-P(O)(OT^1)_2$, in which $T^1$ is as defined in claim 2, $R_{17}$ is hydrogen, methyl, trifluoromethyl, alkoxy having 1 to 4 carbon atoms, carbalkoxy having 2 to 9 carbon atoms or N,N-dialkyl-substituted sulfonamido or carboxamido, in which each alkyl moiety has 1 or 2 carbon atoms and can be methoxy-substituted, or $R_{17}$ is $-NHCOT_2$, in which $T_2$ is as defined in claim 3, or $R_{17}$ is methylsulfone, phenylsulfone, hydroxyl, cyano, nitro or halogen, $R_{18}$ is hydrogen, methyl or carbalkoxy having 2 to 7 carbon atoms and $X_3$, $Y_3$, $Z_3$ and $W_3$ are as defined in claim 3.

5. A colour-photographic recording material according to claim 4, which contains a dye of the formula

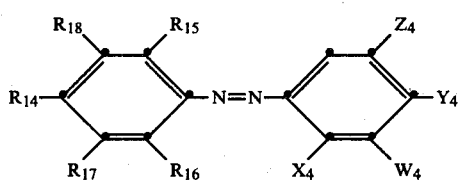
(5)

in which $X_4$ is hydrogen, alkyl having 1 to 4 carbon atoms, methoxy or $-NL_4COM_4$, in which $L_4$ is hydrogen or methyl and $M_4$ is alkyl having 1 to 13 carbon atoms, or alkoxy having 1 to 4 carbon atoms, which can both be substituted by phenyl or phenoxy or by $(C_{m3}H_{2m3+1})C_6H_4-$ or $(C_{m3}H_{2m3+1})C_6H_4-O-$ or by fluorine, chlorine, alkoxy having 1 to 5 carbon atoms or by carbalkoxy having 2 or 3 carbon atoms, $m_3$ being as defined in claim 4, or $X_4$ is alkylsulfonylamino having 1 to 6 carbon atoms, or hydroxyl, $Y_4$ is hydrogen, alkyl having 1 or 2 carbon atoms, alkoxy having 1 to 8 carbon atoms, unsubstituted or $-OC_2H_4-OCH_3-$ substituted carbalkoxy having 2 or 3 carbon atoms or N-alkyl-substituted or N,N-dialkyl-substituted amino, in which each alkyl moiety has 1 to 6 carbon atoms and can be substituted by methoxy, carbalkoxy having 2 to 5 carbon atoms, acetoxy, hydroxyl, nitro, cyano or phenyl, or $Y_4$ is pyrrolidinyl, piperidinyl or phenylsulfonamino which can be substituted by alkyl having 1 to 4 carbon atoms, or $Y_4$ is $-NE_3COG_4$, in which $E_3$ is as defined in claim 3, and $G_4$ is alkyl having 1 to 8 carbon atoms, alkoxy having 1 or 2 carbon atoms, or a radical of the formula $-O-CH_2-CH_2-OC_2H_4OC_2H_5$ or $-O-CH_2-CH_2-OC_24-OCH_3$, or $Y_4$ is

in which $G^3$ is as defined in claim 3, or $Y_4$ is halogen or hydroxyl, $Z_4$ is hydrogen, alkyl having 1 to 6 carbon atoms, alkoxy having 1 to 4 carbon atoms, $-O(CH_2)_k-O(CH_2)_m-CH_3$, in which k and m are as defined in claim 3, or $-NA_4COD_4$, in which $A_4$ is hydrogen or methyl and $D_4$ is alkyl having 1 to 8 carbon atoms, or $Z_4$ is acetyl, carbalkoxy having 2 to 5 carbon atoms, a radical of the formula

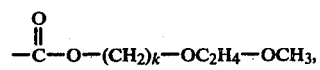

in which k is as defined in claim 3, methylsulfonylamino, halogen or the atoms which together with $Y_4$ form ring systems such as

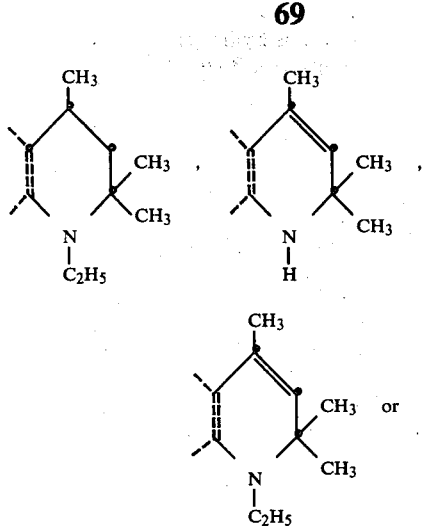

W₄ is hydrogen, methyl, methoxy or halogen and R₁₄, R₁₅, R₁₆, R₁₇ and R₁₈ are as defined in claim 4.

6. A colour-photographic recording material according to claim 5, which contains a dye of the formula

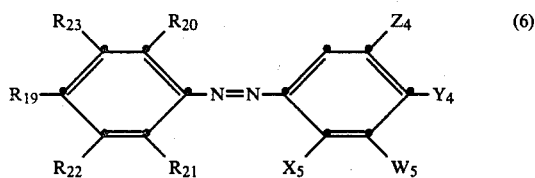

in which R₁₉ is hydrogen, alkyl having 1 to 6 carbon atoms which can be substituted by alkoxy having 1 to 4 carbon atoms or by carbalkoxy having 2 to 7 carbon atoms, alkoxy having 1 to 8 carbon atoms, a radical of the formula —O—(CH₂)$_{\overline{m3}}$OC₂H₄—OCH₃ or —O—(CH₂)$_{\overline{m3}}$OC₂H₄—OC₂H₅, in which m₃ is as defined in claim 4, vinyl which can be substituted by cyano and/or by carbalkoxy having 2 to 7 carbon atoms, acetyl, benzoyl which can be substituted in the para-position by chlorine, —CO₂B₂, —SO₂B₂— or —COB₂, in which B₂ is as defined in claim 4, carbalkoxy having 2 to 9 carbon atoms, a radical of the formula

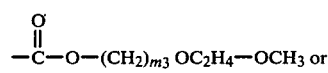

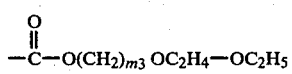

in which m₃ is as defined in claim 4, or —NHCOU₄, in which U₄ is alkyl having 1 to 4 carbon atoms or alkenyl having 2 or 3 carbon atoms, or R₁₉ is carboxamido or N-alkyl-substituted or N,N-dialkyl-substituted sulfonamido, in which each alkyl moiety has 1 to 5 carbon atoms and can be substituted by methoxy, hydroxyl or amino, or R₁₉ is alkyl-sulfone having 1 to 6 carbon atoms or phenylsulfone or phenylsulfonic acid ester, which two radicals can be substituted in the para-position by alkyl having 1 to 5 carbon atoms or hydroxyl, or R₁₉ is hydroxyl, cyano, nitro, chlorine or bromine, R₂₀ is hydrogen, methyl, trifluoromethyl, methoxy, ethoxy, carbalkoxy having 2 or 3 carbon atoms, a radical of the formula

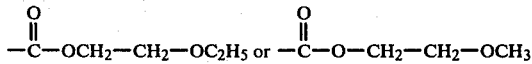

or N-alkyl-substituted or N,N-dialkyl-substituted sulfonamido or carboxamido, in which each alkyl moiety has 1 to 4 carbon atoms and can be substituted by methoxy, or R₂₀ is alkylsulfone having 1 to 4 carbon atoms, phenylsulfone or R₂₀ is cyano, nitro, chlorine or bromine, R₂₁ is hydrogen, methyl, methoxy, phenoxy or N-alkyl-substituted or N,N-dialkyl-substituted sulfonamido, in which each alkyl moiety has 1 to 2 carbon atoms, or R₂₁ is alkylsulfone having 1 to 4 carbon atoms, cyano, nitro, bromine, chlorine or unsubstituted or methoxy-substituted carbalkoxy having 2 to 7 carbon atoms, or R₂₁ is —P(O)(OC₂H₅)₂, R₂₂ is hydrogen, methyl, trifluoromethyl, unsubstituted or methoxy-substituted alkoxy having 1 to 2 carbon atoms, carbalkoxy having 2 to 9 carbon atoms or N,N-dialkyl-substituted sulfonamido or carboxamido, in which each alkyl moiety has 1 or 2 carbon atoms and can be substituted by methoxy, or R₂₂ is —NHCOT₂, in which T₂ is as defined in claim 4, or R₂₂ is methylsulfone, phenylsulfone, hydroxyl, cyano, chlorine or bromine, R₂₃ is hydrogen, methyl or carbalkoxy having 2 or 3 carbon atoms, X₅ is hydrogen, alkyl having 1 to 4 carbon atoms, methoxy or —NL₅-COM₅, in which L₅ is hydrogen and M₅ is alkyl having 1 to 8 carbon atoms, or alkoxy having 1 or 2 carbon atoms, which radicals can be substituted by fluorine, chlorine, alkoxy having 1 to 5 carbon atoms, carbalkoxy having 2 or 3 carbon atoms, phenyl, para-(C$_{m3}$H$_{2m3+1}$)—C₆H₄—, phenoxy, or para-C$_{m3}$H$_{2m3+1}$)—C₆H₄—O—, m₃ being as defined in claim 4, or X₅ is alkylsulfonylamino having 1 to 6 carbon atoms, or hydroxyl, W₅ is hydrogen, methyl, methoxy or chlorine and Y₄ and Z₄ are as defined in claim 5.

7. A colour-photographic recording material as claimed in claim 6, which contains a dye of the formula

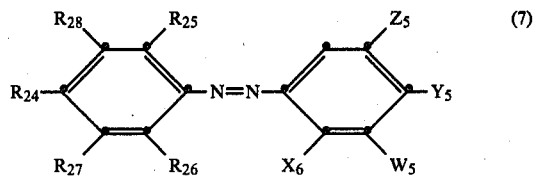

in which R₂₄ is hydrogen or alkyl having 1 to 4 carbon atoms, which can be substituted by carbalkoxy having 2 to 7 carbon atoms, or R₂₄ is alkoxy having 1 to 4 carbon atoms, a radical of the formula —O—(CH₂)$_k$—OC₂H₄—OCH₃ or —O—(CH₂)$_k$—OC₂H₄—OC₂H₅, in which k is as defined in claim 3, carbalkoxy having 2 to 9 carbon atoms, a radical of the formula

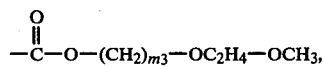

in which m₃ is as defined in claim 4, —NHCOU₄, in which U₄ is as defined in claim 6, carboxamido or N-alkyl-substituted or N,N-dialkyl-substituted sulfonamido, in which each alkyl moiety has 1, 2 or 3 carbon atoms and can be substituted by methoxy, or R₂₄ is alkylsulfone having 1 to 6 carbon atoms or is phenylsulfone or phenylsulfonic acid ester, each of which two radicals can be substituted in the para-position by alkyl having 1 to 5 carbon atoms or hydroxyl, or $R_{24}$ is hydroxyl, nitro, chlorine or bromine, $R_{25}$ is hydrogen, methyl, methoxy, ethoxy, carbalkoxy having 2 or 3 carbon atoms, a radical of the formula

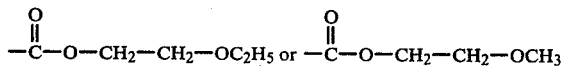

or N-alkyl-substituted or N,N-dialkyl-substituted sulfonamido or carboxamido, in which each alkyl moiety has 1 or 2 carbon atoms and can be substituted by methoxy, or $R_{25}$ is alkylsulfone having 1 to 4 carbon atoms or $R_{25}$ is cyano, nitro, chlorine or bromine, $R_{26}$ is hydrogen, cyano, chlorine or bromine, $R_{27}$ is hydrogen or alkoxy having 1 or 2 carbon atoms, or $R_{27}$ is carbalkoxy having 2 to 9 carbon atoms, —$NHCOT_2$, in which $T_2$ is as defined in claim 6, hydroxyl or chlorine, $R_{28}$ is hydrogen or carbalkoxy having 2 or 3 carbon atoms, $X_6$ is hydrogen, alkyl having 1 to 4 carbon atoms, methoxy or —$NHCOM_6$, in which $M_6$ is alkyl having 1 to 4 carbon atoms which is optionally substituted by alkoxy having 1 to 5 carbon atoms, by phenoxy or para-$(C_kH_{2k+1})$—$C_6H_4$—O—, k being as defined in claim 3, or $X_6$ is hydroxyl, $Y_5$ is hydrogen, alkoxy having 1 to 4 carbon atoms, unsubstituted or —$OC_2H_4$—$OCH_3$— substituted carbalkoxy having 2 or 3 carbon atoms or N-alkyl-substituted or N,N-dialkyl-substituted amino, in which each alkyl moiety has 1 to 4 carbon atoms and can be substituted by methoxy, carbalkoxy having 2 or 3 carbon atoms, acetoxy, hydroxyl, cyano or phenyl, or $Y_5$ is —$NE_3COG_4$, in which $E_3$ and $G_4$ are as defined in claim 5, or $Y_5$ is hydroxyl, $Z_5$ is hydrogen, alkyl having 1 to 6 carbon atoms, alkoxy having 1 to 4 carbon atoms, acetyl, carbalkoxy having 2 to 5 carbon atoms, a radical of the formula

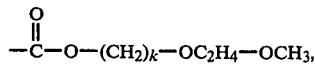

in which k is as defined in claim 3, —$NA_4COD_4$, in which $A_4$ and $D_4$ are as defined in claim 5, or chlorine, and $W_5$ is as defined in claim 6.

8. A colour-photographic recording material according to claim 7, which contains a dye of the formula

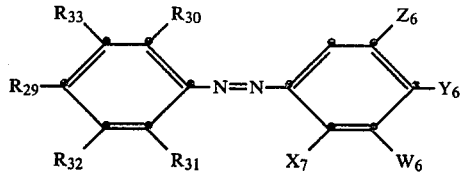

in which $m_3$ is as defined in claim 7, $R_{30}$ is hydrogen, methyl, methoxy, cyano, chlorine or bromine, $R_{31}$ is hydrogen or bromine, $R_{32}$ is hydrogen or chlorine, $R_{33}$ is hydrogen or carbomethoxy, $X_7$ is

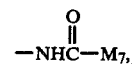

in which $M_7$ is alkyl having 1 to 4 carbon atoms, or $X_7$ is hydroxyl, $Y_6$ is hydrogen, N-alkyl-substituted amino, in which the alkyl moiety has 1 or 2 carbon atoms and can be cyano-substituted, or —$NE_3COG_4$, in which $E_3$ and $G_4$ are as defined in claim 5, $Z_6$ is hydrogen or alkoxy having 1 to 4 carbon atoms and $W_6$ is hydrogen or methyl.

9. A colour-photographic recording material according to claim 8, which contains a dye of one of the formulae

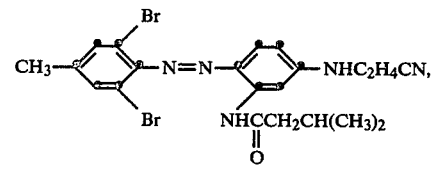

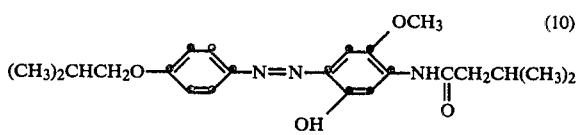

or

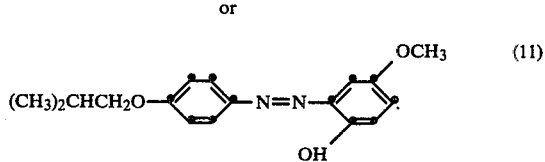

10. A colour-photographic recording material according to claim 6, which contains a dye of the formula

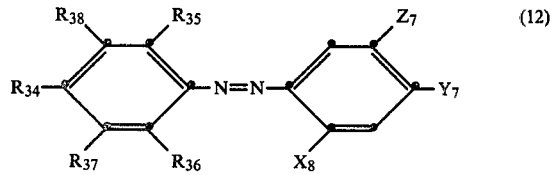

in which $R_{34}$ is hydrogen or alkyl having 1 or 2 carbon atoms, which can be substituted by carbalkoxy having 2 or 3 carbon atoms, or is carbalkoxy having 2 or 3 carbon atoms, a radical of the formula

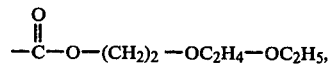

or vinyl which can be substituted by cyano and/or carbalkoxy having 2 to 5 carbon atoms, or $R_{34}$ is N-alkyl-substituted or N,N-dialkyl-substituted sulfonamido, in which each alkyl moiety has 1 to 3 carbon atoms and can be methoxy-substituted, alkylsulfone having 1 to 6 carbon atoms, phenylsulfonic acid ester, para-$(C_{m3}H_{2m3+1})$—$C_6H_4$—O—$SO_2$—, in which $m_3$ is as defined in claim 4, cyano, nitro, chlorine or bromine, $R_{35}$ is hydrogen, trifluoromethyl, carbalkoxy having 2 or 3 carbon atoms, alkylsulfone having 1 to 4 carbon atoms, N-alkyl-substituted or N,N-dialkyl-substituted sulfonamido, in which each alkyl moiety has 1 to 4 carbon atoms and can be methoxy-substituted, cyano, nitro, chlorine or bromine, $R_{36}$ is hydrogen, methylsulfone, N,N-diethylsulfonamide, cyano, nitro, chlorine or bromine, $R_{37}$ is hydrogen, methyl, carbalkoxy having 2 to 7 carbon atoms, N,N-dialkyl-substituted sulfonamido or carboxamido, in which each alkyl moiety has 1 or 2 carbon atoms and can be methoxy-substituted, cyano or chlorine, $R_{38}$ is hydrogen or methyl, $X_8$ is hydrogen, methyl or $-NHCOM_7$, in which $M_7$ is alkyl having 1 to 8 carbon atoms which is unsubstituted or substituted by carbalkoxy having 2 or 3 carbon atoms, fluorine, chlorine, phenyl, phenoxy, para-$(C_{m_3}H_{2m_3+1})-C_6H_4-$ or para-$(C_{m_3}H_{2m_3+1})-C_6H_4O-$, or $X_8$ is alkylsulfonylamino having 1 to 6 carbon atoms, or hydroxyl, $Y_7$ is alkyl having 1 or 2 carbon atoms, alkoxy having 1 to 8 carbon atoms, unsubstituted or $-OC_2H_4-OCH_3-$ substituted carbalkoxy having 2 or 3 carbon atoms, or N-alkyl-substituted or N,N-dialkyl-substituted amino, in which each alkyl moiety has 1 to 4 carbon atoms and can be substituted by methoxy, carbomethoxy, acetoxy, cyano, hydroxyl or phenyl, or $Y_7$ is $-NHCOG_5$, in which $G_5$ is alkyl having 1 to 4 carbon atoms, and $Z_7$ is hydrogen, alkoxy having 1 to 2 carbon atoms, a radical of the formula $-OCH_2CH_2-O(CH_2)_m-CH_3$, in which m is as defined in claim 5, $-NHCOD_4$, in which $D_4$ is as defined in claim 5, or chlorine, 11. A colour-photographic recording material according to claim 10, which contains a dye of the formula

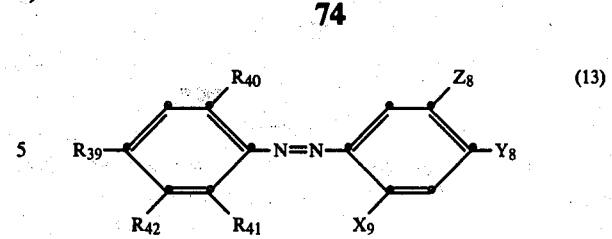

in which $R_{39}$ is hydrogen or alkyl having 1 to 2 carbon atoms, which can be substituted by carbalkoxy having 2 or 3 carbon atoms, or $R_{39}$ is carbalkoxy having 2 or 3 carbon atoms, alkylsulfone having 1 to 6 carbon atoms, N-alkyl-substituted or N,N-dialkyl-substituted sulfonamido, in which each alkyl moiety has 1 to 3 carbon atoms and can be methoxy-substituted, cyano, nitro, chlorine or bromine, $R_{40}$ is hydrogen, alkylsulfone having 1 to 4 carbon atoms, N,N-dimethylsulfonamide or N,N-diethylsulfonamide, cyano or nitro, $R_{41}$ is hydrogen, methylsulfone, cyano or nitro, $R_{42}$ is hydrogen or cyano, $X_9$ is methyl or

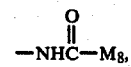

in which $M_8$ is alkyl having 1 to 4 carbon atoms, or $X_9$ is hydroxyl, $Y_8$ is alkoxy having 1 to 8 carbon atoms or N-alkyl-substituted or N,N-dialkyl-substituted amino, in which each alkyl moiety has 1 to 4 carbon atoms and can be substituted by methoxy, acetoxy or cyano, and $Z_8$ is hydrogen, alkoxy having 1 or 2 carbon atoms, a radical of the formula $-OCH_2CH_2-O(CH_2)_m-CH_3$, in which m is as defined in claim 3, or $-NHCOD_4$, in which $D_4$ is as defined in claim 10.

12. A colour-photographic recording material according to claim 11, which contains a dye of one of the formulae

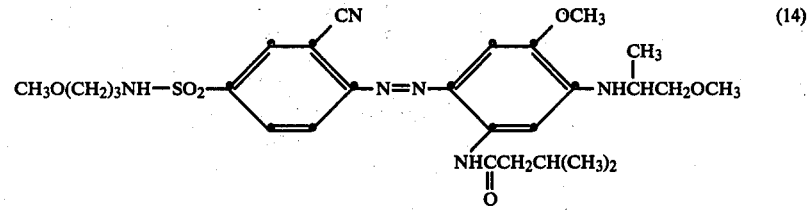

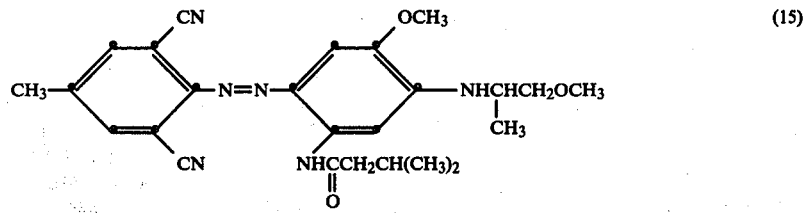

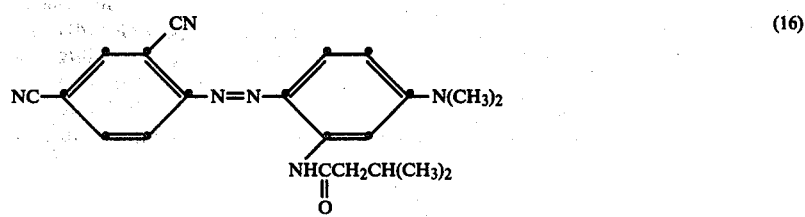

or

-continued

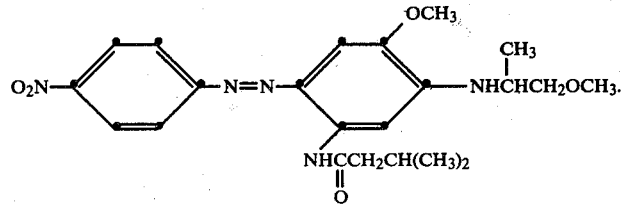
(17)

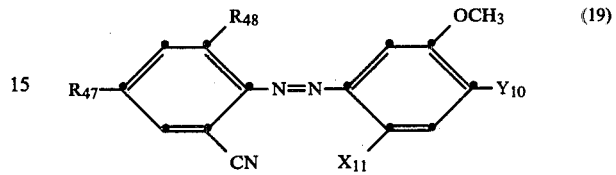
(19)

in which $R_{47}$ is vinyl which can be substituted by cyano and/or carbalkoxy having 2 or 3 carbon atoms, or $R_{47}$ is N-alkyl-substituted or N,N-dialkyl-substituted sulfonamido, in which each alkyl moiety has 1 or 2 carbon atoms and can be methoxy-substituted, cyano or nitro, $R_{48}$ is cyano, trifluoromethyl or nitro, $X_{11}$ is 13. A colour-photographic recording material according to claim 6, which contains a dye of the formula

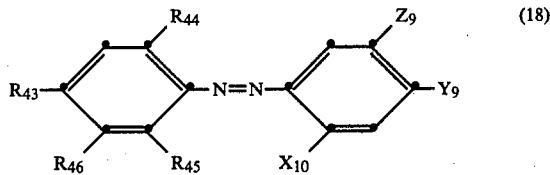
(18)

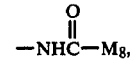

in which $M_8$ is as defined in claim 11, and $Y_{10}$ is dimethylamino or diethylamino.

15. A colour-photograhic recording material according to claim 14, which contains a dye of one of the formulae in which $R_{43}$ is vinyl which can be substituted by cyano and/or carbalkoxy having 2 to 7 carbon atoms, or $R_{43}$ is carbalkoxy having 2 or 3 carbon atoms, N-alkyl-substituted or N,N-dialkyl-substituted sulfonamido, in which each alkyl moiety has 1 to 5 carbon atoms and can be methoxy-, amino- or hydroxyl-substituted, alkylsulfone having 1 to 6 carbon atoms, phenylsulfonic acid ester, para-$(C_{m3}H_{2m3+1})$—$C_6H_4$—O—$SO_2$—, in which $m_3$ is as defined in claim 10, cyano or nitro, $R_{44}$ is N,N-dimethylsulfonamido or N,N-diethylsulfonamido, cyano, nitro, chlorine, bromine, methylsulfone or trifluoromethyl, $R_{46}$ is hydrogen or carbalkoxy having 2 to 6 carbon atoms, $X_{10}$ is methyl

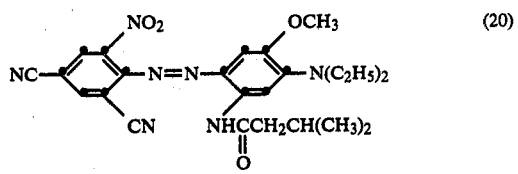
(20)

or

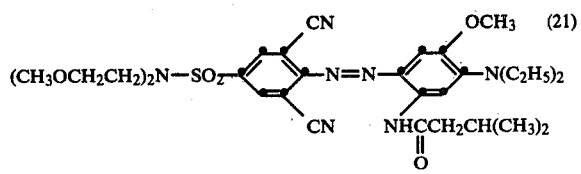
(21)

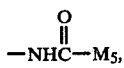

in which $M_5$ is as defined in claim 6, or alkylsulfonamide having 1 to 6 carbon atoms, $Y_9$ is unsubstituted or —$OC_2H_4$-$OCH_3$-substituted carbalkoxy having 2 or 3 carbon atoms or N-alkyl-substituted or N,N-dialkyl-substituted amino, in which each alkyl moiety has 1 to 4 carbon atoms and can be substituted by methoxy, acetoxy, cyano, hydroxyl or phenyl, and $Z_9$ is hydrogen, methoxy, —$OCH_2$-$CH_2$-$OC_2H_5$, or —$OCH_2CH_2$-$OCH_3$.

14. A colour-photographic recording material according to claim 13, which contains a dye of the formula 16. A process for the preparation of a colour-photographic recording material for the silver dye bleach process, which comprises incorporating at least one non-diffusible, bleachable and oil-soluble monoazo dye of the formula (1) in claim 1 dissolved in a high-boiling organic solvent into at least one silver halide emulsion layer or into a colloid layer adjacent to the silver halide emulsion layer.

17. A photographic image produced with the colour-photographic recording material according to claim 1.

* * * * *